US011370287B2

(12) United States Patent
Tsuyuzaki et al.

(10) Patent No.: US 11,370,287 B2
(45) Date of Patent: Jun. 28, 2022

(54) VEHICLE BODY SUBSTRUCTURE

(71) Applicant: HONDA MOTOR CO., LTD., Tokyo (JP)

(72) Inventors: Takumi Tsuyuzaki, Wako (JP); Shogo Imamura, Wako (JP); Shigeki Morie, Wako (JP); Keita Yoshinaga, Asaka (JP); Hiroyuki Ozawa, Wako (JP); Takashi Nitta, Wako (JP); Takashi Yamada, Wako (JP); Yasuyuki Shibata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 409 days.

(21) Appl. No.: 16/611,495

(22) PCT Filed: May 18, 2018

(86) PCT No.: PCT/JP2018/019293
§ 371 (c)(1),
(2) Date: Nov. 7, 2019

(87) PCT Pub. No.: WO2018/216614
PCT Pub. Date: Nov. 29, 2018

(65) Prior Publication Data
US 2021/0221436 A1     Jul. 22, 2021

(30) Foreign Application Priority Data

May 22, 2017  (JP) .............................. JP2017-100755
May 30, 2017  (JP) .............................. JP2017-106655
(Continued)

(51) Int. Cl.
*B60K 1/04*     (2019.01)
*B62D 21/15*    (2006.01)
(Continued)

(52) U.S. Cl.
CPC .............. *B60K 1/04* (2013.01); *B62D 21/157* (2013.01); *B62D 25/025* (2013.01); *B62D 25/2036* (2013.01); *B60K 2001/0438* (2013.01)

(58) Field of Classification Search
CPC .............. B60K 1/04; B60K 2001/0438; B62D 21/157; B62D 25/025; B62D 25/2036; B62D 25/20; B60Y 2306/01
See application file for complete search history.

(56) References Cited

U.S. PATENT DOCUMENTS 8,336,658 B2 *  12/2012  Rawlinson ............... B60K 1/04
                                                       429/96
8,702,161 B2     4/2014  Charbonneau et al.
(Continued)

FOREIGN PATENT DOCUMENTS

CN      102897010      1/2013
CN      104053591      9/2014
(Continued)

OTHER PUBLICATIONS

International Search Report and Written Opinion for International Application Serial No. PCT/JP2018/019293 dated Aug. 7, 2018, 6 pages.
(Continued)

*Primary Examiner* — Darlene P Condra
(74) *Attorney, Agent, or Firm* — Amin, Turocy & Watson, LLP

(57) ABSTRACT

This vehicle body substructure includes side sill load transmitting members that are provided inside each of side sills, a floor cross-member that is provided on one of an upper surface and a lower surface of a floor panel laid between the side sills and has extending portions extending toward upper portions of the side sill load transmitting members, an underfloor mounting component that is provided below the floor panel and includes an underfloor cross-member, under-
(Continued)

floor frames that are attached to lower portions of the underfloor mounting component and the side sills, and underfloor load transmitting members that are provided in the underfloor frames and face the underfloor cross-member. The underfloor load transmitting member has an upper half portion which faces a lower portion of the side sill load transmitting members, and a lower half portion which is fixed to a part of each of the underfloor frames attached to a lower portion of each of the side sills.

37 Claims, 50 Drawing Sheets

(30) Foreign Application Priority Data

May 30, 2017 (JP) .............................. JP2017-106656
Jun. 2, 2017 (JP) .............................. JP2017-110330

(51) Int. Cl.
*B62D 25/02* (2006.01)
*B62D 25/20* (2006.01)

(56) References Cited

U.S. PATENT DOCUMENTS

| | | | | |
|---|---|---|---|---|
| 8,939,246 B2* | 1/2015 | Yamaguchi | ............ | B60L 50/66 180/311 |
| 9,809,101 B2* | 11/2017 | Ikeda | ................... | B62D 29/001 |
| 10,166,883 B2* | 1/2019 | Brendecke | ............ | H01M 50/20 |
| 10,752,292 B2* | 8/2020 | Kawase | ............... | B62D 21/157 |
| 10,822,039 B2* | 11/2020 | Shannon | .............. | B62D 21/157 |
| 10,967,912 B2* | 4/2021 | Toyota | ................... | B62D 25/02 |
| 2013/0229030 A1 | 9/2013 | Yamaguchi et al. | | |
| 2014/0291046 A1 | 10/2014 | Araki | | |
| 2015/0239331 A1 | 8/2015 | Rawlinson et al. | | |
| 2019/0359265 A1* | 11/2019 | Tsuyuzaki | ............ | B62D 25/025 |
| 2020/0031399 A1* | 1/2020 | Matsuda | ............... | B62D 27/023 |
| 2020/0385059 A1* | 12/2020 | Kubota | ................ | B62D 21/157 |
| 2021/0229541 A1* | 7/2021 | Smith | ................ | H01M 50/233 |

FOREIGN PATENT DOCUMENTS

| | | |
|---|---|---|
| CN | 105593043 | 5/2016 |
| CN | 105813928 | 7/2016 |
| JP | 07-156831 | 6/1995 |
| JP | 2008-174181 | 7/2008 |
| JP | 2013-060160 | 4/2013 |
| JP | 5880086 | 3/2016 |
| JP | 2017-226353 | 12/2017 |
| WO | 2012/063393 | 5/2012 |

OTHER PUBLICATIONS

Chinese Office Action for Chinese Patent Application No. 201880032830.9 dated Jul. 7, 2021.

* cited by examiner

FIG. 7
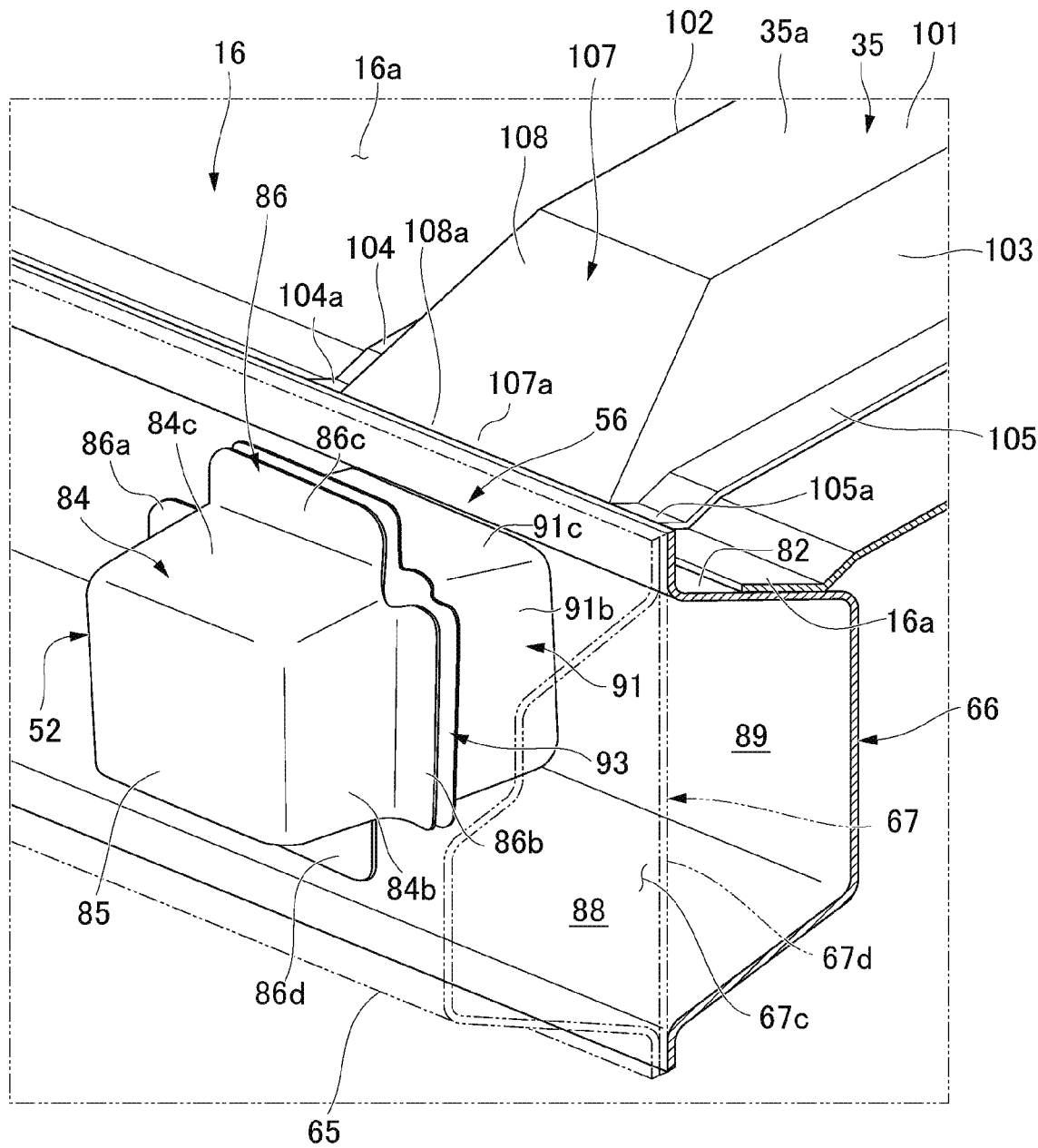
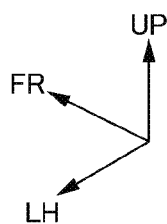

VEHICLE BODY SUBSTRUCTURE

TECHNICAL FIELD

The present invention relates to a vehicle body substructure.

The present application claims priority based on Japanese Patent Application No. 2017-100755 filed on May 22, 2017; Japanese Patent Application No. 2017-106655 filed on May 30, 2017; Japanese Patent Application No. 2017-106656 filed on May 30, 2017; and Japanese Patent Application No. 2017-110330 filed on Jun. 2, 2017, the contents of which are incorporated herein by reference.

BACKGROUND ART

As an example of vehicle body substructures, a structure in which a floor panel is laid between a side sill on the left side and a side sill on the right side, a floor cross-member is provided on an upper surface of the floor panel, and a battery pack is mounted below the floor panel is known. A battery is accommodated inside the battery pack. There is a need for the battery inside the battery pack to be protected from a load input laterally to a vehicle.

Therefore, the side sills are increased in height, and energy absorption members are provided inside the side sills. Moreover, the floor cross-member is provided toward the energy absorption member. Thus, the energy absorption member is crushed by an impact load input laterally to the vehicle, so that the impact load can be absorbed by the energy absorption member.

Accordingly, deformation of side walls of a battery case can be suppressed, so that the battery inside the battery pack (that is, an underfloor mounting component) can be protected (for example, refer to Patent Document 1).

In addition, as a substructure body of a vehicle, a structure in which a battery case accommodating a plurality of batteries is laid between left and right side sills of a vehicle body is known (for example, refer to Patent Document 2 and Patent Document 3).

In the substructure body of a vehicle disclosed in Patent Document 2, the battery case disposed below a floor panel is laid between the left and right side sills. A battery cross-member extending in a vehicle width direction is coupled to the inside of the battery case. The battery cross-member extends substantially in the vehicle width direction and is coupled to a circumferential wall or a bottom wall of the battery case. When an impact load is input laterally to the side sill, the battery cross-member functions to transmit the input load inward in the vehicle width direction while ensuring a space portion on the inner side in the vehicle width direction. The battery cross-member is formed to have a substantially uniform cross section in the vehicle width direction.

Incidentally, in vehicles in which a battery cross-member is laid inside a battery case, sometimes it is desirable that a recessed portion through which a member such as a distribution cable is inserted be provided in an upper portion of the battery cross-member. Patent Document 3 discloses a substructure body of a vehicle which can meet such a demand.

In the substructure body of a vehicle disclosed in Patent Document 3, a battery cross-member includes a lower member that is laid between left and right side walls of a battery case, and an upper member which is coupled to an upper portion of the lower member. The upper member is divided into two blocks in a central region in the vehicle width direction, and the two blocks are coupled to the upper portion of the lower member in a state where they are separated from each other in a traverse direction. Accordingly, a recessed portion through which a distribution cable or the like can be inserted is constituted between the two blocks of the upper member.

In addition, in the substructure body of a vehicle disclosed in Patent Document 3, the battery case disposed below a floor panel is laid between the left and right side sills. The battery cross-member extending in the vehicle width direction is coupled to the inside of the battery case. The battery cross-member has a longitudinally rectangular cross section extending substantially in the vehicle width direction and is coupled to a circumferential wall or a bottom wall of the battery case. When an impact load is input laterally to the side sill, the battery cross-member functions to transmit the input load inward in the vehicle width direction while ensuring a space portion on the inner side in the vehicle width direction.

In addition, in the substructure body of a vehicle disclosed in Patent Document 3, a vehicle body-side cross-member extending substantially in the vehicle width direction on the floor panel is disposed on an upper side of the battery cross-member. In the vehicle body-side cross-member, both end portions in the vehicle width direction are laid between the left and right side sills, and the central region in the vehicle width direction is connected to the battery cross-member provided below with a fastening member interposed therebetween. In addition, seatbelt anchors for supporting anchor belts of seatbelt devices are fixed to the vehicle body-side cross-member.

Moreover, as another example of vehicle body substructures, a structure in which energy absorption members are provided inside side sills, a battery pack is provided below a floor panel, and a battery cross-member is provided inside the battery pack is known. A battery is accommodated in the battery pack.

According to the vehicle body substructure, an impact load input laterally to a vehicle can be absorbed by the energy absorption member, and the battery cross-member can withstand the remaining load. Accordingly, the battery pack (that is, the battery) can be protected from an impact load input laterally to the vehicle.

Incidentally, in a sedan which is a type of vehicle, lower end portions of side sills are disposed substantially at the same height as the minimum ground clearance dimension. Therefore, a lower surface (that is, a bottom portion) of the battery pack is disposed substantially at the same ground clearance dimension as that of the lower end portions of the side sills.

Since the lower surface of the battery pack is disposed substantially at the same ground clearance dimension as that of the lower end portions of the side sills, the battery pack can be concealed such that it cannot be seen from the outside of the vehicle.

In addition, since the lower surface of the battery pack is disposed substantially at the same ground clearance dimension as that of the lower end portions of the side sills, an impact load input laterally to the vehicle is absorbed by the energy absorption member inside the side sill, and then the battery cross-member can withstand the remaining load. Accordingly, the battery pack (that is, the battery) can be protected from an impact load input laterally to the vehicle (for example, refer to Patent Document 1).

RELATED ART DOCUMENT

Patent Document

Patent Document 1: Specification of U.S. Pat. No. 8,702,161
Patent Document 2: Japanese Patent No. 5880086
Patent Document 3: Specification of U.S. Pat. No. 8,336,658

SUMMARY

Problems to be Solved by the Invention

However, in a vehicle body substructure of Patent Document 1, side sills are increased in height. Thus, upper portions of the side sills are positioned above a floor panel. Therefore, the side sills become a hindrance when an occupant boards and alights, so that it is difficult to favorably ensure boarding/alighting properties for an occupant.

In addition, since the side sills are increased in height, reduction of the weights of the side sills (that is, the weight of the vehicle body) is impeded.

Therefore, an object of the present invention is to provide a vehicle body substructure in which an underfloor mounting component can be protected from an impact load input laterally to a vehicle in a state where boarding/alighting properties for an occupant are ensured favorably.

In addition, in a substructure body disclosed in Patent Document 3, since an upper member and a lower member are constituted of thick metal extrusion molded articles, a sufficient rigidity for receiving a lateral impact load to a vehicle body can be ensured in a relatively easy manner. However, when a main portion of a battery cross-member is constituted of an extrusion molded article as in the substructure body disclosed in Patent Document 3, there is a concern that the manufacturing cost may increase.

Therefore, another object of the present invention is to provide a substructure body of a vehicle in which while a recessed portion allowing communication in a front-rear direction is constituted substantially in a central region of a battery cross-member in a vehicle width direction, a sufficient rigidity in the vehicle width direction can be ensured without causing increase in manufacturing cost.

In the substructure body of a vehicle disclosed in Patent Document 3, the battery cross-member is formed to have a longitudinally rectangular cross section, and a lower end thereof is welded and fixed to an upper surface of a bottom wall of a battery case. Therefore, when a significant load in the front-rear direction is input to a vehicle body-side cross-member through a seatbelt anchor and the load is transmitted to the upper portion of the battery cross-member via a fastening member, there is a concern that the battery cross-member may fall forward or rearward due to a moment acting on the battery cross-member.

Therefore, another object of the present invention is to provide a substructure body of a vehicle in which falling of the battery cross-member in the front-rear direction is suppressed when a load in the front-rear direction is input from a vehicle body-side cross-member to the battery cross-member, and a high support rigidity of the vehicle body-side cross-member can be maintained.

Incidentally, a sport utility vehicle (SUV) is known as a type of vehicle. In an SUV, side sills are provided at positions higher than those of sedan-type vehicles. Thus, when a battery pack is mounted in an SUV, a lower surface of the battery pack can be disposed below the side sills. Since the lower surface of the battery pack is disposed below the side sills, the battery pack can be increased in size.

However, when the lower surface of the battery pack is disposed below the side sills, a lower portion of the battery cross-member is provided below the side sills. Thus, an impact load input laterally to the vehicle is unlikely to be transmitted to the lower portion of the battery cross-member. Accordingly, it is difficult for the lower portion of the battery cross-member to withstand the impact load, and therefore a device for protecting the battery pack (that is, an underfloor mounting component) from an impact load is required.

Therefore, another object of the present invention is to provide a vehicle body substructure in which an underfloor mounting component can be protected from an impact load input laterally to the vehicle in a state where the lower surface of the battery pack is disposed below the side sills.

Means for Solving the Problem

As means for solving the foregoing problems, aspects of the present invention have the following constitutions.

(1) A vehicle body substructure according to an aspect of the present invention includes side sill load transmitting members that are provided inside each of side sills, a floor cross-member that is provided on one of an upper surface and a lower surface of a floor panel laid between the side sills and has extending portions extending toward upper portions of the side sill load transmitting members, an underfloor mounting component that is provided below the floor panel and includes an underfloor cross-member, underfloor frames that are attached to lower portions of the underfloor mounting component and the side sills, and underfloor load transmitting members that are provided in the underfloor frames and face the underfloor cross-member. The underfloor load transmitting member has an upper half portion which faces a lower portion of the side sill load transmitting member, and a lower half portion which is fixed to a part of the underfloor frame attached to a lower portion of the side sill.

In the vehicle body substructure according to (1) of the present invention, the side sill load transmitting members are provided inside each of the side sills. The extending portions of the floor cross-member extend toward the upper portions of the side sill load transmitting members. In addition, the underfloor load transmitting members face the underfloor cross-member. The upper half portion of the underfloor load transmitting member faces the lower portion of the side sill load transmitting member. Moreover, the lower half portion of the underfloor load transmitting member is connected to the lower portion of the side sill with the underfloor frame interposed therebetween.

Thus, when an impact load is input laterally to a vehicle, a part of the impact load is transferred to the floor cross-member as a first load path via the upper portion of the side sill load transmitting member. In addition, a part of the remaining impact load is transferred to the underfloor cross-member as a second load path via the lower portion of the side sill load transmitting member and the upper half portion of the underfloor load transmitting member.

Moreover, the remaining impact load is transferred to the underfloor cross-member as a third load path via the lower portion of the side sill, the underfloor frame, and the lower half portion of the underfloor load transmitting member.

In this manner, an impact load input laterally to the vehicle can be dispersed and transmitted via transmission paths such as the first load path, the second load path, and the third load path. Thus, the floor cross-member and the underfloor cross-member can withstand an impact load. Accordingly, falling deformation of side walls of the underfloor mounting component can be suppressed, and the underfloor mounting component can be protected from an impact load.

In addition, since an impact load input laterally to the vehicle is dispersed and transmitted through the first to third load paths, there is no need to increase the heights of the side sills and provide the side sill load transmitting members inside the side sills. Accordingly, the side sills do not become a hindrance when an occupant boards and alights, so that boarding/alighting properties for an occupant can be ensured favorably.

In addition, since there is no need to increase the heights of the side sills, increase in weight of the side sills (that is, weight of the vehicle body) can be suppressed.

(2) In the vehicle body substructure according to (1), the underfloor cross-member may have left and right side portion members which are disposed on left and right sides in a vehicle width direction, and a central member which is disposed substantially at a center in the vehicle width direction. Cross sections of the left and right side portion members and the central member may be formed to be a substantially hat-shaped cross section. An upper surface of the central member may be formed lower than upper surfaces of the left and right side portion members. The upper surface of the central member and end portions of the left and right side portion members on inner sides in the vehicle width direction may constitute a recessed portion which allows communication in a front-rear direction of a vehicle body. Each of the left and right side portion members may be coupled to the floor cross-member thereabove and may be coupled to the central member with respect to the floor cross-member in a vicinity of a part below a coupling portion.

In the vehicle body substructure according to (2) of the present invention, a battery cross-member is constituted of the left and right side portion members and the central member as main elements having relatively simple shapes. Therefore, the left and right side portion members and the central member can be easily formed of press-formed articles or the like. In addition, since the upper surface of the central member and the end portions of the left and right side portion members constitute the recessed portion, the recessed portion can be utilized as an insertion groove for a distribution cable or the like.

In addition, since the left and right side portion members are coupled to the central member in the vicinity of a part below the coupling portion with respect to the floor cross-member, when an impact load is input laterally to the side portion member through the side sill of the vehicle body, the input load can be dispersed to and supported by the floor cross-member and the central member. Therefore, when this constitution is employed, while a battery cross-member which can be manufactured at low cost is employed, bending of the battery cross-member in a central region can be suppressed when an impact load is input from the side sills.

(3) In the vehicle body substructure according to (1), the underfloor cross-member may be formed to have an inverted T-shaped cross section having a member main body portion which stands upright and of which an upper portion is coupled to the floor cross-member using a fastening member, a forward protruding seat which protrudes forward from a lower edge of the member main body portion, and a rearward protruding seat which protrudes rearward from the lower edge of the member main body portion. The forward protruding seat and the rearward protruding seat may be coupled to a bottom wall of a battery case.

In the vehicle body substructure according to (3) of the present invention, when a load in the front-rear direction is input to a vehicle body-side cross-member, the load is input to an upper portion of the member main body portion of the battery cross-member via the fastening member. Accordingly, a moment in a direction tilting forward and rearward acts on the member main body portion. Meanwhile, the forward protruding seat and the rearward protruding seat extend forward and rearward in the member main body portion, and the protruding seats are coupled to the bottom wall of the battery case. Therefore, falling of the member main body is suppressed by the forward protruding seat and the rearward protruding seat. As a result, the vehicle body-side cross-member is supported with a high rigidity via the member main body and the fastening member.

(4) The vehicle body substructure according to (1) may further include frame portions that are disposed on outer sides of the underfloor mounting component and face inner corner portions. The underfloor mounting component may include the underfloor cross-member which faces the frame portions. The frame portion may include an engagement portion which confronts the inner corner portion, and an inclination portion which extends in a manner inclining upward from a lower surface side of the underfloor mounting component toward a lower end portion of a side sill flange such that an imaginary extension line intersects the side sill flange.

In the vehicle body substructure according to (4) of the present invention, the side sill flange of the side sill extends downward from the outer side of the inner corner portion in the vehicle width direction. In addition, the inclination portion of the frame portion extends in a manner inclining upward from the lower surface side of the underfloor mounting component toward the lower end portion of the side sill flange, and the imaginary extension line of the inclination portion intersects the side sill flange. Thus, the inclination portion can be concealed by the side sill flange such that it is unlikely to be viewed from the outside of the vehicle. Accordingly, a large-sized underfloor mounting component in which the lower surface of the underfloor mounting component is disposed below the side sills can be mounted in a vehicle without affecting the appearance of the vehicle.

In addition, since the inclination portion is formed in the frame portion, a part of an impact load input laterally to the side sill of the vehicle can be transferred to a lower portion of the underfloor cross-member as a so-called offset load via the frame portion.

Moreover, the upper portion of the underfloor cross-member faces the side sills. That is, a part of an impact load input laterally to the side sill of the vehicle can be transferred to the upper portion of the underfloor cross-member.

Thus, an impact load input laterally to the side sill of the vehicle can be dispersed and transferred to the upper portion and the lower portion of the underfloor cross-member. Accordingly, the underfloor cross-member can withstand an impact load. As a result, a large-sized underfloor mounting component in which the lower surface of the underfloor mounting component is disposed below the side sills can be protected from an impact load.

(5) In the vehicle body substructure according to (1), the floor cross-member may be provided on the upper surface of the floor panel. The extending portion may extend with a downward slope to the side sill. A gusset laid at an interval from the extending portion may be provided between the lower surface of the floor panel and an inside wall of the side sill.

In the vehicle body substructure according to (5) of the present invention, the extending portion of the floor cross-member extends with a downward slope to the side sill. Moreover, the gusset is laid between the lower surface of the floor panel and the inside wall of the side sill, and the gusset is provided at an interval from the extending portion. Thus, substantially the same cross section as a cross section of the floor cross-member can be formed by the extending portion and the gusset. In addition, a cross section formed by the extending portion and the gusset can be a cross section having substantially the same size as that of the floor cross-member.

Accordingly, an impact load input laterally to the vehicle can be transferred favorably to the floor cross-member by the extending portion and the gusset, and the first load path can be ensured.

Moreover, since the floor cross-member is provided on the upper surface of the floor panel, the floor cross-member can be removed from below the floor panel. Accordingly, the volume of a mounting component provided below the floor panel can be increased.

(6) In the vehicle body substructure according to (1) or (5), the upper half portion of the underfloor load transmitting member may be disposed at a same height as the side sill load transmitting member. The lower half portion of the underfloor load transmitting member may be disposed at a same height as a part of the underfloor frame attached to the lower portion of the side sill. The upper half portion and the lower half portion may be fixed to the underfloor frame.

In the vehicle body substructure according to (6) of the present invention, the upper half portion of the underfloor load transmitting member is fixed, and the upper half portion is disposed at the same height as the side sill load transmitting member. Thus, the second load path transmitting an impact load from the side sill load transmitting member to the upper half portion of the underfloor load transmitting member can be ensured.

In addition, the lower half portion of the underfloor load transmitting member is fixed, and the lower half portion is disposed at the same height as a part of the underfloor frame attached to the lower portion of the side sill. Thus, the third load path transmitting an impact load from a part of the underfloor frame attached to the lower portion of the side sill to the lower half portion of the underfloor load transmitting member can be ensured.

Accordingly, an impact load input laterally to the vehicle can be dispersed reliably to the underfloor cross-member via the second load path and the third load path.

(7) In the vehicle body substructure according to any one of (1), (5), and (6), the underfloor frame may have a frame inside wall portion which faces the underfloor mounting component, and a frame extension portion which extends from the frame inside wall portion along a bottom portion of the underfloor mounting component. The underfloor cross-member may be disposed inside the underfloor mounting component. The underfloor cross-member may be formed to have a strut portion which rises from the bottom portion of the underfloor mounting component and of which end portions facing the upper half portion of the underfloor load transmitting member are fixed to side walls of the underfloor mounting component, and a seat portion which protrudes along the bottom portion from the strut portion and is fixed to the frame extension portion with the bottom portion interposed therebetween.

In the vehicle body substructure according to (7) of the present invention, the end portions of the strut portion of the underfloor cross-member are fixed to the side walls of the underfloor mounting component. Thus, the second load path transmitting an impact load from the upper half portion of the underfloor load transmitting member to the strut portion of the underfloor cross-member can be ensured.

In addition, the seat portion of the underfloor cross-member is fixed to the frame extension portion with the bottom portion interposed therebetween. Thus, the third load path transmitting an impact load from the frame extension portion (that is, the underfloor frame) to the seat portion of the underfloor cross-member can be ensured. Accordingly, an impact load input laterally to the vehicle can be dispersed reliably to the underfloor cross-member via the second load path and the third load path.

(8) In the vehicle body substructure according to (7), the underfloor mounting component may include traverse members which extend along the seat portion in a state of being fixed to an outer surface of the bottom portion and have a bead projecting toward the bottom portion. The seat portion may be fixed in a state of overlapping the bottom portion and the traverse members of the underfloor mounting component.

In the vehicle body substructure according to (8) of the present invention, the seat portion of the underfloor cross-member is fixed in a state of overlapping the bottom portion of the underfloor mounting component and the traverse member. In addition, the bead is formed in the traverse member. A cross-sectional strength of the traverse member can be enhanced by the bead. Thus, the seat portion of the underfloor cross-member can be reinforced firmly by the traverse member. Accordingly, the efficiency of transmitting an impact load in the third load path can be improved.

(9) In the vehicle body substructure according to (8), the underfloor frame may have an attachment apex portion which is attached to the lower portion of the side sill, an attachment outside wall portion which extends downward from the attachment apex portion, an attachment bottom portion which extends in a same plane as the frame extension portion from the attachment outside wall portion to the frame extension portion, and a connection portion which is offset downward from the attachment bottom portion and is fixed to the frame extension portion. The underfloor frame may be formed to have a U-shaped cross section by the attachment apex portion, the attachment outside wall portion, and the attachment bottom portion.

In the vehicle body substructure according to (9) of the present invention, the attachment bottom portion of the underfloor frame extends in the same plane as the frame extension portion. Thus, the attachment bottom portion of the underfloor frame extends linearly with the extension portion. Accordingly, an impact load can be transmitted linearly from the attachment bottom portion to the frame extension portion, so that transmission efficiency of the third load path can be improved.

(10) In the vehicle body substructure according to (8) or (9), the underfloor frames may be provided in the left and right side walls of the underfloor mounting component. The seat portion may be provided between the left and right underfloor frames in a connected state in the vehicle width direction. The traverse members may be provided to extend in the vehicle width direction on the left and right sides at an interval from the center in the vehicle width direction. A longitudinal member which is disposed between the traverse members on the left and right sides, extends in the front-rear direction of the vehicle body, and is fixed to the bottom portion of the underfloor mounting component may be provided.

In the vehicle body substructure according to (10) of the present invention, the bottom portion of the underfloor mounting component includes the seat portion (that is, the underfloor cross-member) and the traverse members. Accordingly, the seat portion (underfloor cross-member) and the traverse members can withstand an impact load input laterally to the vehicle.

In addition, the bottom portion of the underfloor mounting component includes the longitudinal member. Accordingly, the longitudinal member can withstand an impact load input in the front-rear direction of the vehicle.

Moreover, since the bottom portion of the underfloor mounting component includes the traverse members and the longitudinal member, the strength of the underfloor mounting component can be enhanced. Accordingly, the underfloor mounting component can be increased in size. For example, when a battery pack is applied as the underfloor mounting component, the volume for accommodating a battery can be increased by increasing the size of the battery pack.

(11) In the vehicle body substructure according to (2), a pair of partition wall members individually fixed to at least three surfaces such as a front wall, an upper wall, and a rear wall of the substantially hat-shaped cross section of the side portion member may be provided in the left and right side portion members. The pair of partition wall members may be provided at positions in front of and behind the coupling portion with respect to the floor cross-member in an extending direction of the side portion member.

In the vehicle body substructure according to (11) of the present invention, since cross sections at the positions in front of and behind the coupling portion with respect to the floor cross-member of each of the side portion members are reinforced firmly by the partition wall member, when an impact load is input laterally to the side portion member of the vehicle body, crushing of a cross section of the side portion member in the vicinity of the coupling portion with respect to the floor cross-member can be suppressed.

(12) In the vehicle body substructure according to (11), the central member may be coupled to the left and right side portion members in regions below the partition wall members.

In the vehicle body substructure according to (12) of the present invention, since a closed cross section constituted by the central member and the left and right side portion members coupled to each other is reinforced internally by each of the partition wall members, crushing of a cross section of the side portion member can be suppressed more effectively.

(13) In the vehicle body substructure according to (12), a stud bolt fastened to the upper wall of the side portion member may be used for the coupling portions of the left and right side portion members with respect to the floor cross-member. The pair of partition wall members may be provided in front of and behind a protruding position of the stud bolt in the extending direction of the side portion member.

In the vehicle body substructure according to (13) of the present invention, the floor cross-member and the left and right side portion members separated from each other in an up-down direction can be easily coupled to each other using the stud bolt. In addition, crushing of a cross section in fastening portions of the stud bolts of the left and right side portion members is suppressed by the closed cross section formed by the central member and the side portion members, and the partition wall members.

(14) In the vehicle body substructure according to (13), a battery and the underfloor cross-member may be disposed inside the battery case. The battery case may include a case main body which has an open upper side, and a case cover which blocks an opening of the case main body. The stud bolt may have a screw portion which protrudes upward from the case cover and is fastened and fixed to the floor cross-member side due to the screw portion. A body portion of the stud bolt may be held in a penetration hole of the case cover with an elastic seal member interposed therebetween.

In the vehicle body substructure according to (14) of the present invention, since the body portion of the stud bolt is held in the penetration hole of the case cover with the elastic seal member interposed therebetween, the position and the direction of the screw portion protruding upward from the case cover can be adjusted finely at the time of work of fastening the floor cross-member to the stud bolt. Therefore, when this constitution is employed, workability of fastening the floor cross-member to the stud bolt becomes favorable. In addition, infiltration of water into the battery case through the penetration hole of the case cover can be suppressed by the elastic seal member.

(15) In the vehicle body substructure according to (14), a bracket having an insertion hole may be attached to an inside of the floor cross-member, in which a work hole facing the insertion hole is provided in an upper wall. A nut may be fastened and fixed to the screw portion of the stud bolt protruding upward from the insertion hole, through the work hole.

In the vehicle body substructure according to (15) of the present invention, the rigidity of the floor cross-member is enhanced by the bracket. In addition, since the work hole of the bracket facing the insertion hole is provided in the floor cross-member, work of tightening the nut to the screw portion of the stud bolt can be performed easily through the work hole.

(16) In the vehicle body substructure according to any one of (2) and (11) to (15), auxiliary partition wall members substantially blocking gaps between the lower surfaces of the side portion members and the upper surface of the central member may be coupled to end edges of the left and right side portion members on the inner sides in the vehicle width direction and the central member.

In the vehicle body substructure according to (16) of the present invention, crushing of a cross section at the end edge of each of the left and right side portion members on the inner sides in the vehicle width direction can be suppressed by the auxiliary partition wall member, so that the rigidity of the battery cross-member can be further enhanced. In addition, since the gap between the end edge of each of the left and right side portion members on the inner sides in the vehicle width direction and the central member is substantially blocked by the auxiliary partition wall member, entry of a foreign substance into the side portion member from the end portion of each of the left and right side portion members on the inner sides in the vehicle width direction can be suppressed.

(17) In the vehicle body substructure according to any one of (2) and (11) to (16), the underfloor cross-member may include a forward protruding seat which protrudes forward from a lower edge of a front wall, and a rearward protruding seat which protrudes rearward from a lower edge of a rear wall. The forward protruding seat and the rearward protruding seat may be disposed on an upper surface side of a bottom wall of a battery case, and a lower surface reinforcement member may be disposed on a lower surface side of the bottom wall. The forward protruding seat and the rearward protruding seat may be coupled to the lower surface reinforcement member in a state where the bottom wall is sandwiched therebetween.

In the vehicle body substructure according to (17) of the present invention, since the forward protruding seat and the rearward protruding seat of the battery cross-member are coupled to the lower surface reinforcement member in a state where the bottom wall of the battery case is sandwiched therebetween, front and rear lower ends of the battery cross-member can be supported by the battery case with a high rigidity.

(18) In the vehicle body substructure according to (17), the lower surface reinforcement member may be coupled to the lower surface of the bottom wall in a manner extending substantially in the vehicle width direction. An alternative lower surface reinforcement member extending substantially in the front-rear direction of the vehicle body may be also coupled to the lower surface of the bottom wall.

In the vehicle body substructure according to (18) of the present invention, since the bottom wall of the battery case is reinforced by the lower surface reinforcement member extending substantially in the vehicle width direction and the alternative lower surface reinforcement member extending substantially in the front-rear direction of the vehicle body, the rigidity of the bottom wall of the battery case in its entirety can be enhanced.

(19) The vehicle body substructure according to any one of (2) and (11) to (18) may further include a load transmitting plate that is laid across the upper surfaces of the left and right side portion members.

In the vehicle body substructure according to (19) of the present invention, the bending rigidity in the central region of the battery cross-member in the vehicle width direction can be enhanced efficiently by the load transmitting plate. In addition, since the bending rigidity of the battery cross-member can be enhanced efficiently by only laying the load transmitting plate across the upper surfaces of the left and right side portion members, an increase in manufacturing cost for reinforcement of the members can be suppressed.

(20) In the vehicle body substructure according to (3), the forward protruding seat and the rearward protruding seat may be disposed on an upper surface side of the bottom wall of the battery case. A lower surface reinforcement member may be disposed on a lower surface side of the bottom wall. The forward protruding seat and the rearward protruding seat may be coupled to the lower surface reinforcement member in a state where the bottom wall is sandwiched therebetween.

In the vehicle body substructure according to (20) of the present invention, since the forward protruding seat and the rearward protruding seat of the battery cross-member are integrated with the bottom wall of the battery case together with the lower surface reinforcement member, forward and rearward falling of the member main body portion of the battery cross-member can be suppressed more firmly. In addition, when this constitution is employed, members to be coupled to each other can be constituted of press-formed articles which can be manufactured at low cost, and the members can be welded and fixed to each other.

(21) In the vehicle body substructure according to (20), the lower surface reinforcement member may be constituted of a plate-shaped member of which a substantially wave-shaped cross section extends substantially in the vehicle width direction.

In the vehicle body substructure according to (21) of the present invention, since a substantially wave-shaped cross section of the plate-shaped member serving as the lower surface reinforcement member extends substantially in the vehicle width direction on the lower surface side of the bottom wall of the battery case, the rigidity of the bottom wall of the battery case can be enhanced efficiently by the plate-shaped lower surface reinforcement member.

(22) In the vehicle body substructure according to (20), the battery case may have case side walls which rise upward from left and right end portions of the bottom wall. A case frame extending substantially in the front-rear direction of the vehicle body may be coupled to an outer side of the case side wall. The case frame may have an extension piece which is disposed on the lower surface of the bottom wall of the battery case and constitutes the lower surface reinforcement member. The forward protruding seat and the rearward protruding seat may be coupled to the extension piece in a state where the bottom wall is sandwiched therebetween.

In the vehicle body substructure according to (22) of the present invention, the extension piece provided in the case frame is disposed on the lower surface of the bottom wall of the battery case, and the forward protruding seat and the rearward protruding seat of the battery cross-member are integrated with the bottom wall of the battery case and the extension piece. Accordingly, forward and rearward falling of the member main body portion of the battery cross-member is suppressed more firmly.

(23) In the vehicle body substructure according to any one of (3) and (20) to (22), the member main body portion of the underfloor cross-member may have an upper wall, a front wall which extends downward from a front portion of the upper wall, and a rear wall which extends downward from a rear portion of the upper wall. A partition wall member restricting three surfaces such as the upper wall, the front wall, and the rear wall of the member main body portion may be coupled in a vicinity of a fixing portion of the fastening member of the member main body portion.

In the vehicle body substructure according to (23) of the present invention, since the cross-sectional rigidity in the vicinity of the fixing portion of the fastening member of the member main body portion is enhanced by the partition wall member, cross-sectional deformation in the vicinity of the fixing portion of the fastening member can be suppressed efficiently. Therefore, even when the wall thickness of the member main body portion has to be reduced for weight reduction, tilting or sinking of the fastening member can be suppressed, and the floor cross-member can be supported by the battery cross-member with a high rigidity.

(24) In the vehicle body substructure according to any one of (3) and (20) to (23), the floor panel may be disposed above the battery case. The floor cross-member may include a cross-plate which has a substantially hat-shaped cross section, is joined to the upper surface of the floor panel, forms a closed cross section extending substantially in the vehicle width direction between the cross-plate and the floor panel, and has both end portions in the vehicle width direction laid between the pair of side sills, and a gusset inclination portion which has a substantially hat-shaped cross section, is laid between a lower surface in an end portion region of the floor panel in the vehicle width direction and a side surface of the side sill, and forms a closed cross section extending substantially in the vehicle width direction between the gusset inclination portion and the floor panel. An end portion region of the gusset inclination portion in the vehicle width direction and the gusset inclination portion may be formed to incline downward to a side outward in the vehicle width direction. A bracket which also serves as a cross section reinforcing portion may be internally attached in a region closer to a center of the cross-plate in the vehicle width direction. The bracket may be coupled to the member main body portion of the underfloor cross-member using the fastening member.

In the vehicle body substructure according to (24) of the present invention, since the end portion region of the cross-plate in the vehicle width direction and a gusset plate are formed to incline downward to a side outward in the vehicle width direction, a closed cross section of the central region formed by the floor panel and the cross-plate is connected to an inclined closed cross section in the end portion region formed by the cross-plate and the gusset plate. Therefore, while the central region of the vehicle body-side cross-member has a shape lifted upward with respect to the side sills, the left and right side sills can be connected to each other through a closed cross section of the vehicle body-side cross-member connected in a substantially uniform manner. In addition, when this constitution is employed, since the central region of the vehicle body-side cross-member has a shape lifted upward with respect to the side sills, the battery case disposed below the central region of the vehicle body-side cross-member can be positioned on an upper side. Therefore, a ground clearance below the battery case can be ensured easily. In addition, a cross section in the central region of the cross-plate is reinforced by the bracket which also serves as the cross section reinforcing portion, and the bracket is coupled to the battery cross-member using the fastening member. Therefore, when a load is input to the vehicle body-side cross-member, the input load can be supported by the battery cross-member in a state where cross-sectional deformation of the cross-plate is suppressed.

(25) In the vehicle body substructure according to (24), a battery and the underfloor cross-member may be disposed inside the battery case. The battery case may include a case main body which has an open upper side, and a case cover which blocks an opening of the case main body. The fastening member may be a stud bolt of which both end portions are fastened to the bracket and the underfloor cross-member. A body portion of the stud bolt may be held in a penetration hole of the case cover with an elastic seal member interposed therebetween.

In the vehicle body substructure according to (25) of the present invention, since the body portion of the stud bolt is held in the penetration hole of the case cover with the elastic seal member interposed therebetween, when the stud bolt and the vehicle body-side cross-member are fastened and fixed to each other, the position and the direction of the screw portion protruding upward from the case cover can be adjusted finely. Therefore, when this constitution is employed, workability of fastening the vehicle body-side cross-member to the stud bolt becomes favorable. In addition, since the penetration hole of the case cover is blocked by the elastic seal member, infiltration of water into the battery case through the penetration hole can be prevented. In this case, vibration of the case cover can be further suppressed by the elastic seal member.

In addition, when the upper surface of the elastic seal member abuts the lower surface of a surrounding area of the penetration hole of the floor panel, infiltration of water into a vehicle cabin through the penetration hole of the floor panel can also be prevented. Moreover, in this case, vibration of the floor panel can be suppressed by the elastic seal member.

(26) In the vehicle body substructure according to (22), an attachment frame connecting the case frame to a lower surface of the side sill may be coupled to the case frame. A frame extension piece overlapping a lower surface of the extension piece of the case frame may extend in the attachment frame. The frame extension piece may be coupled to the bottom wall of the battery case together with the extension piece.

In the vehicle body substructure according to (26) of the present invention, since the frame extension piece of the attachment frame and an extension wall of the case frame are coupled to the bottom wall of the battery case in a three-layered manner, the attachment frame and the case frame can be coupled to each other more firmly, and the rigidity of the bottom wall of the battery case can also be enhanced.

(27) In the vehicle body substructure according to any one of (3) and (20) to (26), the member main body portion of the underfloor cross-member may have an upper wall, a front wall which extends downward from a front portion of the upper wall, and a rear wall which extends downward from a rear portion of the upper wall. A reinforcement plate which has a substantially U-shaped cross section and is joined to the upper wall, the front wall, and the rear wall may be disposed inside the member main body portion.

In the vehicle body substructure according to (27) of the present invention, the rigidity of the member main body portion to which the fastening member is fixed can be enhanced easily with a simple constitution. In addition, the reinforcement plate can be formed of a press-formed article which can be manufactured at low cost. Therefore, the product cost can be reduced.

(28) In the vehicle body substructure according to any one of (3) and (20) to (27), the forward protruding seat and the rearward protruding seat may include a pedestal portion of which a lower surface projecting upward communicates with an internal space of the member main body portion and of which an upper surface is substantially flat.

In the vehicle body substructure according to (28) of the present invention, the upper surface of each of the pedestal portions provided in the forward protruding seat and the rearward protruding seat can be utilized as a battery support portion or the like. In addition, since the lower surface sides of the forward protruding seat and the rearward protruding seat can communicate widely with the internal space of the member main body portion due to the pedestal portions standing upright, an electrodeposition coating solution for rust prevention can be applied easily everywhere inside the battery cross-member at the time of manufacturing.

(29) In the vehicle body substructure according to (4), the frame portion may be provided in an outer circumferential wall of the underfloor mounting component and may be formed to have an L-shaped closed cross section by the engagement portion and the inclination portion.

In the vehicle body substructure according to (29) of the present invention, the engagement portion confronts the inner corner portion. Moreover, the frame portion is formed to have an L-shaped closed cross section by the engagement portion and the inclination portion. Thus, the engagement portion is formed firmly in the frame portion. That is, the inner corner portion (that is, the side sill) can be received reliably by the frame portion in which the engagement portion is formed. Accordingly, an impact load input to the side sill can be transferred reliably to the underfloor cross-member via the frame portion. As a result, the underfloor cross-member can withstand the transferred impact load.

(30) In the vehicle body substructure according to (4) or (29), the side sill may include a side sill outer on the outer side in the vehicle width direction, a side sill inner which is joined to the side sill outer from the inner side in the vehicle width direction and forms a closed cross section together with the side sill outer, and a first energy absorption member which is disposed in the closed cross section and is attached to the side sill outer.

In the vehicle body substructure according to (30) of the present invention, the first energy absorption member is attached to the side sill outer. Thus, the degree of freedom of the shape of the side sill inner can be enhanced, so that the inner corner portion can be formed easily in the side sill inner. Since this inner corner portion is formed to have a right-angled shape, when an impact load is input laterally to the vehicle, the inner corner portion can be engaged favorably with the engagement portion.

Accordingly, a part of an impact load input laterally to the side sill of the vehicle can be transferred reliably to the lower portion of the underfloor cross-member as a so-called offset load via the frame portion.

(31) In the vehicle body substructure according to any one of (4), (29), and (30), the frame portion may include a second energy absorption member disposed therein.

In the vehicle body substructure according to (31) of the present invention, the second energy absorption member is included inside the frame portion. Thus, the second energy absorption member can be crushed by an impact load input laterally to the vehicle. Since the second energy absorption member is crushed by an impact load, the inner corner portion of the side sill can be engaged favorably with the frame portion.

Accordingly, a part of an impact load input laterally to the side sill of the vehicle can be transferred more reliably to the lower portion of the underfloor cross-member as a so-called offset load via the frame portion.

(32) In the vehicle body substructure according to any one of (4) and (29) to (31), an upper portion of the underfloor cross-member may be disposed to confront a central portion of the side sill in an up-down direction.

In the vehicle body substructure according to (32) of the present invention, the upper portion of the underfloor cross-member faces the central portion of the side sill. Accordingly, a part of an impact load input laterally to the side sill of the vehicle can be transferred to the upper portion of the underfloor cross-member as a so-called horizontal load.

Thus, an impact load input laterally to the side sill of the vehicle can be dispersed and transferred to the upper portion and the lower portion of the underfloor cross-member. Accordingly, the underfloor cross-member can withstand an impact load.

(33) In the vehicle body substructure according to any one of (4) and (29) to (32), the underfloor cross-member may include a fragile portion which is formed in an outer region on the outer side in the vehicle width direction, and a firm portion which is formed in an inner region on the inner side in the vehicle width direction.

In the vehicle body substructure according to (33) of the present invention, the fragile portion is formed in the outer region of the underfloor cross-member. Thus, an impact load input laterally to the vehicle can be absorbed by crushing the fragile portion.

Meanwhile, the firm portion is formed in the inner region of the underfloor cross-member. Thus, the firm portion can withstand a load after being absorbed by the fragile portion.

Accordingly, the floor panel can be divided into an energy absorption region on the outer side in the vehicle width direction and a protection region on the inner side in the vehicle width direction.

(34) In the vehicle body substructure according to any one of (4) and (29) to (33), the underfloor cross-member may be formed to have a hollow shape, be provided at a center in an up-down direction, and include a partitioning wall which vertically partitions the underfloor cross-member.

In the vehicle body substructure according to (34) of the present invention, the hollow underfloor cross-member is vertically partitioned by the partitioning wall. The underfloor cross-member can be divided into a cross-member upper portion and a cross-member lower portion by the partitioning wall.

Thus, a part of an impact load input laterally to the side sill of the vehicle can be transferred to the cross-member upper portion as a so-called horizontal load. In addition, a part of an impact load input laterally to the side sill of the vehicle can be transferred to the cross-member lower portion as a so-called offset load.

In this manner, a part of an impact load input laterally to the side sill of the vehicle can be transmitted in a manner divided into two paths such as the cross-member upper portion and the cross-member lower portion. As a result, the cross-member upper portion and the cross-member lower portion can favorably withstand a part of the impact load.

(35) The vehicle body substructure according to any one of (4) and (29) to (34) may further include a first floor cross-member and a second floor cross-member that extend in the vehicle width direction along the upper surface of the floor panel at an interval in a front-rear direction of a vehicle body. The first floor cross-member and the second floor cross-member may be formed to have a hat-shaped cross section by an apex portion, a pair of wall portions, a front flange, and a rear flange. The front flange and the rear flange may be joined to the upper surface of the floor panel. A seat may be supported by the first floor cross-member and the second floor cross-member. The first floor cross-member may have a first recessed portion which is recessed upward in a wall portion facing the second floor cross-member. The second floor cross-member may have a second recessed portion which is recessed upward in a wall portion facing the first floor cross-member. The floor panel may have a projection portion which projects upward along the first recessed portion and the second recessed portion.

In the vehicle body substructure according to (35) of the present invention, the seat is supported by the first floor cross-member and the second floor cross-member. That is, the first floor cross-member and the second floor cross-member is reinforced by the seat. Thus, the first recessed portion and the second recessed portion can be formed in a state where the strengths of the first floor cross-member and the second floor cross-member are ensured.

Moreover, the projection portion of the floor panel projects upward along the first recessed portion or the second recessed portion. Thus, a significant space can be ensured below the floor panel, so that the volume of the underfloor mounting component to be disposed below the floor panel can be increased.

Here, the projection portion of the floor panel is formed between the first floor cross-member and the second floor cross-member. Thus, the projection portion is positioned below the seat. For example, the projection portion is disposed on the rear side of the vehicle body with respect to feet (a part around a place where feet of an occupant are placed) of an occupant being seated in the seat. Accordingly, the projection portion can be prevented from becoming a hindrance when an occupant being seated in the seat places his/her feet.

(36) In the vehicle body substructure according to (35), the underfloor cross-member may be connected to the floor panel below the first floor cross-member and the second floor cross-member.

In the vehicle body substructure according to (36) of the present invention, the underfloor cross-member is connected to the floor panel below the first floor cross-member with a connection member interposed therebetween. Thus, the floor panel below the first floor cross-member is reinforced by the underfloor cross-member.

In addition, the underfloor cross-member is connected to the floor panel below the second floor cross-member. Thus, the floor panel below the second floor cross-member is reinforced by the underfloor cross-member.

Thus, the rigidity of the floor panel below the first floor cross-member is enhanced, and the rigidity of the floor panel below the second floor cross-member is enhanced. Accordingly, even if the floor cross-member and the underfloor cross-member partially have the fragile portion, a yield strength with respect to an impact load input laterally to the vehicle can be improved.

(37) In the vehicle body substructure according to any one of (4) and (29) to (36), the underfloor cross-member may have a recessed portion in which a downward recess is formed at the center in the vehicle width direction and may include a pipe accommodation portion which is attached to the recessed portion in a manner extending in the front-rear direction of a vehicle body and accommodates at least one of a piping and a hose.

In the vehicle body substructure according to (37) of the present invention, since the recessed portion is formed in the underfloor cross-member, the recessed portion can include the pipe accommodation portion. The pipe accommodation portion accommodates a piping, a hose, and the like.

In addition, since the recessed portion of the underfloor cross-member includes the pipe accommodation portion, the recessed portion is reinforced by the pipe accommodation portion. Thus, when a load is transmitted laterally to the underfloor cross-member of the vehicle, the pipe accommodation portion can withstand the transmitted load. Accordingly, the recessed portion can be prevented from being broken due to the transmitted load, and the underfloor cross-member can withstand the transmitted load.

Advantage of the Invention

According to the aspect of the present invention, the extending portion of the floor cross-member extends toward the upper portion of the side sill load transmitting member. In addition, the upper half portion of the underfloor load transmitting member faces the lower portion of the side sill load transmitting member. Moreover, the lower half portion of the underfloor load transmitting member is fixed to a part of the underfloor frame attached to the lower portion of the side sill.

Thus, an impact load input laterally to the vehicle can be transmitted via the transmission paths such as the first load path, the second load path, and the third load path. Accordingly, falling deformation of the side walls of the underfloor mounting component can be suppressed, and the underfloor mounting component can be protected from an impact load.

In addition, since an impact load input laterally to the vehicle is transmitted via the first to third load paths, there is no need to increase the heights of the side sills and provide the side sill load transmitting members inside the side sills. Accordingly, the side sills do not become a hindrance when an occupant boards and alights, so that boarding/alighting properties for an occupant can be ensured favorably.

In addition, the battery cross-member has the left and right side portion members and the central member having a substantially hat-shaped cross section. The upper surface of the central member is formed lower than the upper surfaces of the left and right side portion members. The recessed portion is constituted of the upper surface of the central member and the end portions of the left and right side portion members on the inner sides in the vehicle width direction. Therefore, the recessed portion can be used as an insertion groove for a distribution cable or the like, and a main portion of the battery cross-member can be constituted of a press-formed article or the like which can be manufactured at low cost.

In addition, each of the left and right side portion members of the battery cross-member is coupled to the floor cross-member thereabove and is coupled to the central member in the vicinity of a part below each of the coupling portions thereof. Therefore, while a structure in which the recessed portion allowing communication in the front-rear direction is provided substantially in a central region in the vehicle width direction is employed, a sufficient rigidity in the vehicle width direction can be ensured.

In addition, the forward protruding seat and the rearward protruding seat extend at the lower edge of the member main body portion of the battery cross-member, and the forward protruding seat and the rearward protruding seat are coupled to the bottom wall of the battery case. Therefore, when a load in the front-rear direction is input to the battery cross-member from the vehicle body-side cross-member through the fastening member, falling of the battery cross-member in the front-rear direction can be suppressed. Therefore, a support rigidity with respect to the vehicle body-side cross-member can be enhanced.

Moreover, the inclination portion is formed in the frame portion. Thus, a part of an impact load input laterally to the side sill of the vehicle can be transferred to the lower portion of the underfloor cross-member as a so-called offset load via the frame portion. In addition, the upper portion of the underfloor cross-member faces the side sill. Thus, a part of an impact load input laterally to the side sill of the vehicle can be transferred to the upper portion of the underfloor cross-member.

Accordingly, the underfloor mounting component can be protected from an impact load input laterally to the vehicle in a state where the lower surface of the battery pack is disposed below the side sills.

BRIEF DESCRIPTION OF THE DRAWINGS

FIG. 7 is a perspective view showing an outer bulkhead and an inner bulkhead of the vehicle body substructure according to the first embodiment of the present invention.

DESCRIPTION OF THE EMBODIMENTS

Figure 1:
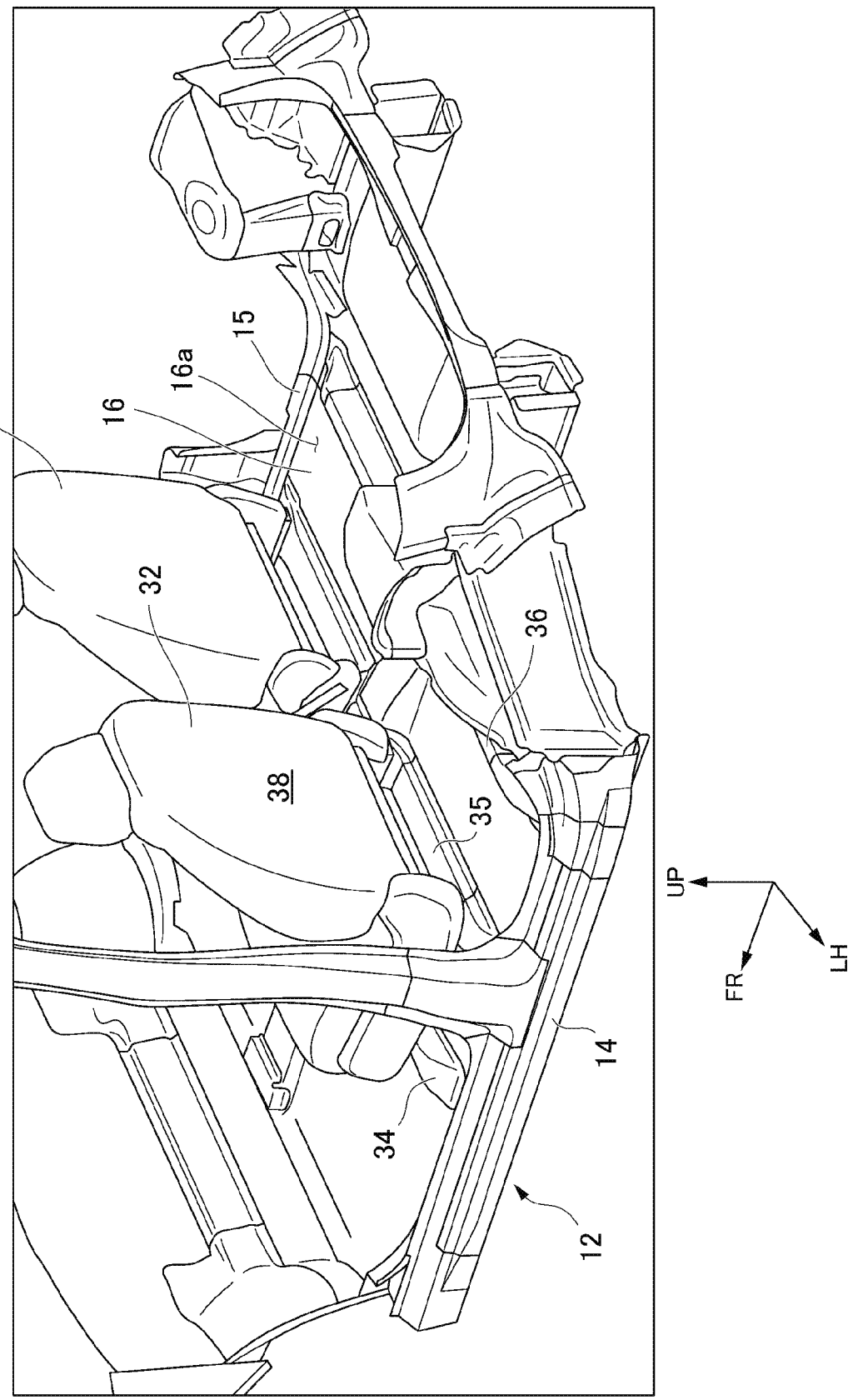
FIG. 1 is a perspective view showing a vehicle body substructure according to a first embodiment of the present invention.

A first embodiment of the present invention will be described based on the drawings. In the drawings, an arrow FR indicates a front side of a vehicle, an arrow UP indicates an upper side of the vehicle, and an arrow LH indicates a left side of the vehicle.

Figure 2:
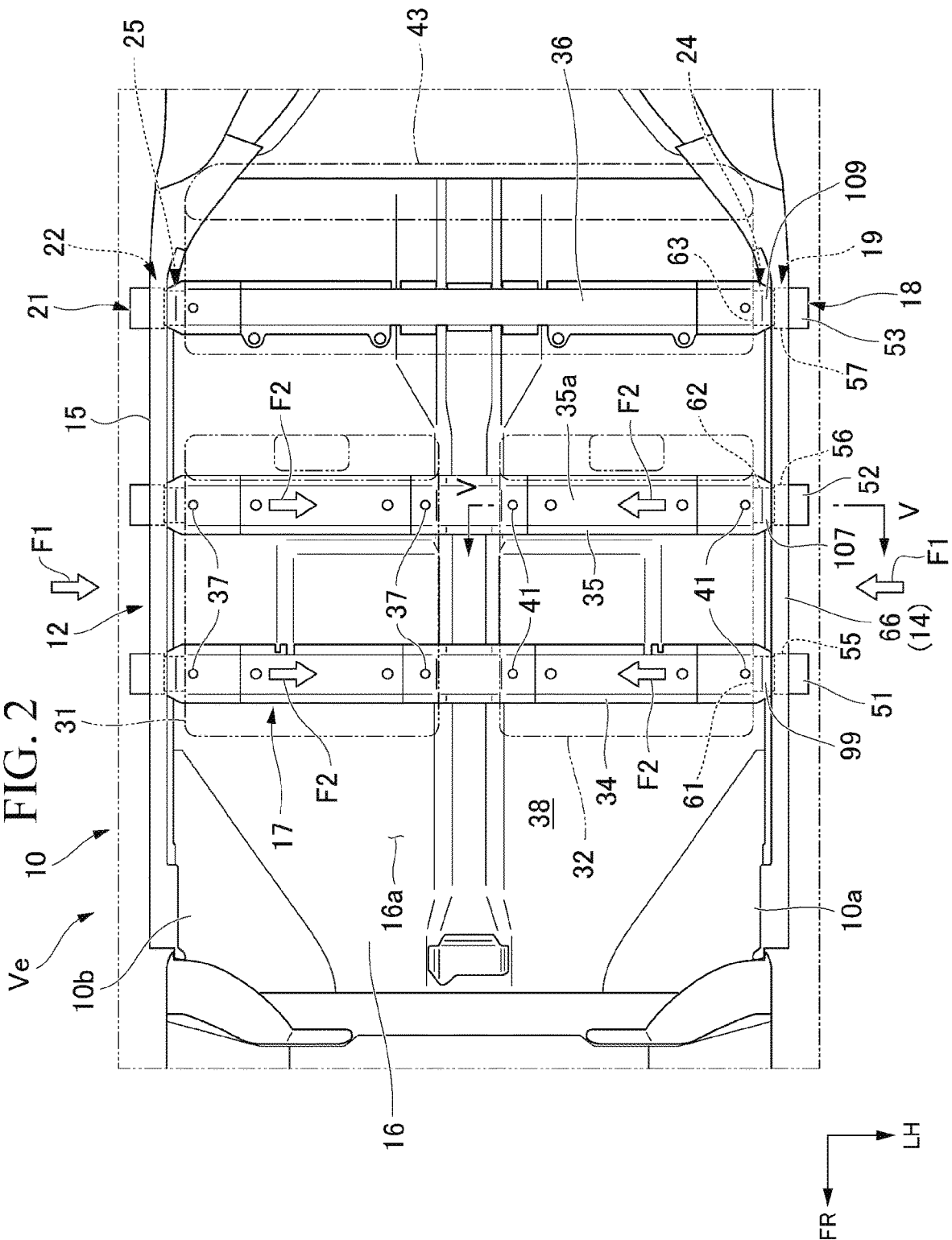
FIG. 2 is a plan view showing the vehicle body substructure according to the first embodiment of the present invention.

As shown in FIGS. 1 and 2, a vehicle body 10 includes a vehicle body substructure 12 constituting a lower portion of the vehicle body 10. The vehicle body substructure 12 includes a left side sill 14, a right side sill 15, a floor panel 16, a floor cross-member unit 17, an outer bulkhead unit 18 on the left side, an inner bulkhead unit 19 on the left side, an outer bulkhead unit 21 on the right side, an inner bulkhead unit 22 on the right side, a gusset unit 24 on the left side, a gusset unit 25 on the right side, a driver's seat 31, and a passenger seat 32.

Figure 3:
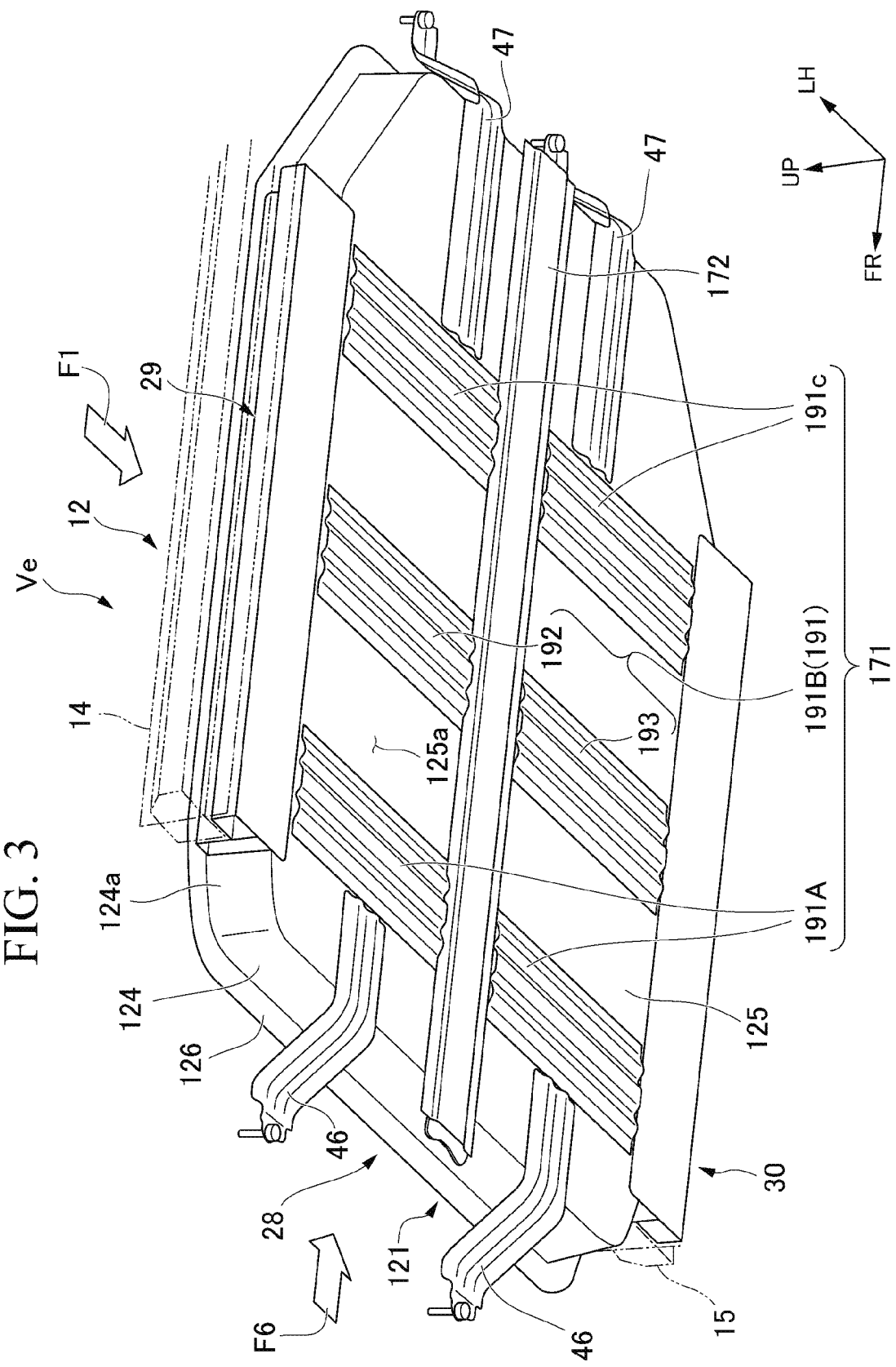
FIG. 3 is a perspective view showing a state where a battery pack of the vehicle body substructure according to the first embodiment of the present invention is viewed from below to the rear.

As shown in FIG. 3, the vehicle body substructure 12 includes a battery pack (underfloor mounting component, in-vehicle component) 28, a left battery pack frame (underfloor frame) 29, a right battery pack frame (underfloor frame) 30, a left bulkhead (underfloor load transmitting member) 152 (refer to FIG. 13), and a right bulkhead (underfloor load transmitting member) (not shown).

The vehicle body substructure 12 is constituted of members having a substantially bilateral symmetry. Therefore, hereinafter, each of constituent members on the left side will be described, and description of each of the constituent members on the right side will be omitted.

Returning to FIGS. 1 and 2, the left side sill 14 is provided in a left side portion 10a of both side portions of the vehicle body 10 and extends in a front-rear direction of a vehicle body. The right side sill 15 is provided in a right side portion 10b of both the side portions of the vehicle body 10 and extends in the front-rear direction of the vehicle body.

The floor panel 16 is disposed between the left side sill 14 and the right side sill 15. The floor panel 16 is laid between the left side sill 14 and the right side sill 15. The floor cross-member unit 17 is attached to an upper surface 16a of the floor panel 16. The floor cross-member unit 17 includes a first floor cross-member 34, a second floor cross-member 35, and a third floor cross-member 36.

The first floor cross-member 34 is disposed on a front side of the vehicle body inside a vehicle cabin 38. The first floor cross-member 34 is laid between the left side sill 14 and the right side sill 15 in a vehicle width direction.

The second floor cross-member 35 is disposed on a rear side of the first floor cross-member 34 in the vehicle body. The second floor cross-member 35 is laid between the left side sill 14 and the right side sill 15 in the vehicle width direction and extends in a manner parallel to the first floor cross-member 34.

The third floor cross-member 36 is disposed on a rear side of the second floor cross-member 35 in the vehicle body. The third floor cross-member 36 is laid between the left side sill 14 and the right side sill 15 in the vehicle width direction and extends in a manner parallel to the second floor cross-member 35.

The first floor cross-member 34, the second floor cross-member 35, and the third floor cross-member 36 are provided at intervals in the front-rear direction of the vehicle body. For example, the driver's seat 31 is attached to right half portions of the first floor cross-member 34 and the second floor cross-member 35 using fastening members such as bolts 37 and nuts. For example, the passenger seat 32 is attached to left half portions of the first floor cross-member 34 and the second floor cross-member 35 using fastening member such as bolts 41 and nuts 42 (refer to FIG. 5). In addition, a rear seat 43 is provided in the third floor cross-member 36.

In this manner, the driver's seat 31 is attached to the right half portions of the first floor cross-member 34 and the second floor cross-member 35. In addition, the passenger seat 32 is attached to the left half portions of the first floor cross-member 34 and the second floor cross-member 35. Each of the first floor cross-member 34 and the second floor cross-member 35 is laid between the left side sill 14 and the right side sill 15.

The first floor cross-member 34, the second floor cross-member 35, and the third floor cross-member 36 are members similar to each other. Thus, hereinafter, the second floor cross-member 35 will be described in detail, and detailed description of the first floor cross-member 34 and the third floor cross-member 36 will be omitted. The second floor cross-member 35 will hereinafter be abbreviated to "a floor cross-member 35".

The outer bulkhead unit 18 on the left side includes a first outer bulkhead 51, a second outer bulkhead 52, and a third outer bulkhead 53.

The first outer bulkhead 51 is disposed on an extension line of the first floor cross-member 34. The second outer bulkhead 52 is disposed on an extension line of the second floor cross-member 35. The third outer bulkhead 53 is disposed on an extension line of the third floor cross-member 36.

The first outer bulkhead 51, the second outer bulkhead 52, and the third outer bulkhead 53 are side sill load transmitting members which are attached to the left side sill 14 and can transmit a load.

The first outer bulkhead 51, the second outer bulkhead 52, and the third outer bulkhead 53 are members similar to each other. Hereinafter, the second outer bulkhead 52 will be described in detail as "an outer bulkhead 52", and detailed description of the first and third outer bulkheads 51 and 53 will be omitted.

Figure 4:
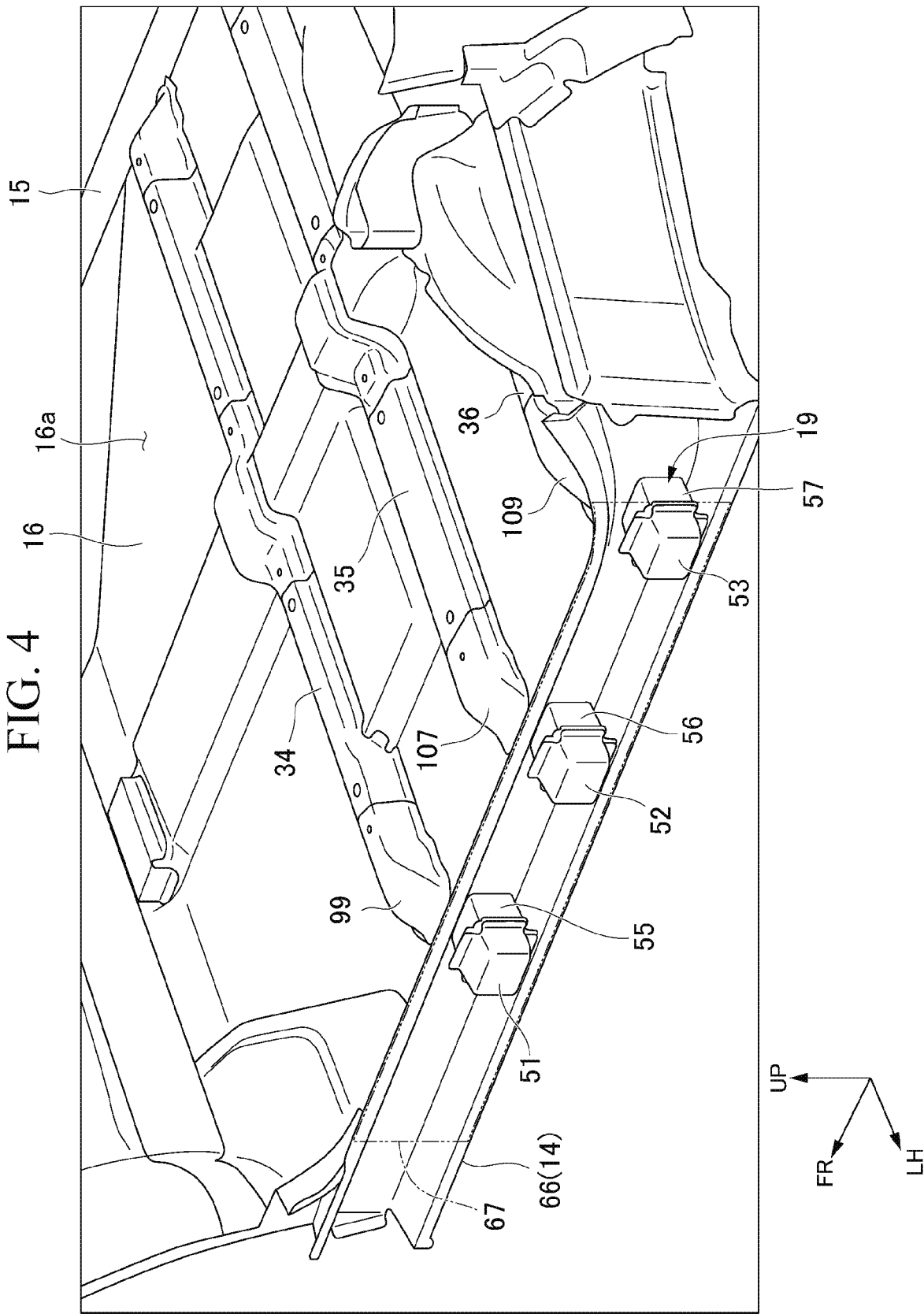
FIG. 4 is a perspective view showing a state where a seat is removed from the vehicle body substructure according to the first embodiment of the present invention.

As shown in FIG. 4, the inner bulkhead unit 19 on the left side includes a first inner bulkhead 55, a second inner bulkhead 56, and a third inner bulkhead 57.

The first inner bulkhead 55 is disposed on an extension line of the first floor cross-member 34. The second inner bulkhead 56 is disposed on an extension line of the second floor cross-member 35. The third inner bulkhead 57 is disposed on an extension line of the third floor cross-member 36.

The first inner bulkhead 55, the second inner bulkhead 56, and the third inner bulkhead 57 are side sill load transmitting members which are attached to the left side sill 14 and can transmit a load.

The first inner bulkhead 55, the second inner bulkhead 56, and the third inner bulkhead 57 are members similar to each other. Hereinafter, the second inner bulkhead 56 will be described in detail as "an inner bulkhead 56", and a detailed description of the first and third inner bulkheads 55 and 57 will be omitted.

Returning to FIG. 2, the gusset unit 24 on the left side includes a first gusset 61, a second gusset 62, and a third gusset 63.

The first gusset 61 is disposed below an inclination portion 99 on a left end portion side in the first floor cross-member 34. The second gusset 62 is disposed below an inclination portion 107 on a left end portion side in the second floor cross-member 35 (also refer to FIG. 5). The third gusset 63 is disposed below an inclination portion 109 on a left end portion side in the third floor cross-member 36.

The first gusset 61, the second gusset 62, and the third gusset 63 are members similar to each other. Hereinafter, the second gusset 62 will be described in detail as "a gusset 62", and detailed description of the first gusset 61 and the third gusset 63 will be omitted.

Figure 5:
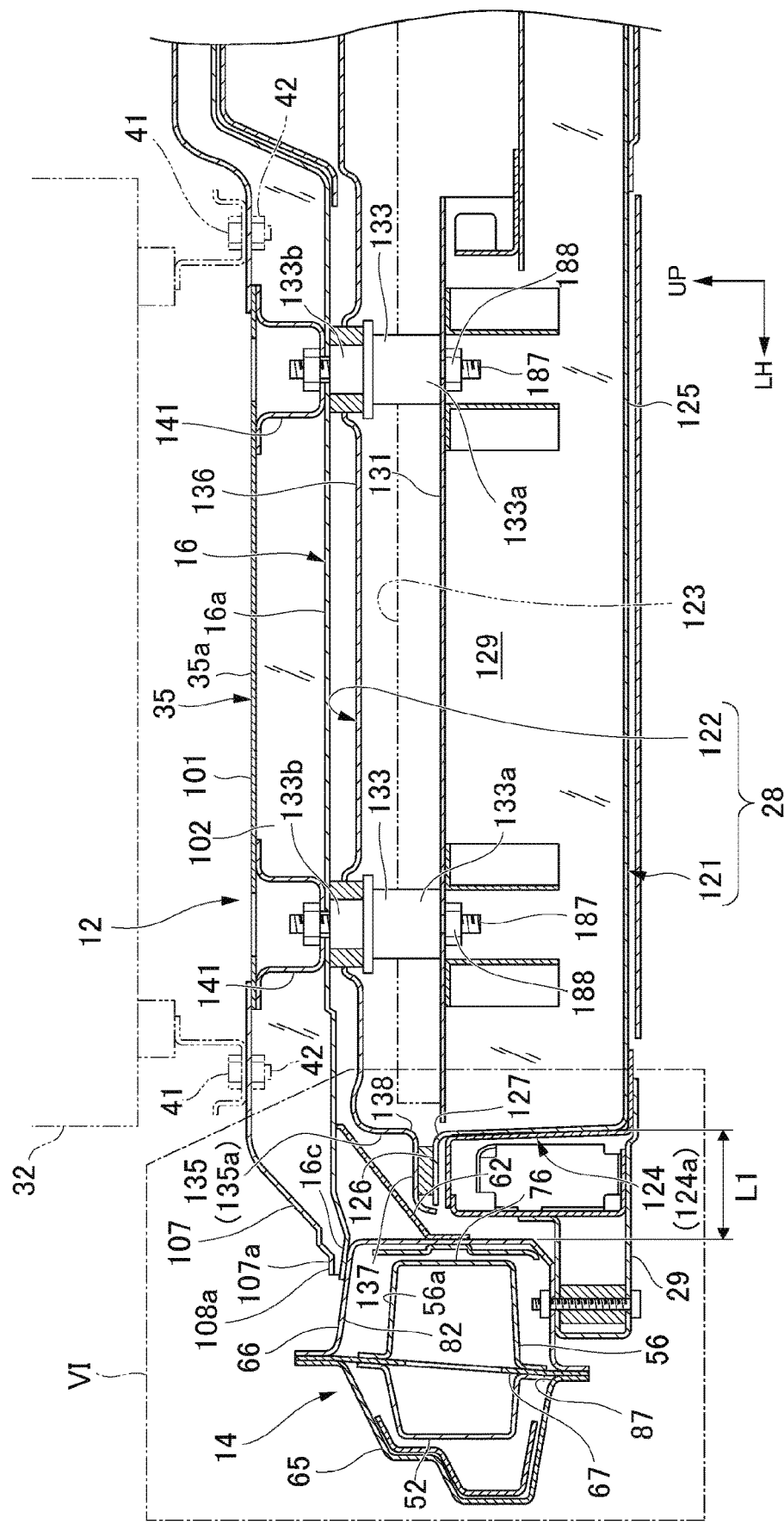
FIG. 5 is a cross-sectional view of the vehicle body substructure according to the first embodiment of the present invention cut along line V-V in FIG. 2.
Figure 6:
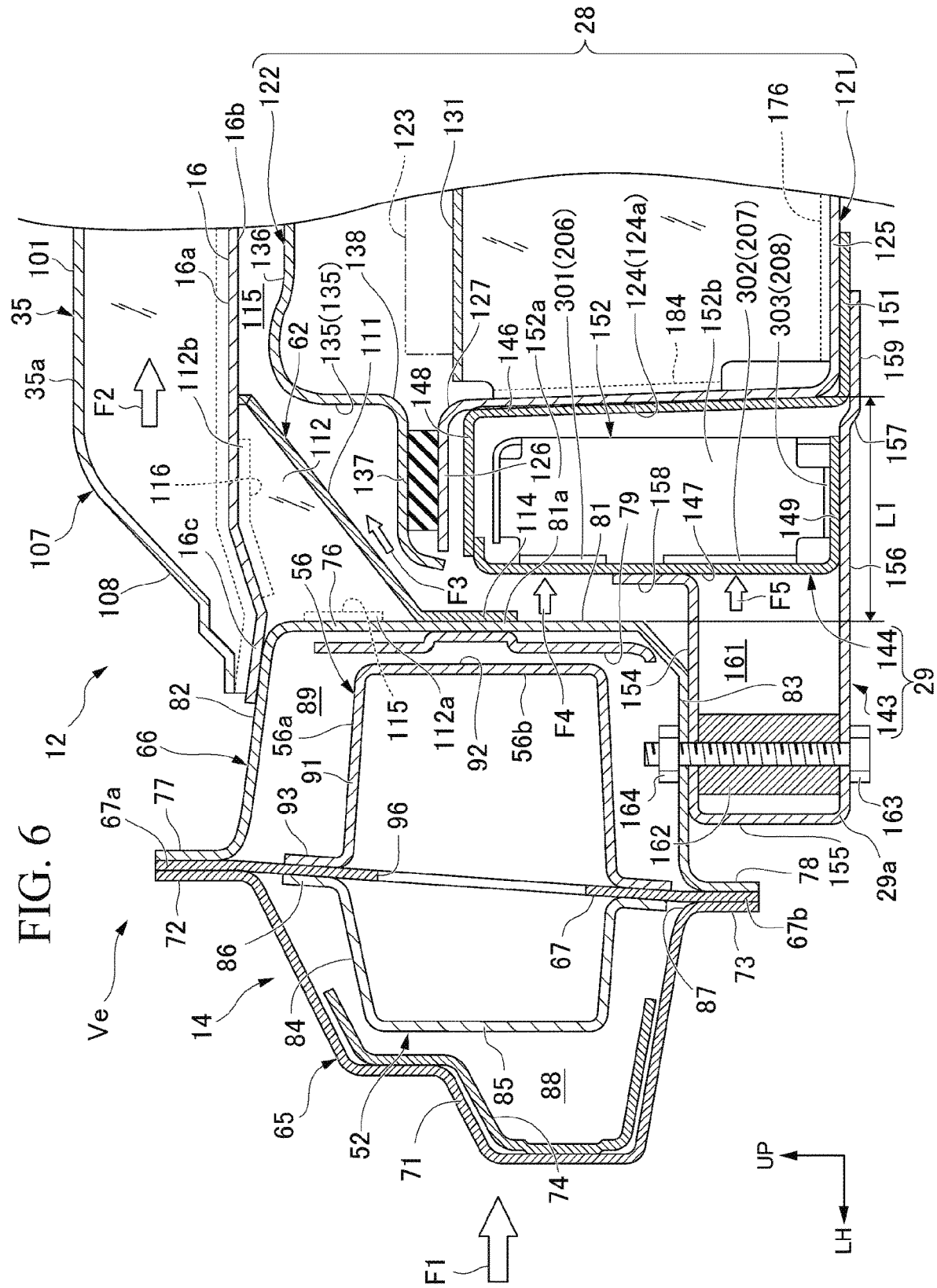
FIG. 6 is an enlarged cross-sectional view showing a VI-part in FIG. 5 in the vehicle body substructure according to the first embodiment of the present invention.

As shown in FIGS. 5 and 6, the left side sill 14 includes a side sill outer 65, a side sill inner 66, and a stiffener 67.

The side sill outer 65 is provided on an outer side in the vehicle width direction. The side sill outer 65 has an outward swelling portion 71, an upper flange 72, and a lower flange 73. The outward swelling portion 71 swells outward in the vehicle width direction from the upper flange 72 and the lower flange 73. A reinforcement member 74 is attached to an inner surface of the outward swelling portion 71. The upper flange 72 protrudes upward from an upper end of the outward swelling portion 71. The lower flange 73 protrudes downward from a lower end of the outward swelling portion 71.

The side sill inner 66 is provided on an inner side of the side sill outer 65 in the vehicle width direction. The side sill inner 66 has an inward swelling portion 76, an upper flange 77, and a lower flange 78. The inward swelling portion 76 swells inward in the vehicle width direction from the upper flange 77 and the lower flange 78. The inward swelling portion 76 is formed to have a U-shaped cross section by an inside wall 81, an upper portion 82, and a lower portion 83. A reinforcement member 79 is attached to an inner surface of the inward swelling portion 76. The upper flange 77 protrudes upward from an outer end of the upper portion 82. The lower flange 78 protrudes downward from an outer end of the lower portion 83.

The stiffener 67 is interposed between the side sill outer 65 and the side sill inner 66. The stiffener 67 is formed to have a flat plate shape and is interposed between the side sill outer 65 and the side sill inner 66. Specifically, an upper side portion 67a of the stiffener 67 is joined in a state of being sandwiched between the upper flange 72 of the side sill outer 65 and the upper flange 77 of the side sill inner 66. In addition, a lower side portion 67b of the stiffener 67 is joined in a state of being sandwiched between the lower flange 73 of the side sill outer 65 and the lower flange 78 of the side sill inner 66. That is, the stiffener 67 is clamped between the side sill outer 65 and the side sill inner 66.

The left side sill 14 is formed to have a rectangular frame-like exterior shape by the side sill outer 65 and the side sill inner 66. Since the upper side portion 67a of the stiffener 67 is interposed between the upper flanges 72 and 77, and the lower side portion 67b of the stiffener 67 is interposed between the lower flanges 73 and 78, the stiffener 67 is disposed to be directed in an up-down direction.

An outer space 88 is formed between the side sill outer 65 and the stiffener 67. In addition, an inner space 89 is formed between the side sill inner 66 and the stiffener 67.

Figure 8:
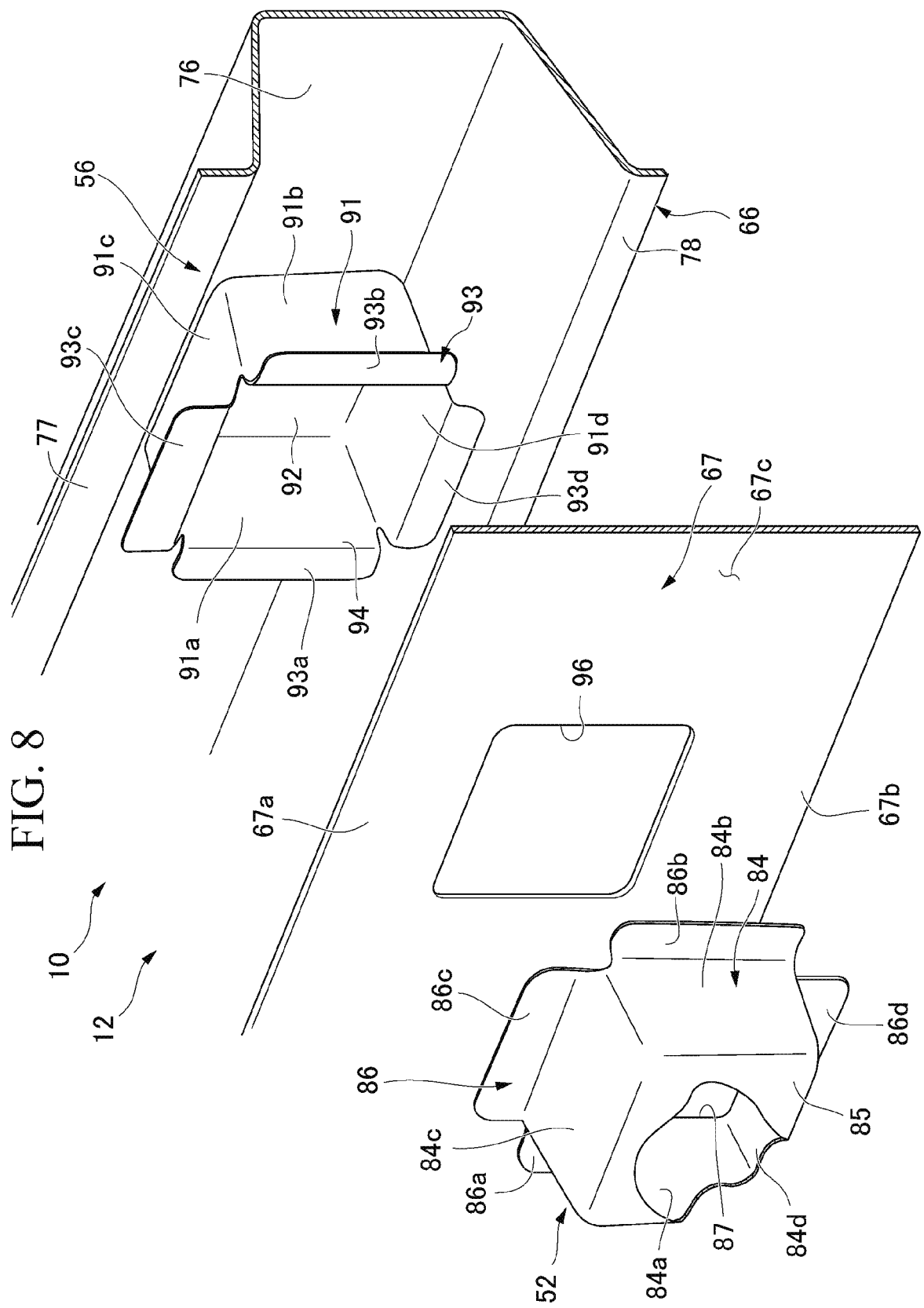
FIG. 8 is an exploded perspective view showing the outer bulkhead and the inner bulkhead of the vehicle body substructure according to the first embodiment of the present invention.

As shown in FIGS. 7 and 8, the outer bulkhead 52 is disposed in the outer space (inside) 88 between the side sill outer 65 and the stiffener 67. The outer bulkhead 52 has a side wall 84, a bottom portion 85, and a joint flange 86. The side wall 84 has a front side wall 84a, a rear side wall 84b, an upper side wall 84c, and a lower side wall 84d. The side wall 84 is formed to have a rectangular frame shape by the front side wall 84a, the rear side wall 84b, the upper side wall 84c, and the lower side wall 84d.

One end portion (end portion on a side away from the stiffener 67) of the side wall 84 is blocked by the bottom portion 85. The bottom portion 85 is formed to have a rectangular shape. In the opposite end portion of the side wall 84 (end portion on the stiffener 67 side), an opening portion 87 (also refer to FIG. 6) opens in a rectangular shape. The joint flange 86 is formed in the opposite end portion of the side wall 84.

The joint flange 86 has a front joint flange 86a, a rear joint flange 86b, an upper joint flange 86c, and a lower joint flange 86d.

The front joint flange 86a protrudes from the opposite end portion of the front side wall 84a toward the front side of the vehicle body along an outer surface 67c of the stiffener 67. The rear joint flange 86b protrudes from the opposite end portion of the rear side wall 84b toward the rear side of the vehicle body along the outer surface 67c of the stiffener 67. The upper joint flange 86c protrudes upward from the opposite end portion of the upper side wall 84c along the outer surface 67c of the stiffener 67. The lower joint flange 86d protrudes downward from the opposite end portion of the lower side wall 84d along the outer surface 67c of the stiffener 67.

That is, the joint flange 86 is provided throughout the whole circumference of the opening portion 87 in the opposite end portion of the side wall 84 on the opening portion 87 side. The front joint flange 86a, the rear joint flange 86b, the upper joint flange 86c, and the lower joint flange 86d constituting the joint flange 86 are disposed in a state of being in contact with the outer surface 67c of the stiffener 67.

In this manner, the outer bulkhead 52 is formed to have a box shape (which will hereinafter be referred to as a box shape) with a polygonal cross section (specifically, a rectangular cross section) in which the opening portion 87 opens on the stiffener 67 side.

The inner bulkhead 56 is disposed in the inner space (inside) 89 between the side sill inner 66 and the stiffener 67. Similar to the outer bulkhead 52, the inner bulkhead 56 has a side wall 91, a bottom portion 92, and a joint flange 93. The side wall 91 has a front side wall 91a, a rear side wall 91b, an upper side wall 91c, and a lower side wall 91d. The side wall 91 is formed to have a rectangular frame shape by the front side wall 91a, the rear side wall 91b, the upper side wall 91c, and the lower side wall 91d.

One end portion (end portion on a side away from the stiffener 67) of the side wall 91 is blocked by the bottom portion 92. The bottom portion 92 is formed to have a rectangular shape. In the opposite end portion of the side wall 91 (end portion on the stiffener 67 side), an opening portion 94 opens. The opening portion 94 of the inner bulkhead 56 opens in a rectangular shape which is the same shape as that of the opening portion 87 of the outer bulkhead 52.

The joint flange 93 is formed in the opposite end portion of the side wall 91.

The joint flange 93 has a front joint flange 93a, a rear joint flange 93b, an upper joint flange 93c, and a lower joint flange 93d. The front joint flange 93a protrudes from the opposite end portion of the front side wall 91a toward the front side of the vehicle body along an inner surface 67d of the stiffener 67. The rear joint flange 93b protrudes from the opposite end portion of the rear side wall 91b toward the rear side of the vehicle body along the inner surface 67d of the stiffener 67. The upper joint flange 93c protrudes upward from the opposite end portion of the upper side wall 91c along the inner surface 67d of the stiffener 67. The lower joint flange 93d protrudes downward from the opposite end portion of the lower side wall 91d along the inner surface 67d of the stiffener 67.

That is, the joint flange 93 is provided throughout the whole circumference of the opening portion 94 in the opposite end portion of the side wall 91 on the opening portion 94 side. The front joint flange 93a, the rear joint flange 93b, the upper joint flange 93c, and the lower joint flange 93d constituting the joint flange 93 are disposed in a state of being in contact with the inner surface 67d of the stiffener 67.

The inner bulkhead 56 has the opening portion 94 opening on the stiffener 67 side in a rectangular shape which is the same shape as that of the opening portion 87 of the outer bulkhead 52, and is formed to have a box-shaped polygonal cross section (a rectangular cross section in the first embodiment).

In a state where the joint flange 86 of the outer bulkhead 52 comes into contact with the outer surface 67c of the stiffener 67 and the joint flange 93 of the inner bulkhead 56 comes into contact with the inner surface 67d of the stiffener 67, the joint flange 86 and the joint flange 93 overlap each other with the stiffener 67 interposed therebetween. The joint flange 86 and the joint flange 93 in an overlapping state are joined to each other with the stiffener 67 interposed therebetween.

Accordingly, the outer bulkhead 52 and the inner bulkhead 56 are attached to the stiffener 67 in a state of overlapping each other in the vehicle width direction. Moreover, the outer bulkhead 52 and the inner bulkhead 56 are provided in the floor cross-member 35 such that they overlap each other in the vehicle width direction.

In this state, the outer bulkhead 52 extends in a direction in which the side wall 84 is away outward in the vehicle width direction from the stiffener 67. In addition, in the outer bulkhead 52, one end portion of the side wall 84 on a side away from the stiffener 67 is blocked by the bottom portion 85. The inner bulkhead 56 extends in a direction in which the side wall 91 is away inward in the vehicle width direction from the stiffener 67. In addition, in the inner bulkhead 56, one end portion of the side wall 91 on the side away from the stiffener 67 is blocked by the bottom portion 92.

As shown in FIGS. 2 and 6, the outer bulkhead 52 and the inner bulkhead 56 are provided such that they overlap each other in the vehicle width direction with respect to the floor cross-member 35. Thus, when an impact load F1 is input laterally to a vehicle Ve, the outer bulkhead 52 and the inner bulkhead 56 can be crushed by the impact load F1. Moreover, the floor cross-member 35 can favorably withstand a load F2 which has passed through the outer bulkhead 52 and the inner bulkhead 56.

In this manner, since the outer bulkhead 52 and the inner bulkhead 56 are crushed by the impact load F1 input laterally to the vehicle Ve, the impact energy can be absorbed.

A part of the remaining load absorbed by the outer bulkhead 52 and the inner bulkhead 56 is transferred to the floor cross-member 35 as the load F2. That is, the outer bulkhead 52 and the inner bulkhead 56 serve as side sill load transmitting members.

The floor cross-member (that is, a second floor cross-member) 35 can withstand the remaining load F2 absorbed by the outer bulkhead 52 and the inner bulkhead 56. Similarly, the first floor cross-member 34 can withstand the remaining load F2 absorbed by the first outer bulkhead 51 and the first inner bulkhead 55.

Accordingly, for example, it is possible to suppress deformation of a vehicle body side portion such as the left side sill 14 leading to the passenger seat 32. In addition, it is possible to suppress deformation of a vehicle body side portion such as the right side sill 15 leading to the driver's seat 31.

That is, an occupant in the passenger seat 32 or the driver's seat 31 can be protected from the impact load F1.

Returning to FIG. 8, the stiffener 67 has a hole portion 96. The hole portion 96 is formed at parts corresponding to the opening portion 87 of the outer bulkhead 52 and the opening portion 94 of the inner bulkhead 56. Since the hole portion 96 is formed in the stiffener 67, when the inside of the left side sill 14 is subjected to electrodeposition coating, an electrodeposition paint can be guided favorably into the left side sill 14 utilizing the hole portion 96. Accordingly, the electrodeposition paint can adhere easily inside the left side sill 14.

In addition, since the hole portion 96 is formed in the stiffener 67, the stiffener 67 can be reduced in weight, so that weight reduction of the vehicle body 10 can be achieved.

As shown in FIGS. 5 and 7, a left side portion 16c of the floor panel 16 is attached to the upper portion (upper surface) 82 of the inward swelling portion 76 of the side sill inner 66. The upper portion 82 of the inward swelling portion 76 is a part which becomes an upper portion of the left side sill 14. Hereinafter, the upper portion of the left side sill 14 will be referred to as "a side sill upper portion 82".

The floor panel 16 is formed flat. Thus, the floor panel 16 is disposed at the same height as the side sill upper portion 82. Accordingly, the left side sill 14 does not become a hindrance when an occupant boards and alights, so that boarding/alighting properties for an occupant can be ensured favorably.

The floor cross-member 35 is provided on the upper surface 16a of the floor panel 16. The floor cross-member 35 has a member upper portion 101, a member front wall portion 102, a member rear wall portion 103, a member front flange 104, and a member rear flange 105.

The member front wall portion 102 protrudes downward from a front side of the member upper portion 101 toward the floor panel 16. The member rear wall portion 103 protrudes downward from a rear side of the member upper portion 101 toward the floor panel 16. The floor cross-member 35 is formed to have a U-shaped cross section by the member upper portion 101, the member front wall portion 102, and the member rear wall portion 103.

The member front flange 104 protrudes from a lower side of the member front wall portion 102 to the front side of the vehicle body along the upper surface 16a of the floor panel 16. The member rear flange 105 protrudes to the rear side of the vehicle body from a lower side of the member rear wall portion 103 along the upper surface 16a of the floor panel 16.

Since the member front flange 104 and the member rear flange 105 are joined to the upper surface 16a of the floor panel 16, the floor cross-member 35 is attached to the upper surface 16a of the floor panel 16. In this state, the member upper portion 101 of the floor cross-member 35 is positioned above the side sill upper portion 82.

The floor cross-member 35 has the inclination portion 107 on the left side sill 14 side. In addition, the member upper portion 101 has an extending portion 108 in the vicinity of the left end portion.

The extending portion 108 is a part forming the upper portion of the inclination portion 107. The extending portion 108 extends with a downward slope outward in the vehicle width direction to the side sill upper portion 82. In other words, the extending portion 108 extends with a downward slope toward an upper portion 56a of the inner bulkhead 56.

An outer side end portion 108a of the extending portion 108 is positioned in the side sill upper portion 82. An end portion 104a of the member front flange 104 and an end portion 105a of the member rear flange 105 are joined to the side sill upper portion 82 with the left side portion 16c of the floor panel 16 interposed therebetween. Thus, an end portion 107a of the inclination portion 107 is joined to the side sill upper portion 82 with the left side portion 16c of the floor panel 16 interposed therebetween.

Figure 9:
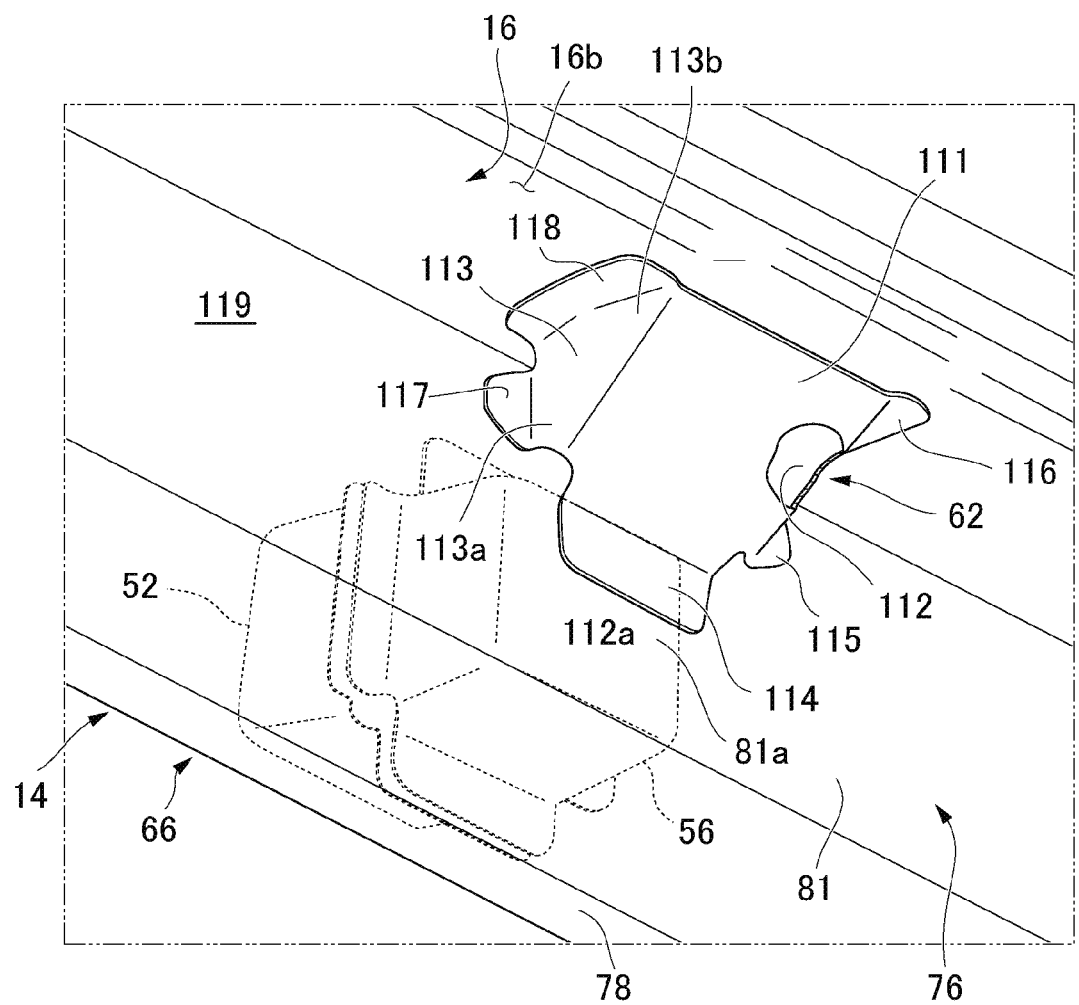
FIG. 9 is a perspective view showing a gusset of the vehicle body substructure according to the first embodiment of the present invention.

As shown in FIGS. 6 and 9, the gusset 62 is laid between the inside wall 81 of the inward swelling portion 76 of the side sill inner 66 and a lower surface 16b of the floor panel 16. Hereinafter, the inside wall 81 of the inward swelling portion 76 will be referred to as "a side sill inside wall (inside wall of the side sill) 81".

The gusset 62 has a gusset inclination portion 111, a gusset front wall portion 112, a gusset rear wall portion 113, and gusset flanges 114 to 118. The gusset inclination portion 111 is formed to have a rectangular shape in a plan view. The gusset inclination portion 111 extends with a downward slope outward in the vehicle width direction from the lower surface 16b of the floor panel 16 to the side sill inside wall 81 at an interval from the extending portion 108. That is, the gusset 62 extends with a downward slope outward in the vehicle width direction from the lower surface 16b of the floor panel 16 to the side sill inside wall 81.

The gusset front wall portion 112 protrudes from a front side of the gusset inclination portion 111 toward the floor panel 16. The gusset rear wall portion 113 protrudes from a rear side of the gusset inclination portion 111 to the floor panel 16. The gusset 62 is formed to have a U-shaped cross section by the gusset inclination portion 111, the gusset front wall portion 112, and the gusset rear wall portion 113.

The gusset flange 114 protrudes from a lower side of the gusset inclination portion 111. The gusset flanges 115 and 116 protrude respectively from a lateral side 112a and an upper side 112b of the gusset front wall portion 112. The gusset flanges 117 and 118 protrude respectively from a lateral side 113a and an upper side 113b of the gusset rear wall portion 113.

The gusset flange 114 protruding from the lower side of the gusset inclination portion 111 is joined to a part 81a of the side sill inside wall 81 facing the inner bulkhead 56.

The gusset flange 115 protruding from the lateral side 112a of the gusset front wall portion 112 is joined to the side sill inside wall 81. The gusset flange 117 protruding from the lateral side 113a of the gusset rear wall portion 113 is joined to the side sill inside wall 81.

The gusset flange 116 protruding from the upper side 112b of the gusset front wall portion 112 is joined to the lower surface 16b of the floor panel 16. The gusset flange 118 protruding from the upper side 113b of the gusset rear wall portion 113 is joined to the lower surface 16b of the floor panel 16.

In this manner, the inclination portion 107 is formed in the floor cross-member 35, and the extending portion 108 of the inclination portion 107 extends with a downward slope outward in the vehicle width direction to the side sill upper portion 82. Moreover, the gusset inclination portion 111 extends with a downward slope outward in the vehicle width direction from the lower surface 16b of the floor panel 16 to the side sill inside wall 81.

A cross section is formed by the inclination portion 107 and the gusset 62. In addition, a straight portion 35a of the floor cross-member 35 is formed in a cross section.

Thus, the strength of the inclination portion 107 is ensured in a manner similar to that of the straight portion 35a of the floor cross-member 35. Accordingly, when the impact load F1 is input laterally to the vehicle Ve, a load F3 can be transferred from the inner bulkhead 56 to the gusset 62 via the side sill inside wall 81.

Accordingly, a part of the remaining impact load F1 absorbed by the outer bulkhead 52 and the inner bulkhead 56 is transferred to the floor cross-member 35 as the load F2 via the inclination portion 107 and the gusset 62, and a first load path can be ensured.

The floor cross-member 35 withstands the load F3 transferred to the floor cross-member 35.

Moreover, since the floor cross-member 35 is provided on the upper surface 16a of the floor panel 16, the floor cross-member can be removed from below the floor panel 16. Thus, a space 119 below the floor panel 16 can be increased.

Accordingly, the volume of the battery pack 28 provided below the floor panel 16 can be increased. As a result, the volume of a battery 123 to be accommodated in the battery pack 28 can be increased, so that a cruising distance of the vehicle Ve can be increased.

Returning to FIGS. 3 and 5, the battery pack 28 is provided between the left side sill 14 and the right side sill 15 and below the floor panel 16. The battery pack 28 is attached to the vehicle body substructure 12 by a pair of front support brackets 46, a pair of rear support brackets 47, the left battery pack frame 29, the right battery pack frame 30, and a plurality of fastening members 133 (also refer to FIG. 10).

The battery pack 28 includes a battery case 121 and a lid 122. The battery case 121 has a case wall portion 124, a case bottom portion (bottom portion of the underfloor mounting component) 125, a case flange 126, a battery cross-member unit (underfloor cross-member) 131 (refer to FIG. 10), a traverse member unit 171, and a longitudinal member 172.

The case wall portion 124 has a front wall, a rear wall, a left side wall 124a, and a right side wall 124b. The case wall portion 124 is formed to have a rectangular frame shape by the front wall, the rear wall, the left side wall 124a, and the right side wall 124b (refer to FIG. 10).

In the case wall portion 124, a lower end portion is blocked by the case bottom portion 125, and an opening portion 127 is formed in an upper end portion. The case flange 126 protrudes from the whole circumference of the opening portion 127 of the case wall portion 124 to an outer side of the battery case 121.

Figure 10:
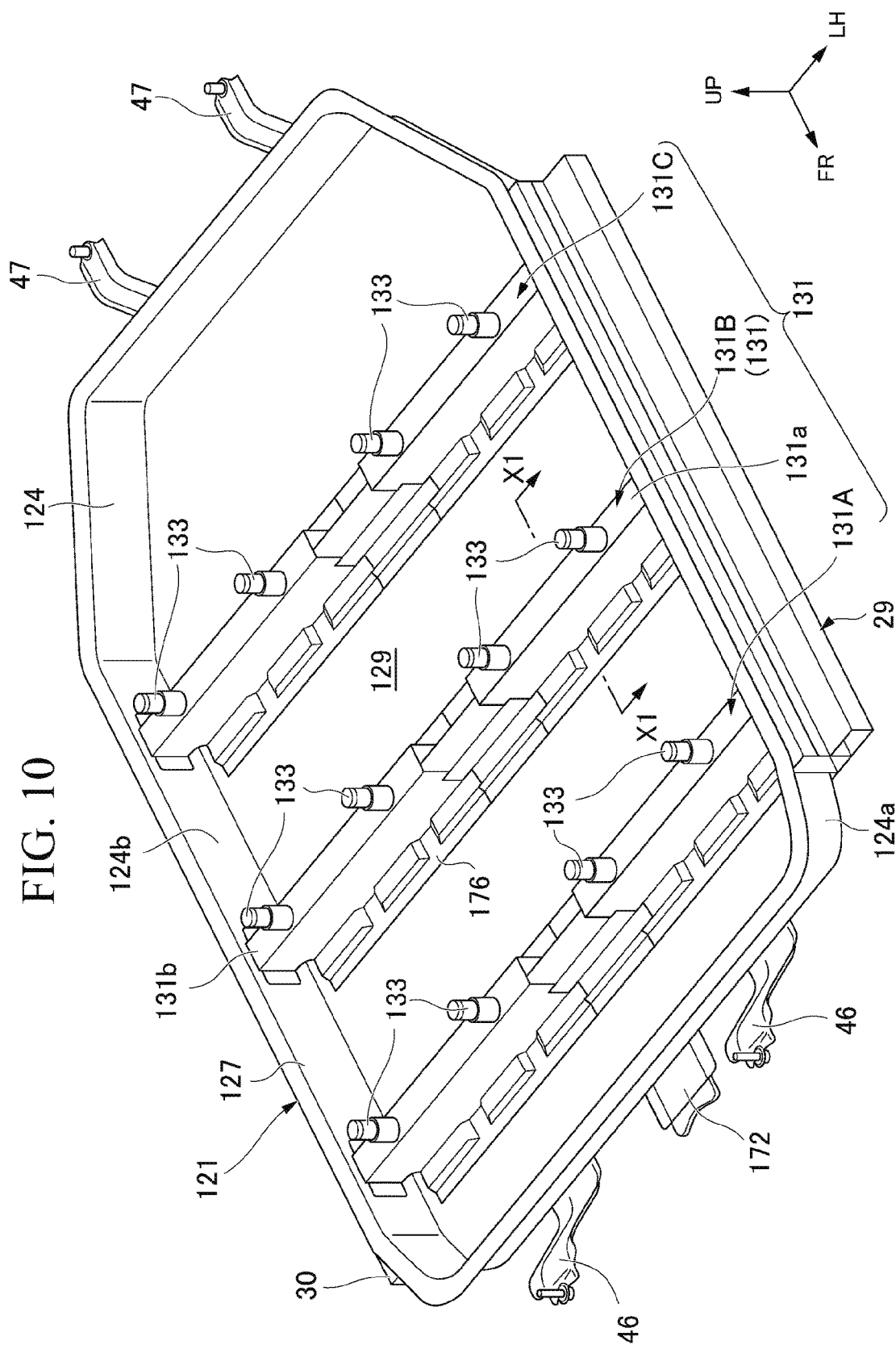
FIG. 10 is a perspective view showing a state where the battery pack of the vehicle body substructure according to the first embodiment of the present invention is viewed from above to the rear.

As shown in FIG. 10, the battery cross-member unit 131 is provided inside the battery case 121 (that is, in an inside 129 of the battery pack 28 (refer to FIG. 5)). The battery cross-member unit 131 includes a first battery cross-member 131A, a second battery cross-member 131B, and a third battery cross-member 131C.

The first battery cross-member 131A, the second battery cross-member 131B, and the third battery cross-member 131C are underfloor cross-members which are provided below the floor panel 16 and inside the battery case 121.

The first battery cross-member 131A is provided in a front portion of the battery case 121 and extends in the vehicle width direction. The second battery cross-member 131B is provided at an interval from a rear side of the first battery cross-member 131A in the vehicle body and extends in the vehicle width direction. The third battery cross-member 131C is provided at an interval from a rear side of the second battery cross-member 131B in the vehicle body and extends in the vehicle width direction.

The first battery cross-member 131A, the second battery cross-member 131B, and the third battery cross-member 131C are members similar to each other. Hereinafter, the second battery cross-member 131B will be described as a battery cross-member 131, and detailed description of the first battery cross-member 131A and the third battery cross-member 131C will be omitted.

The battery cross-member 131 extends in the vehicle width direction in the inside 129 of the battery pack 28. A left end portion 131a of the battery cross-member 131 is joined to the left side wall 124a of the case wall portion 124. A right end portion 131b of the battery cross-member 131 is joined to the right side wall 124b of the case wall portion 124.

Figure 11:
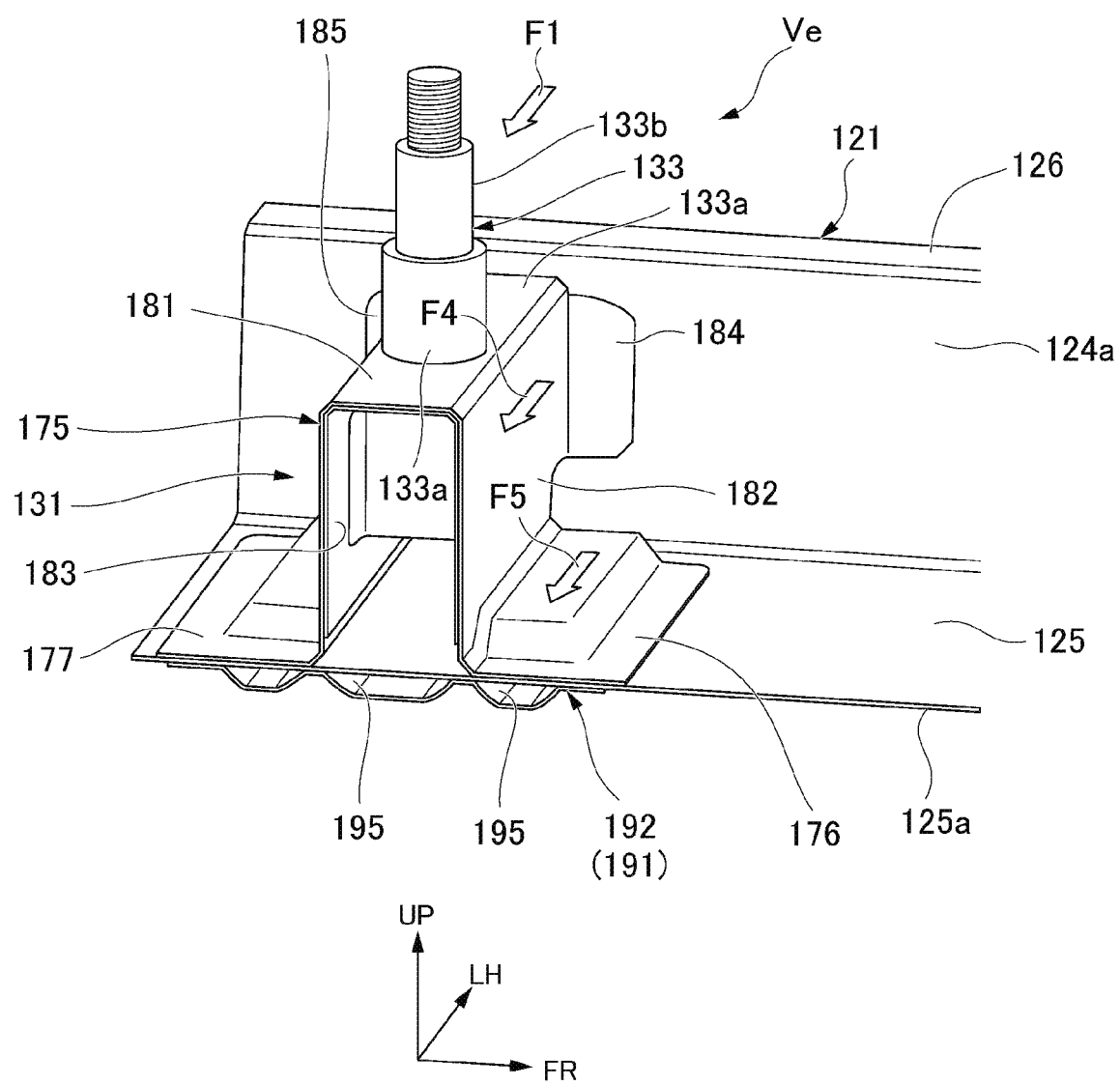
FIG. 11 is a cross-sectional view of the vehicle body substructure according to the first embodiment of the present invention cut along line XI-XI in FIG. 10.
Figure 12:
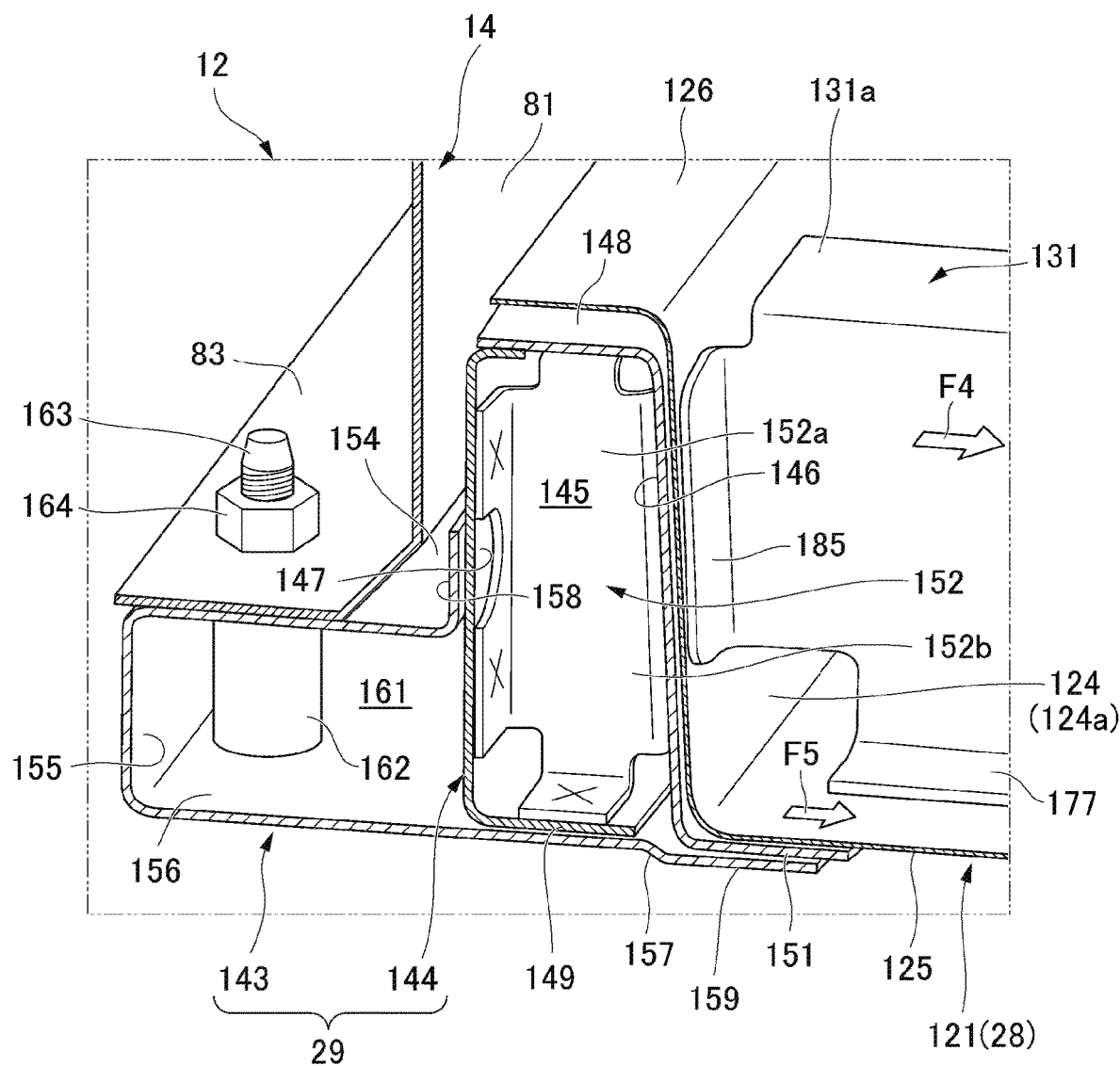
FIG. 12 is a perspective view of a cut state of a battery pack frame of the vehicle body substructure according to the first embodiment of the present invention viewed from obliquely above.

As shown in FIGS. 11 and 12, the battery cross-member 131 includes a strut portion 175, a front seat portion (seat portion) 176, and a rear seat portion (seat portion) 177. The battery cross-member 131 is formed to have a T-shaped cross section by the strut portion 175, the front seat portion 176, and the rear seat portion 177.

The strut portion 175 rises from the case bottom portion 125 of the battery case 121. In the strut portion 175, an end portion facing an upper half portion 152a of the left bulkhead 152 is fixed to the left side wall 124a of the battery case 121. Hereinafter, the upper half portion 152a of the left bulkhead 152 will be referred to as "a bulkhead upper half portion 152a".

The strut portion 175 has a strut apex portion 181, a strut front wall portion 182, and a strut rear wall portion 183.

The strut apex portion 181 is positioned above the case bottom portion 125 of the battery case 121 and extends in the vehicle width direction along the case bottom portion 125.

The strut front wall portion 182 extends from a front side of the strut apex portion 181 toward the case bottom portion 125. The strut rear wall portion 183 extends from a rear side of the strut apex portion 181 toward the case bottom portion 125.

The strut portion 175 is formed to have a U-shaped cross section by the strut apex portion 181, the strut front wall portion 182, and the strut rear wall portion 183.

A front joint piece (end portion facing the upper half portion of the underfloor load transmitting member) 184 protrudes from the left end portion of the strut front wall portion 182 toward the front side of the vehicle body. A rear joint piece (end portion facing the upper half portion of the underfloor load transmitting member) 185 protrudes from the left end portion of the strut rear wall portion 183 toward the front side of the vehicle body. The front joint piece 184 and the rear joint piece 185 form "an end portion of the strut portion 175 facing the bulkhead upper half portion 152a".

The front joint piece 184 and the rear joint piece 185 are joined to the left side wall 124a of the battery case 121. In this state, the front joint piece 184 and the rear joint piece 185 are disposed at positions facing the bulkhead upper half portion 152a. Thus, a second load path for transmitting an impact load F4 from the bulkhead upper half portion 152a to the strut portion 175 of the battery cross-member 131 can be ensured.

The front seat portion 176 is formed on a lower side of the strut front wall portion 182. The rear seat portion 177 is formed on a lower side of the strut rear wall portion 183.

The front seat portion 176 protrudes from the lower side of the strut front wall portion 182 toward the front side of the vehicle body along the case bottom portion 125. The front seat portion 176 is joined (fixed) to the case bottom portion 125.

The rear seat portion 177 protrudes from the lower side of the strut rear wall portion 183 toward the rear side of the vehicle body along the case bottom portion 125. The rear seat portion 177 is joined (fixed) to the case bottom portion 125.

The front seat portion 176 and the rear seat portion 177 are provided in a state of being connected to each other in the vehicle width direction between the left battery pack frame 29 and the right battery pack frame 30 (refer to FIG. 3). In other words, the front seat portion 176 and the rear seat portion 177 are provided in a state of being connected to each other in the vehicle width direction between the left side wall 124a and the right side wall 124b of the case wall portion 124 (refer to FIG. 10).

As shown in FIG. 5, lower attachment portions 133a of the plurality of fastening members 133 (also refer to FIG. 10) are attached to the battery cross-member 131 using bolts 187 and nuts 188 (refer to FIG. 5) at intervals in the vehicle width direction.

The battery 123 is accommodated inside the battery case 121. The battery case 121 is covered with the lid 122. In this state, the battery pack 28 is attached to the vehicle body substructure 12 using the plurality of fastening members 133.

Figure 13:
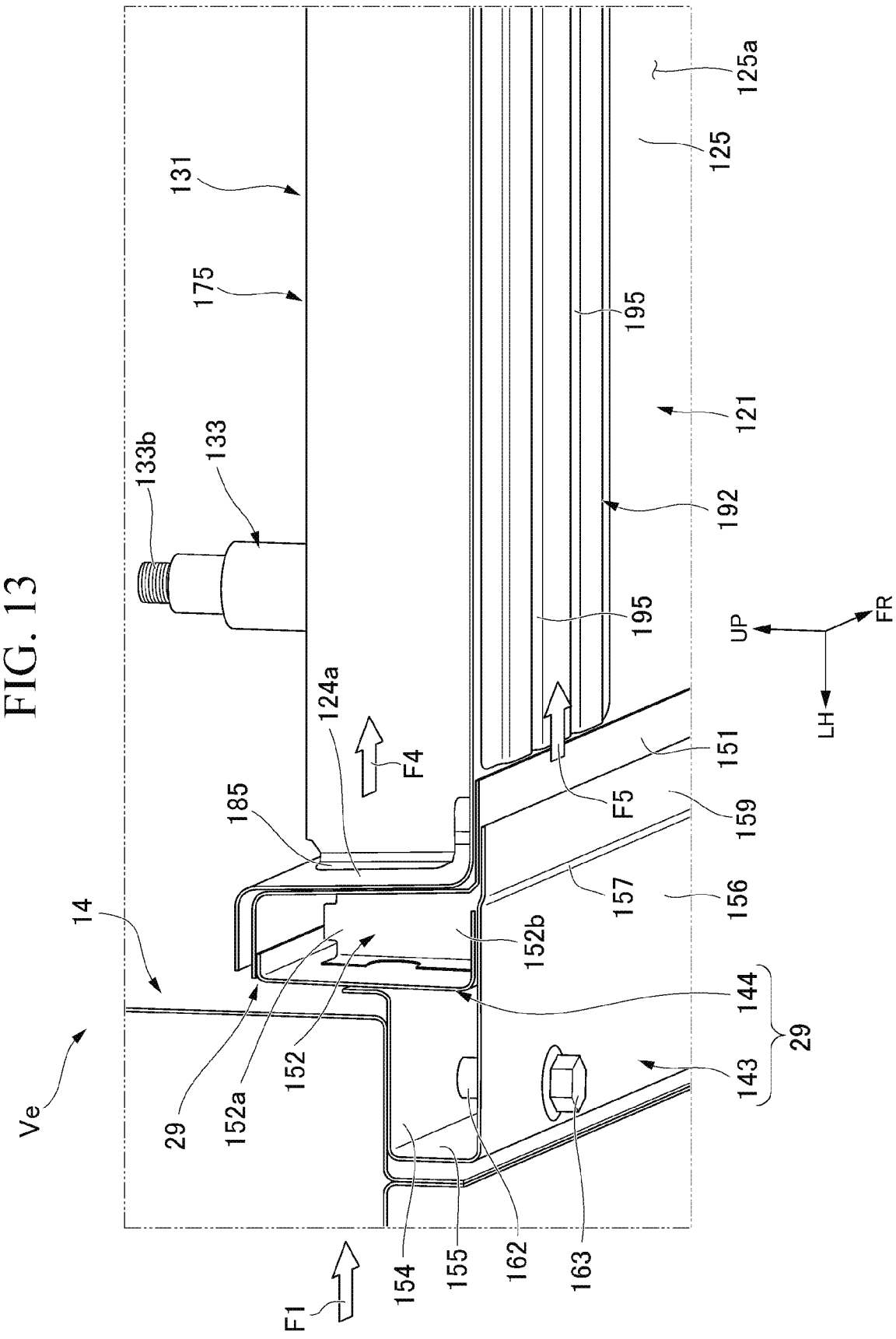
FIG. 13 is a perspective view of a cut state of the battery pack frame and a battery case of the vehicle body substructure according to the first embodiment of the present invention viewed from obliquely below.

As shown in FIGS. 3 and 13, the traverse member unit 171 is provided on an outer surface 125a of the case bottom portion 125 of the battery case 121. The traverse member unit 171 includes a first traverse member 191A, a second traverse member 191B, and a third traverse member 191C.

The first traverse member 191A is provided in the front portion of the battery case 121 and extends in the vehicle width direction. The second traverse member 191B is provided at an interval from a rear side of the first traverse member 191A in the vehicle body and extends in the vehicle width direction. The third traverse member 191C is provided at an interval from a rear side of the second traverse member 191B in the vehicle body and extends in the vehicle width direction.

The first traverse member 191A, the second traverse member 191B, and the third traverse member 191C are members similar to each other. Hereinafter, the second traverse member 191B will be described as a traverse member 191, and a detailed description of the first traverse member 191A and the third traverse member 191C will be omitted.

The traverse member 191 includes a left traverse member 192 and a right traverse member 193. The left traverse member 192 and the right traverse member 193 are provided on the left and right sides at an interval from the center in the vehicle width direction.

The left traverse member 192 and the right traverse member 193 are members having a bilateral symmetry. Hereinafter, the left traverse member 192 will be described, and detailed description of the right traverse member 193 will be omitted.

As shown in FIGS. 11 and 13, the left traverse member 192 extends along the front seat portion 176 and the rear seat portion 177 in a state of being joined (fixed) to the outer surface 125*a* of the case bottom portion 125. The left traverse member 192 has beads 195. The beads 195 are formed to extend in the front-rear direction of the vehicle body along the left traverse member 192 and project toward the case bottom portion 125.

For example, in the embodiment, an example in which a plurality of beads 195 are formed has been described, but the embodiment is not limited thereto. As an alternative example, it is possible to form one bead 195.

Since the beads 195 are formed in the left traverse member 192, the cross-sectional strength of the left traverse member 192 is enhanced. Specifically, the cross-sectional strength is enhanced with respect to a load in a longitudinal direction of the left traverse member 192.

The front seat portion 176 is joined (fixed) in a state of overlapping the case bottom portion 125 and the left traverse member 192. In addition, the rear seat portion 177 is joined (fixed) in a state of overlapping the case bottom portion 125 and the left traverse member 192.

In this manner, the front seat portion 176 and the rear seat portion 177 are joined in a state of overlapping the case bottom portion 125 and the left traverse member 192. Thus, a third load path for transmitting a load F5 (also refer to FIG. 12) from a frame extension portion 151 of the left battery pack frame 29 to the front seat portion 176 or the rear seat portion 177 of the battery cross-member 131 can be ensured.

Particularly, the front seat portion 176 and the rear seat portion 177 are reinforced firmly by the left traverse member 192. Accordingly, the efficiency of transmitting the load F5 in the third load path can be improved.

In addition, the front joint piece 184 and the rear joint piece 185 are disposed at positions facing the bulkhead upper half portion 152*a*. Thus, the second load path transmitting a load F4 from the bulkhead upper half portion 152*a* to the strut portion 175 of the battery cross-member 131 can be ensured.

Accordingly, the impact load F1 input laterally to the vehicle Ve can be dispersed reliably to the battery cross-member 131 via the second load path and the third load path.

As shown in FIG. 3, the longitudinal member 172 is disposed between the left traverse member 192 and the right traverse member 193. Moreover, the longitudinal member 172 extends in the front-rear direction of the vehicle body. In this state, the longitudinal member 172 is fixed to the outer surface 125*a* of the case bottom portion 125. Accordingly, the longitudinal member 172 can withstand an impact load F6 input in the front-rear direction of the vehicle.

As shown in FIGS. 3 and 11, in the battery case 121, the front seat portion 176 and the rear seat portion 177 (that is, the battery cross-member 131), and the left traverse member 192 are provided in the case bottom portion 125. Accordingly, the front seat portion 176 and the rear seat portion 177 (that is, the battery cross-member 131), and the left traverse member 192 can withstand the impact load F1 input laterally to the vehicle Ve.

In addition, the longitudinal member 172 is provided in the case bottom portion 125. Accordingly, the longitudinal member 172 can withstand the impact load F6 input in the front-rear direction of the vehicle Ve.

Moreover, since the left traverse member 192 and the longitudinal member 172 are provided in the case bottom portion 125, the strength of the battery case 121 (that is, the battery pack 28) can be enhanced. Accordingly, the battery pack 28 can be increased in size. Since the battery pack 28 is increased in size, the volume for accommodating the battery 123 (refer to FIG. 5) can be increased.

Returning to FIG. 5, the opening portion 127 of the battery case 121 is blocked from above by the lid 122. The lid 122 has a lid wall portion 135, a lid apex portion 136, and a lid flange 137.

The lid wall portion 135 has the front wall, the rear wall, a left side wall 135*a*, and a right side wall. The lid wall portion 135 is formed to have a rectangular frame shape by the front wall, the rear wall, the left side wall 135*a*, and the right side wall. That is, the lid wall portion 135 is formed similarly to the case wall portion 124.

In the lid wall portion 135, the upper end portion is blocked by the lid apex portion 136, and an opening portion 138 is formed in the lower end portion. The lid flange 137 protrudes from the whole circumference of the opening portion 138 of the lid wall portion 135 to the outer side of the lid 122.

Since the lid flange 137 overlaps the case flange 126 from above, a gap between the lid flange 137 and the case flange 126 is sealed by a seal member. Thus, the opening portion 127 of the battery case 121 is blocked by the lid 122. The battery 123 is accommodated in the inside 129 of the battery pack 28. In a state where the opening portion 127 of the battery case 121 is blocked by the lid 122, an upper portion 133*b* of the fastening member 133 protrudes upward through an opening of the lid apex portion 136.

The protruding upper portion 133*b* is fastened to a bracket 141 of the floor cross-member 35 using bolts and nuts. Accordingly, the battery pack 28 is fastened to the bracket 141 of the floor cross-member 35 using the plurality of fastening members 133.

As shown in FIGS. 6 and 12, the battery pack 28 is disposed on an inner side of the left side sill 14 in the vehicle width direction. The battery pack 28 is provided at a predetermined interval L1 from the side sill inside wall 81.

The left battery pack frame 29 is attached to the left side wall 124*a* of the case wall portion 124. The right battery pack frame 30 (refer to FIG. 3) is attached to the right side wall 124*b* of the case wall portion 124.

The left battery pack frame 29 and the right battery pack frame 30 are members having a bilateral symmetry. Hereinafter, the left battery pack frame 29 will be described as a battery pack frame 29, and a detailed description of the right battery pack frame 30 will be omitted.

The battery pack frame 29 is formed to have an L-shaped cross section. The battery pack frame 29 includes a fixing portion 143 and a frame main body 144.

The fixing portion 143 is attached to the lower portion 83 of the inward swelling portion 76. The lower portion 83 of the inward swelling portion 76 is a part which becomes a lower portion of the left side sill 14. Hereinafter, the lower portion of the left side sill 14 will be referred to as "a side sill lower portion 83".

The frame main body 144 rises from the fixing portion 143 toward the side sill inside wall 81 and is disposed to face the inner bulkhead 56 with the side sill inside wall 81 interposed therebetween.

The frame main body 144 has a frame inside wall portion 146, a frame outside wall portion 147, a frame apex portion 148, a frame bottom portion 149, and the frame extension portion 151. The frame main body 144 is formed to have a rectangular frame-shaped cross section by the frame inside wall portion 146, the frame outside wall portion 147, the frame apex portion 148, and the frame bottom portion 149.

The frame inside wall portion 146 of the frame main body 144 faces the left side wall 124a of the case wall portion 124 and is joined along the left side wall 124a.

Moreover, the frame inside wall portion 146 is also joined to the front joint piece 184 and the rear joint piece 185 of the battery cross-member 131 with the left side wall 124a interposed therebetween. That is, the frame main body 144 is joined to the battery cross-member 131.

The frame extension portion 151 extends along the case bottom portion 125 of the battery case 121 and is joined to the case bottom portion 125.

The left end portion of the front seat portion 176 of the battery cross-member 131 is joined (fixed) to the frame extension portion 151 with the case bottom portion 125 interposed therebetween.

In addition, the left end portion of the rear seat portion 177 of the battery cross-member 131 is joined (fixed) to the frame extension portion 151 with the case bottom portion 125 interposed therebetween.

The left bulkhead 152 is attached to an inside 145 of the frame main body 144.

The fixing portion 143 has an attachment apex portion 154, an attachment outside wall portion 155, an attachment bottom portion 156, a bent portion 157, an upper connection portion 158, and a lower connection portion (connection portion) 159. The fixing portion 143 is formed to have a U-shaped cross section by the attachment apex portion 154, the attachment outside wall portion 155, and the attachment bottom portion 156.

The attachment outside wall portion 155 extends downward from an outer end of the attachment apex portion 154. The attachment bottom portion 156 extends in the same plane as the frame extension portion 151 from a lower end of the attachment outside wall portion 155 to the frame extension portion 151. The lower connection portion 159 is offset downward from an end portion of the attachment bottom portion 156 via the bent portion 157. The lower connection portion 159 is fixed along the frame extension portion 151 of the frame main body 144.

In this manner, the attachment bottom portion 156 extends linearly with the frame extension portion 151. Accordingly, the load F5 can be transmitted linearly from the attachment bottom portion 156 to the frame extension portion 151, so that transmission efficiency of the third load path can be improved.

The upper connection portion 158 is joined along the frame outside wall portion 147 of the frame main body 144.

A collar 162 is interposed in an inside 161 of the fixing portion 143, and a bolt 163 penetrates the collar 162. The fixing portion 143 is attached to the side sill lower portion 83 using the bolts 163 and nuts 164. In other words, the attachment apex portion 154 of the fixing portion 143 is attached in a state of abutting the side sill lower portion 83 using the bolt 163 and the nut 164.

In this manner, the fixing portion 143 is attached to the side sill lower portion 83, and the frame main body 144 of the battery pack frame 29 rises toward the side sill inside wall 81. In the frame main body 144, the frame main body 144 faces the inner bulkhead 56 with the side sill inside wall 81 interposed therebetween. In addition, the frame main body 144 is joined to the front joint piece 184 and the rear joint piece 185 of the battery cross-member 131.

The left bulkhead 152 is provided in the inside 145 of the frame main body 144. The left bulkhead 152 is provided along the left side wall (side wall) 124a of the battery case 121. The left bulkhead 152 is a battery load transmitting member (underfloor load transmitting member) which is disposed to face the left end portion 131a of the battery cross-member 131.

Figure 14:
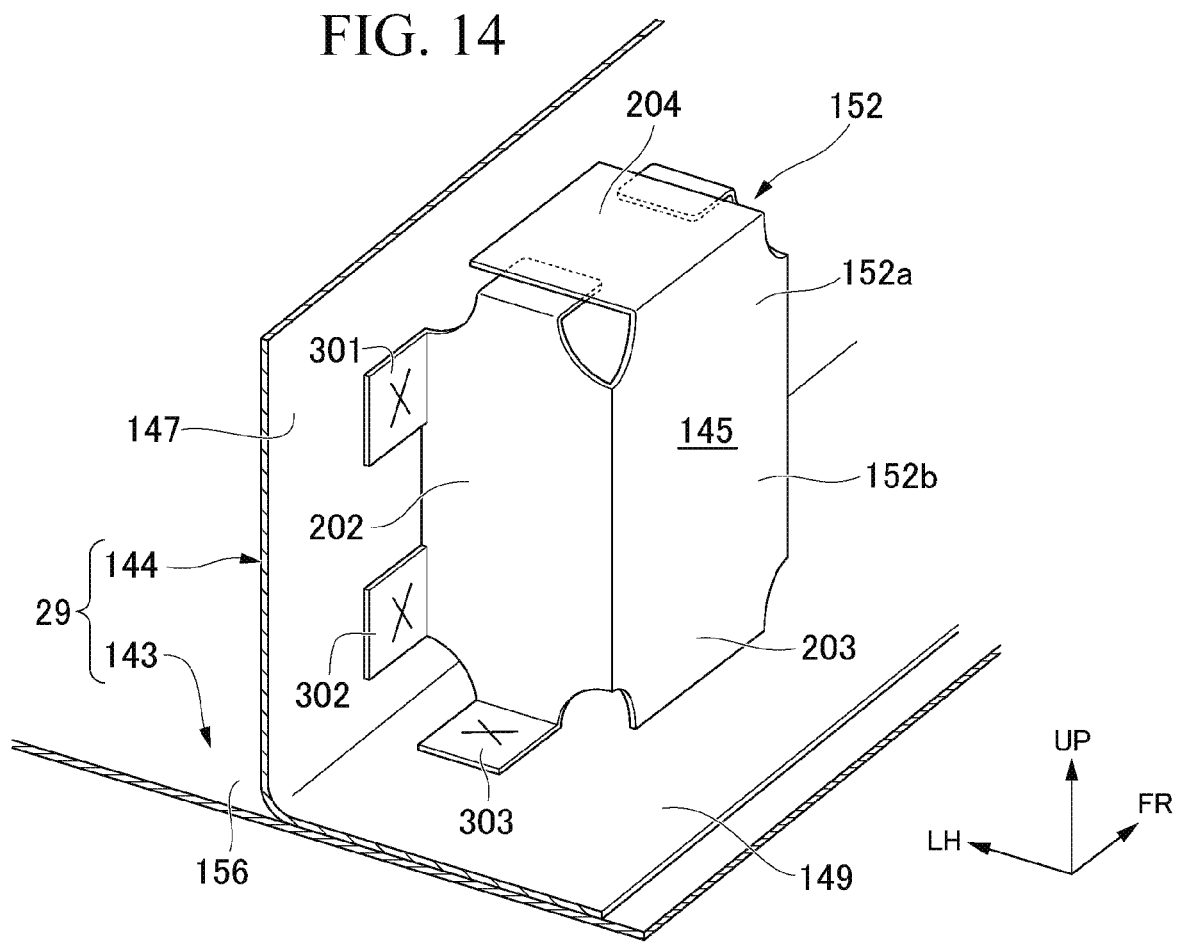
FIG. 14 is a perspective view showing a left bulkhead of the vehicle body substructure according to the first embodiment of the present invention.
Figure 15:
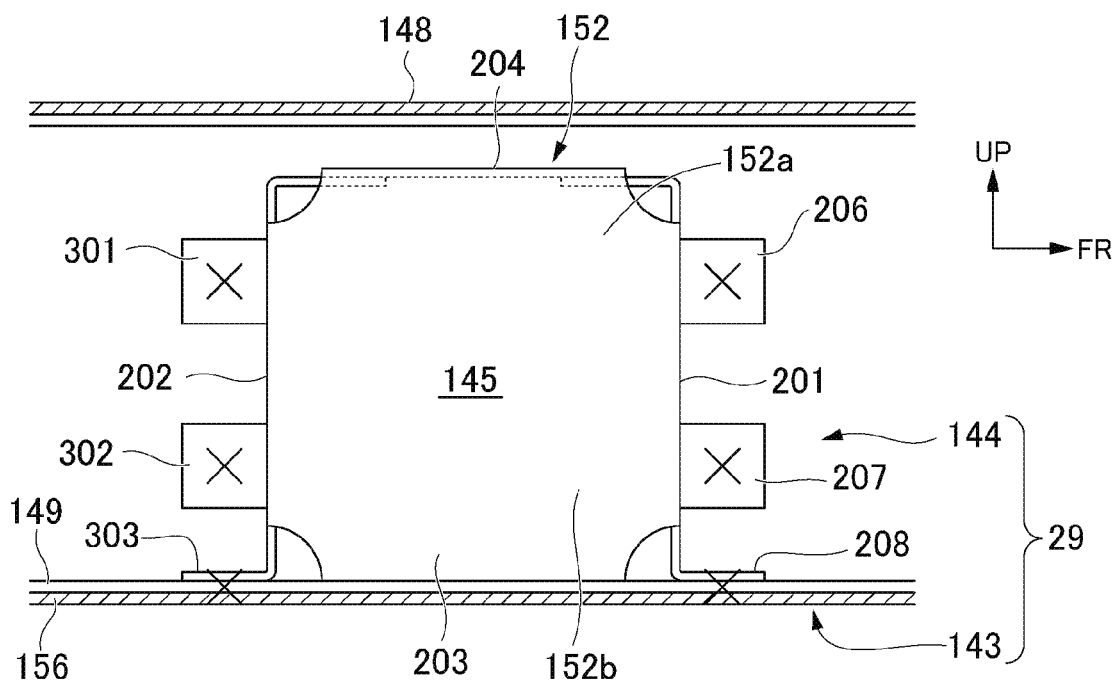
FIG. 15 is a side view showing the left bulkhead of the vehicle body substructure according to the first embodiment of the present invention.

As shown in FIGS. 14 and 15, the left bulkhead 152 has a bulkhead front wall portion 201, a bulkhead rear wall portion 202, a bulkhead side wall portion 203, and a bulkhead apex portion 204.

The bulkhead front wall portion 201 is disposed in a state of rising from the frame bottom portion 149 of the frame main body 144 in the vehicle width direction and is formed to have a substantially rectangular shape. On an outer side of the bulkhead front wall portion 201, a first joint piece 206 is formed in the upper portion, and a second joint piece 207 is formed in the lower portion. In addition, a third joint piece 208 is formed on a lower side of the bulkhead front wall portion 201.

Similar to the bulkhead front wall portion 201, the bulkhead rear wall portion 202 is formed to have a substantially rectangular shape. The bulkhead rear wall portion 202 faces the bulkhead front wall portion 201 and is disposed on a rear side of the bulkhead front wall portion 201 in the vehicle body. On an outer side of the bulkhead rear wall portion 202, a fourth joint piece 301 is formed in the upper portion, and a fifth joint piece 302 is formed in the lower portion. In addition, a sixth joint piece 303 is formed on a lower side of the bulkhead rear wall portion 202.

The bulkhead side wall portion 203 is connected to an inner side of the bulkhead front wall portion 201 and an inner side of the bulkhead rear wall portion 202. The bulkhead side wall portion 203 is formed to have a substantially rectangular shape. The bulkhead side wall portion 203 is disposed in a state of rising from the frame bottom portion 149 of the frame main body 144 in the front-rear direction of the vehicle body.

The bulkhead apex portion 204 is connected to an upper side of the bulkhead front wall portion 201, an upper side of the bulkhead rear wall portion 202, and an upper side of the bulkhead side wall portion 203. The bulkhead apex portion 204 is formed to have a substantially rectangular shape.

The first joint piece 206, the second joint piece 207, the fourth joint piece 301, and the fifth joint piece 302 are joined to the frame outside wall portion 147 of the frame main body 144 through spot welding or the like. The third joint piece 208 and the sixth joint piece 303 are joined to the frame bottom portion 149 of the frame main body 144 through spot welding or the like.

In this state, the left bulkhead 152 is formed to have a box-shaped polygonal cross section (a rectangular cross section in the first embodiment) by the bulkhead front wall portion 201, the bulkhead rear wall portion 202, the bulkhead side wall portion 203, and the bulkhead apex portion 204.

For example, the left bulkhead 152 is formed by bending one steel sheet. Since the left bulkhead 152 is formed to have a box-shaped rectangular cross section, when the impact load F1 is input laterally to the vehicle Ve, the left bulkhead 152 is crushed and the impact energy can be absorbed. That is, the left bulkhead 152 is a battery load transmitting member (underfloor load transmitting member) which is attached to the battery pack 28 and can transmit a load.

The left bulkhead 152 has a bulkhead upper half portion (upper half portion) 152a and a bulkhead lower half portion (lower half portion) 152b.

In the bulkhead upper half portion 152a, the first joint piece 206, and the fourth joint piece 301 are joined to the frame outside wall portion 147 of the frame main body 144. Accordingly, the bulkhead upper half portion 152a is fixed to the frame main body 144 (that is, the battery pack frame 29).

In the bulkhead lower half portion 152b, the second joint piece 207 and the fifth joint piece 302 are joined to the frame outside wall portion 147 of the frame main body 144. In addition, in the bulkhead lower half portion 152b, the third joint piece 208 and the sixth joint piece 303 are joined to the frame bottom portion 149 of the frame main body 144. Accordingly, the bulkhead lower half portion 152b is fixed to the frame main body 144 (that is, the battery pack frame 29).

As shown in FIG. 6, the bulkhead upper half portion 152a is disposed to face a lower portion 56b of the inner bulkhead 56. The bulkhead upper half portion 152a is disposed at the same height as the lower portion 56b of the inner bulkhead 56. In addition, the bulkhead upper half portion 152a is fixed to the frame main body 144 (that is, the battery pack frame 29). Thus, the second load path for transmitting the load F4 from the lower portion 56b of the inner bulkhead 56 to the bulkhead upper half portion 152a can be ensured.

The bulkhead lower half portion 152b is disposed at the same height as an attachment part 29a of the battery pack frame 29 which is attached to the side sill lower portion 83. In addition, the bulkhead lower half portion 152b is fixed to the frame main body 144 (that is, the battery pack frame 29). That is, the bulkhead lower half portion 152b is fixed at the same height as the attachment part (part of the underfloor frame attached to a lower portion of the side sill) 29a of the battery pack frame 29.

Thus, the third load path for transmitting the load F5 from the attachment part 29a of the battery pack frame 29 to the bulkhead lower half portion 152b of the left bulkhead 152 can be ensured.

Accordingly, the impact load F1 input laterally to the vehicle Ve can be dispersed reliably to the battery cross-member 131 via the second load path and the third load path.

Hereinabove, as described above, according to the vehicle body substructure 12, the outer bulkhead 52 and the inner bulkhead 56 are provided inside the left side sill 14. The extending portion 108 of the floor cross-member 35 extends toward the upper portion 56a of the inner bulkhead 56. In addition, the left bulkhead 152 faces the battery cross-member 131. The bulkhead upper half portion 152a faces the lower portion 56b of the inner bulkhead 56. Moreover, the bulkhead lower half portion 152b of the left bulkhead 152 is connected to the side sill lower portion 83 with the battery pack frame 29 interposed therebetween.

Thus, when the impact load F1 is input laterally to the vehicle Ve, a part of the impact load F1 can be transferred to the floor cross-member 35 as the first load path via the upper portion 56a of the inner bulkhead 56. In addition, a part of the remaining impact load F1 can be transferred to the battery cross-member 131 as the second load path via the lower portion 56b of the inner bulkhead 56 and the bulkhead upper half portion 152a.

Moreover, the remaining impact load F1 can be transferred to the battery cross-member 131 as the third load path via the side sill lower portion 83, the battery pack frame 29, and the bulkhead lower half portion 152b of the left bulkhead 152.

In this manner, the impact load F1 input laterally to the vehicle Ve can be dispersed and transmitted via transmission paths such as the first load path, the second load path, and the third load path. Thus, the floor cross-member 35 and the battery cross-member 131 can withstand the impact load F1.

Accordingly, falling deformation of the left side wall 124a of the battery pack 28 can be suppressed, and the battery pack 28 (that is, the battery 123) can be protected from the impact load F1.

In addition, since the impact load F1 input laterally to the vehicle Ve is dispersed and transmitted through the first to third load paths, there is no need to increase the height of the left side sill 14 and provide a bulkhead as a side sill load transmitting member inside the left side sill 14. Accordingly, the left side sill 14 does not become a hindrance when an occupant boards and alights, so that boarding/alighting properties for an occupant can be ensured favorably.

In addition, since there is no need to increase the height of the left side sill 14, increase in weight of the left side sill 14 (that is, weight of the vehicle body) can be suppressed.

Next, an example in which the battery 123 is protected by the vehicle body substructure 12 when the impact load F6 is input laterally to the vehicle Ve will be described based on FIGS. 16 and 17.

Figure 16:
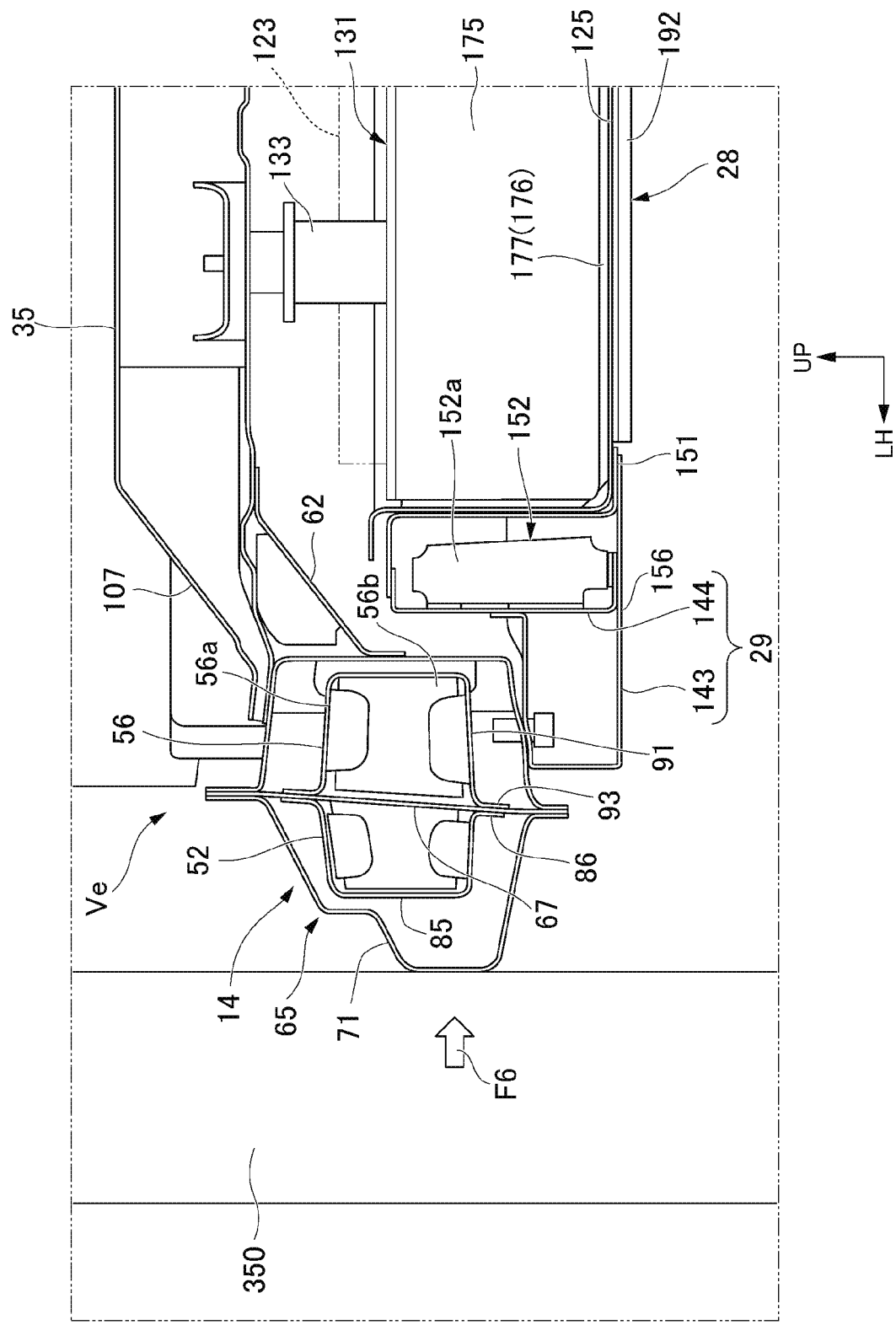
FIG. 16 is a cross-sectional view for describing an example in which an impact load is input laterally to a vehicle in the vehicle body substructure according to the first embodiment of the present invention.

As shown in FIG. 16, an obstacle 350 collides laterally to the vehicle Ve. Therefore, the impact load F6 is input laterally to the left side sill 14 of the vehicle Ve. The outward swelling portion 71 of the side sill outer 65 of the left side sill 14 is deformed inward in the vehicle width direction due to the impact load F6 input to the left side sill 14. The outward swelling portion 71 is deformed and abuts the bottom portion 85 of the outer bulkhead 52.

The joint flanges 86 and 93 of the outer bulkhead 52 and the inner bulkhead 56 are joined to each other with the stiffener 67 interposed therebetween. Thus, the box shape of the outer bulkhead 52 is restricted by the joint flange 86. In addition, the box shape of the inner bulkhead 56 is restricted by the joint flange 93.

Accordingly, since the outward swelling portion 71 abuts the bottom portion 85 of the outer bulkhead 52, the impact load F6 is transferred to the whole region (that is, the whole circumference) of the side wall 84 of the outer bulkhead 52. In addition, the impact load F6 is transferred to the whole region (that is, the whole circumference) of the side wall 91 of the inner bulkhead 56.

Due to the impact load F6, the whole circumference of the side wall 84 of the outer bulkhead 52 or the whole circumference of the side wall 91 of the inner bulkhead 56 is crushed through buckling due to the impact load F6, and the impact energy is absorbed.

Figure 17:
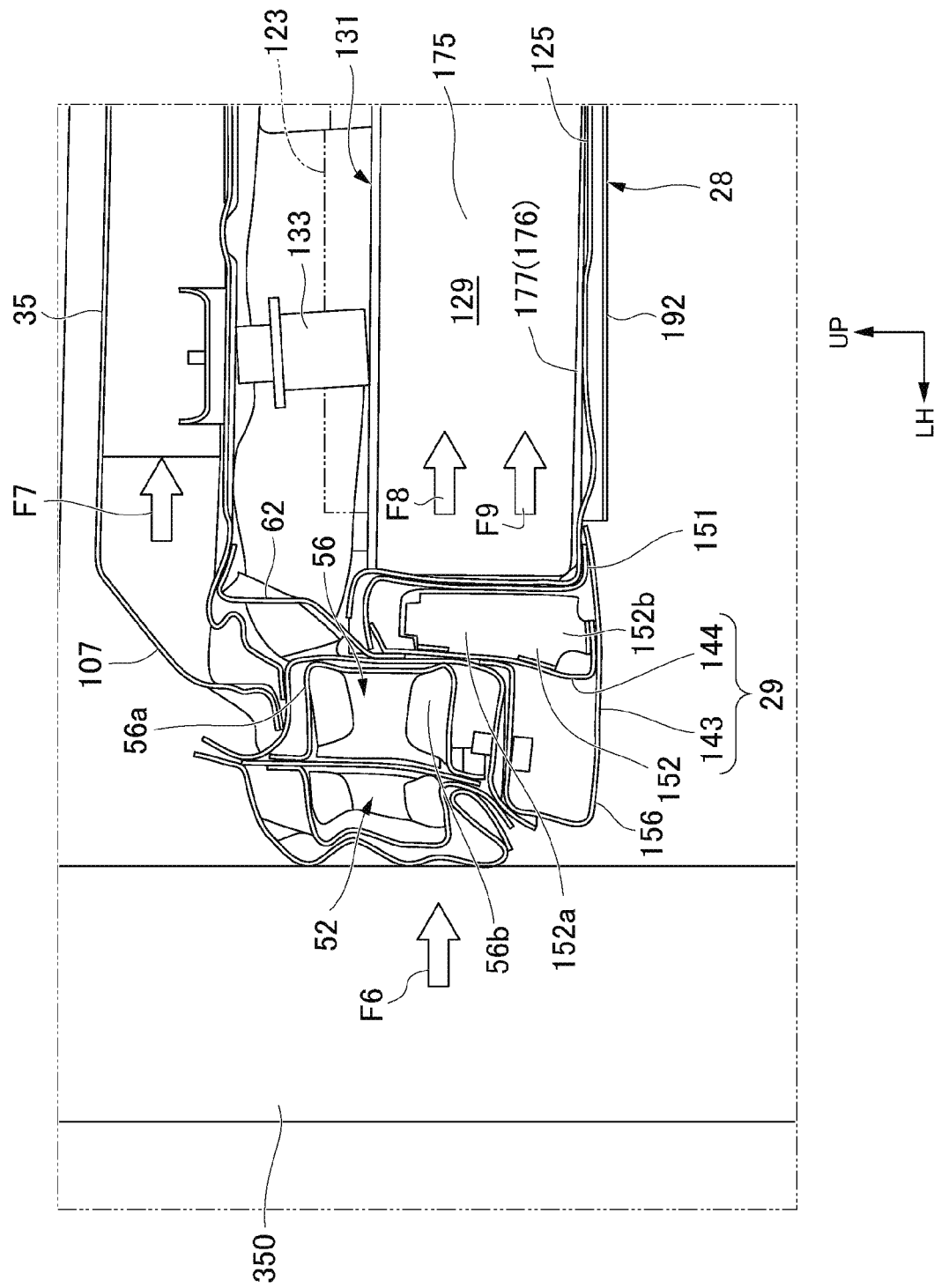
FIG. 17 is a cross-sectional view for describing an example in which a battery is protected from an impact load input laterally to the vehicle in the vehicle body substructure according to the first embodiment of the present invention.

As shown in FIG. 17, a part of the remaining load absorbed by the outer bulkhead 52 or the inner bulkhead 56 can be transferred to the floor cross-member 35 as a load F7 through the path of the first load path via the inclination portion 107 and the gusset 62.

In addition, a part of the remaining load can be transferred to the battery cross-member 131 (specifically, the strut portion 175) as a load F8 through the path of the second load path via the bulkhead upper half portion 152a.

Moreover, a part of the remaining load can be transferred to the battery cross-member 131 (specifically, the front seat portion 176 or the rear seat portion 177) as a load F9 through the path of the third load path via the frame extension portion 151 of the left battery pack frame 29.

The floor cross-member 35 withstands the load F7. In addition, the battery cross-member 131 withstands the load F8 and the load F9. Thus, the outer bulkhead 52 or the inner bulkhead 56 can be crushed sufficiently, and the impact energy of the impact load F6 can be absorbed favorably by the outer bulkhead 52 or the inner bulkhead 56.

Moreover, since the battery cross-member 131 withstands the load F8 and the load F9, the left bulkhead 152 can be crushed. Thus, the load F8 and the load F9 can be absorbed favorably by the battery pack frame 29.

Accordingly, the battery 123 accommodated in the inside 129 of the battery pack 28 can be protected from the impact load F6.

The technical scope of the present invention is not limited to the first embodiment described above, and various changes can be added within a range not departing from the gist of the present invention.

For example, in the foregoing first embodiment, an example in which the floor cross-member 35 is provided on the upper surface 16a of the floor panel 16 has been described, but the embodiment is not limited thereto. As an alternative example, for example, the floor cross-member 35 can be provided on the lower surface 16b of the floor panel 16.

In addition, in the foregoing first embodiment, the battery pack 28 has been described as example of an underfloor mounting component which is an in-vehicle component, but the embodiment is not limited thereto. The embodiment can also be applied to other components such as a fuel tank or a fuel cell stack as an alternative in-vehicle component.

A second embodiment of the present invention will be described based on the drawings. In the drawings, the arrow FR indicates the front side of the vehicle, the arrow UP indicates the upper side of the vehicle, and the arrow LH indicates the left side of the vehicle.

Figure 18:
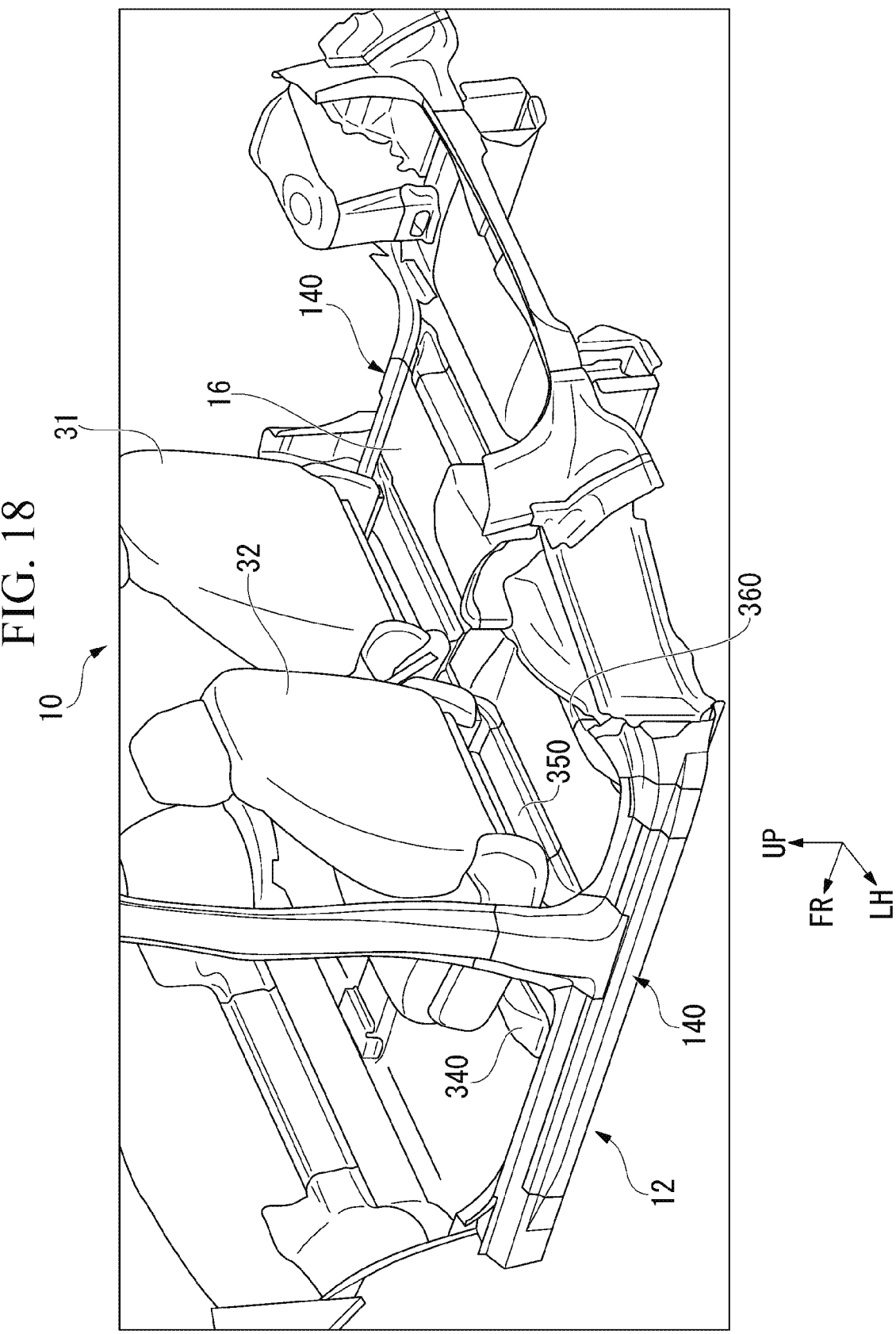
FIG. 18 is a perspective view showing a vehicle body substructure according to a second embodiment of the present invention.
Figure 19:
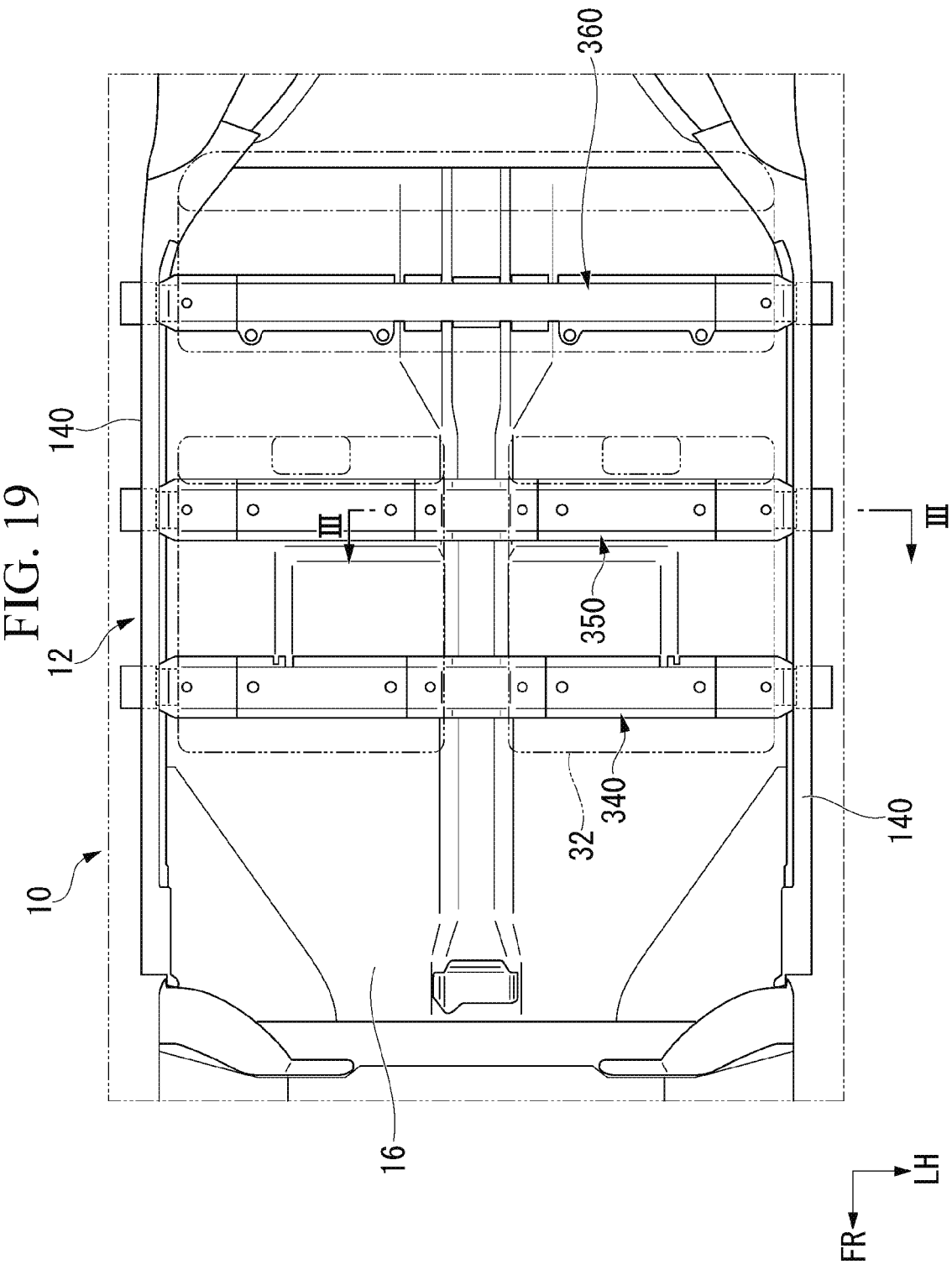
FIG. 19 is a plan view in which some components are removed from the vehicle body substructure according to the second embodiment of the present invention.
Figure 20:
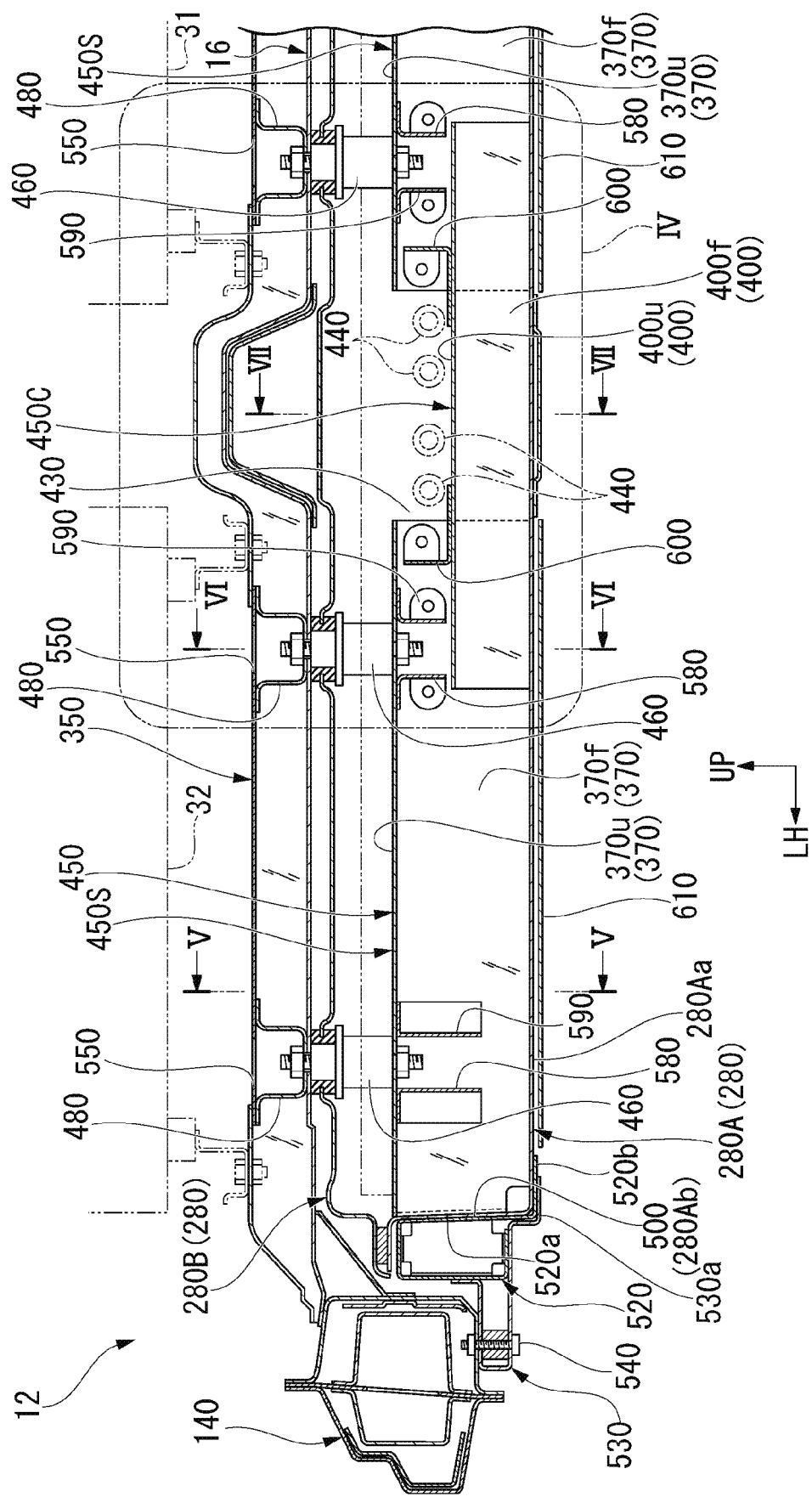
FIG. 20 is a cross-sectional view of the vehicle body substructure according to the second embodiment of the present invention cut along line III-III in FIG. 19.

FIG. 18 is a view of a skeleton part of the vehicle body 10 according to the present embodiment viewed from obliquely above on the left side in a rear portion, and FIG. 19 is a view of the vehicle body substructure 12 of the vehicle body 10 viewed from above. In addition, FIG. 20 is a cross-sectional view of the vehicle body substructure 12 taken along line III-III in FIG. 19.

The vehicle body substructure 12 is a structure body positioned on a lower portion side of the vehicle body 10 and is a structure body including a pair of side sills 140 which are disposed in the left and right side portions on a lower end side of the vehicle body and extend substantially in the front-rear direction of the vehicle body.

The vehicle body substructure 12 includes the pair of side sills 140, the floor panel 16 of which both end portions in the vehicle width direction are laid between the left and right side sills 140, a plurality of floor cross-members 340, 350, and 360 (vehicle body-side cross-members) which are disposed on an upper surface side of the floor panel 16, a battery case 280 which is laid between the left and right side sills 140 on a lower side of the floor panel 16 (refer to FIG. 20), and a plurality of battery cross-members (underfloor cross-member) 450 which are provided inside the battery case 280. In the case of the present embodiment, front and rear installation portions for each of the driver's seat 31 and the passenger seat 32 installed inside the vehicle cabin are attached to two floor cross-members 340 and 350 on the front side.

All of the floor cross-members 340, 350, and 360 extend substantially in the vehicle width direction, and both end portions thereof in an extending direction are coupled to the left and right side sills 140. The floor cross-members 340, 350, and 360 are disposed away from each other in the front-rear direction of the vehicle body.

Figure 27:
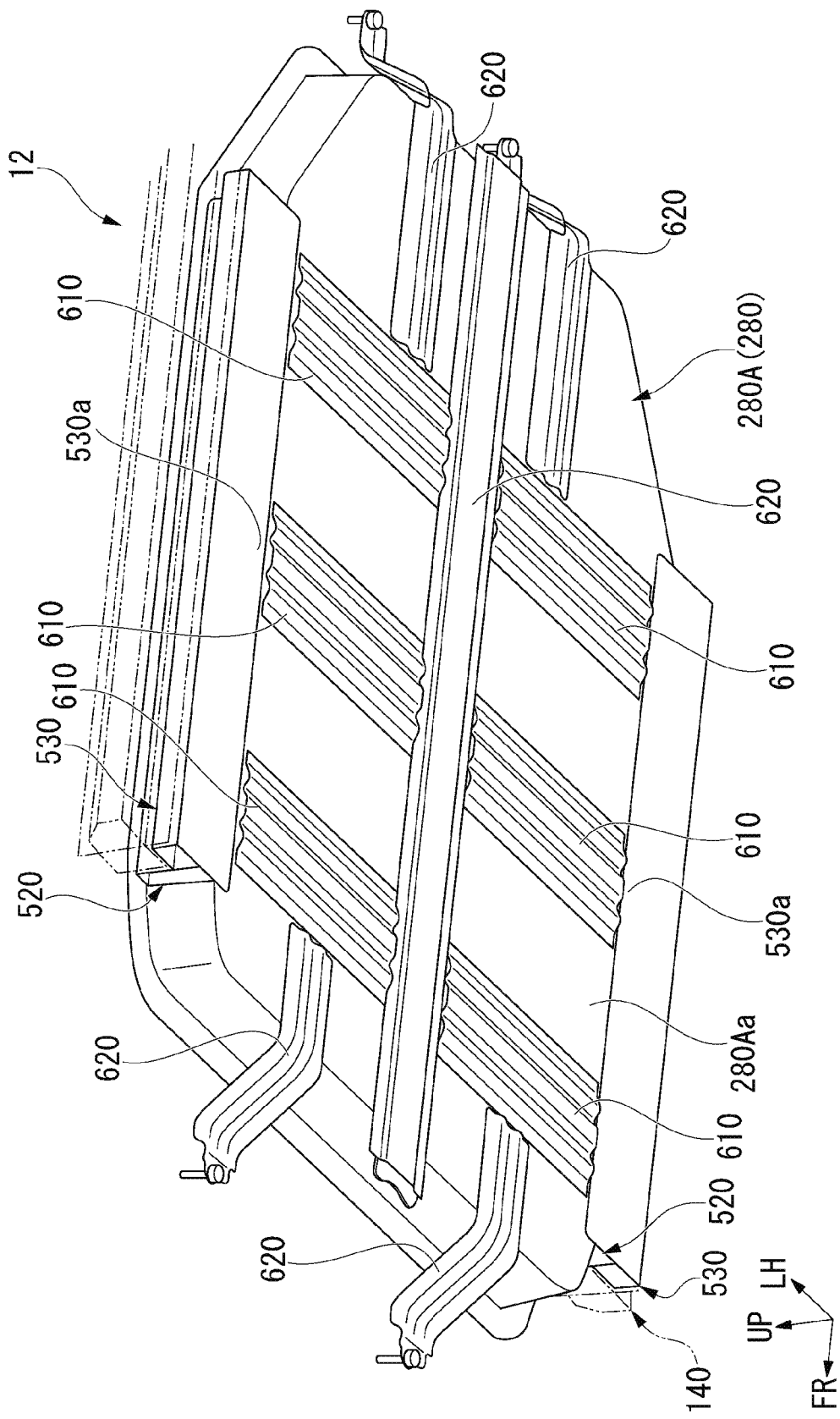
FIG. 27 is a perspective view of the vehicle body substructure according to the second embodiment of the present invention.

FIG. 27 is a view of the battery case 280 and surrounding components attached to an outer portion of the battery case 280 viewed from obliquely below on the left side in a front portion.

As shown in FIGS. 20 and 27, the battery case 280 includes a case main body 280A which opens upward, and a case cover 280B which blocks an opening of an upper portion of the case main body 280A. In a plan view, the case main body 280A includes a bottom wall 280Aa which has a substantially rectangular shape, and circumferential walls 280Ab which rise upward from a surrounding area of the bottom wall 280Aa. Hereinafter, parts of the circumferential walls 280Ab rising upward from the left and right side end portions will be referred to as case side walls 500.

A plurality of batteries 510 (refer to FIGS. 23 and 24), and the plurality of battery cross-members 450 which extend substantially in the vehicle width direction such that the inside of the battery case 280 is partitioned into front and rear sections are disposed inside the battery case 280. In the case of the present embodiment, three battery cross-members 450 are provided. The battery cross-members 450 are respectively disposed at positions immediately below the floor cross-members 340, 350, and 360 on the floor panel 16. Three floor cross-members 340, 350, and 360 and the battery cross-members 450 are disposed in substantially parallel to each other.

Structures in cross sections (cross sections substantially orthogonal to the front-rear direction of the vehicle body) including the floor cross-members 340, 350, and 360 and the corresponding battery cross-members 450 are substantially similar to each other. Therefore, hereinafter, a cross section including the floor cross-member 350 at the center in the front-rear direction and the battery cross-member 450 therebelow will be described representatively as a cross-sectional structure of the vehicle body substructure 12.

As shown in FIGS. 20 and 27, each of case frames 520 having an angled tube shape extending substantially in the front-rear direction of the vehicle body is coupled to an outer side surface of the case side wall 500 of the case main body 280A. In the case frame 520, a lower end of a side wall 520a on the inner side joined to the case side wall 500 of the case main body 280A is bent inward in the vehicle width direction, and an extension piece 520b is provided at the tip of a bent portion. The extension piece 520b overlaps a lower surface of the bottom wall 280Aa of the case main body 280A and is joined to the lower surface of the bottom wall 280Aa.

In addition, an attachment frame 530 swelling from a lower portion region of the case frame 520 outward in the vehicle width direction is coupled to an outer side of the case frame 520 in the vehicle width direction. In a state of being coupled to the case frame 520, the attachment frame 530 forms a rectangular cross section elongated laterally together with the side walls of the case frame 520 on the outer side. This rectangular cross section extends substantially in the front-rear direction of the vehicle body. The attachment frame 530 overlaps each of the lower surfaces of the left and right side sills 140 on the inner side and is coupled to the lower surfaces of the side sills 140 using fastening members 540.

In addition, a lower wall of the attachment frame 530 is joined to a lower surface of the case frame 520, and a frame extension piece 530a extending around a lower surface side of the bottom wall 280Aa of the case main body 280A is provided in a tip end portion of the lower wall thereof. The frame extension piece 530a overlaps a lower surface of the extension piece 520b of the case frame 520 and is joined to the lower surface of the bottom wall 280Aa of the case main body 280A together with the extension piece 520b. For example, the frame extension piece 530a, the extension piece 520b, and the bottom wall 280Aa are joined to each other through welding in a three-layered state.

In FIG. 27, the detailed shape of the case frame 520 is omitted for convenience of illustration.

Figure 21:
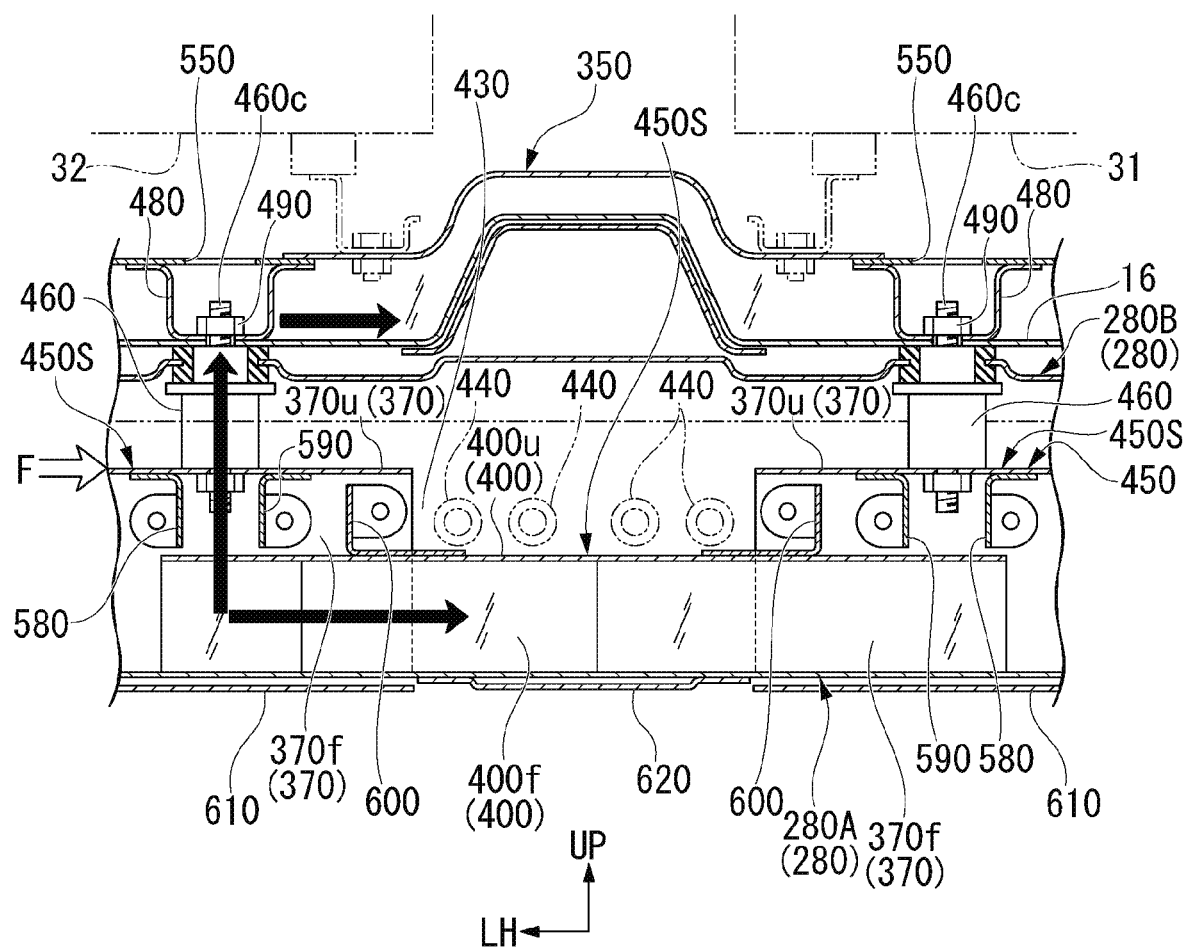
FIG. 21 is an enlarged cross-sectional view showing a IV-part in FIG. 20 in the vehicle body substructure according to the second embodiment of the present invention.
Figure 22:
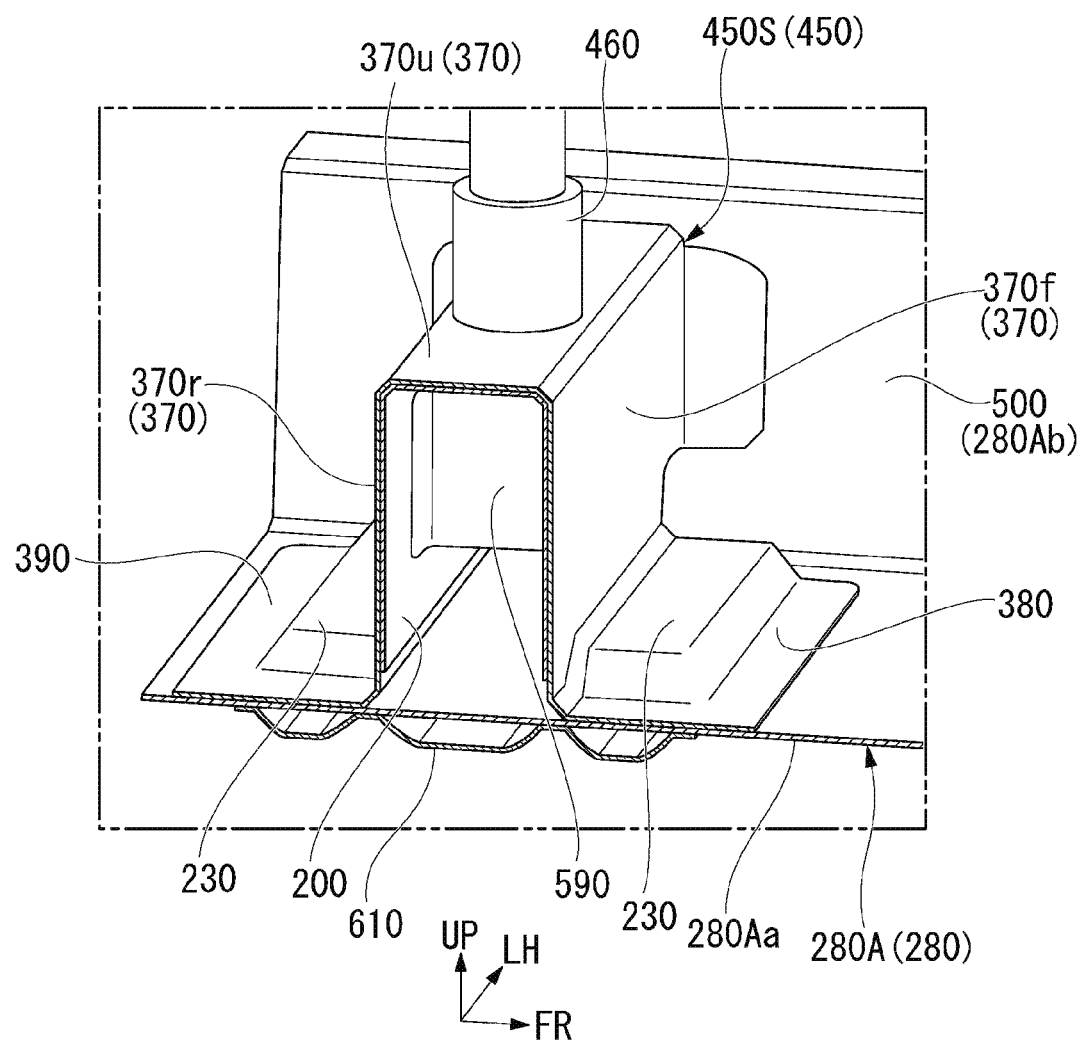
FIG. 22 is a perspective view of a partial cross section at a part of the vehicle body substructure according to the second embodiment of the present invention cut along line V-V in FIG. 20.
Figure 23:
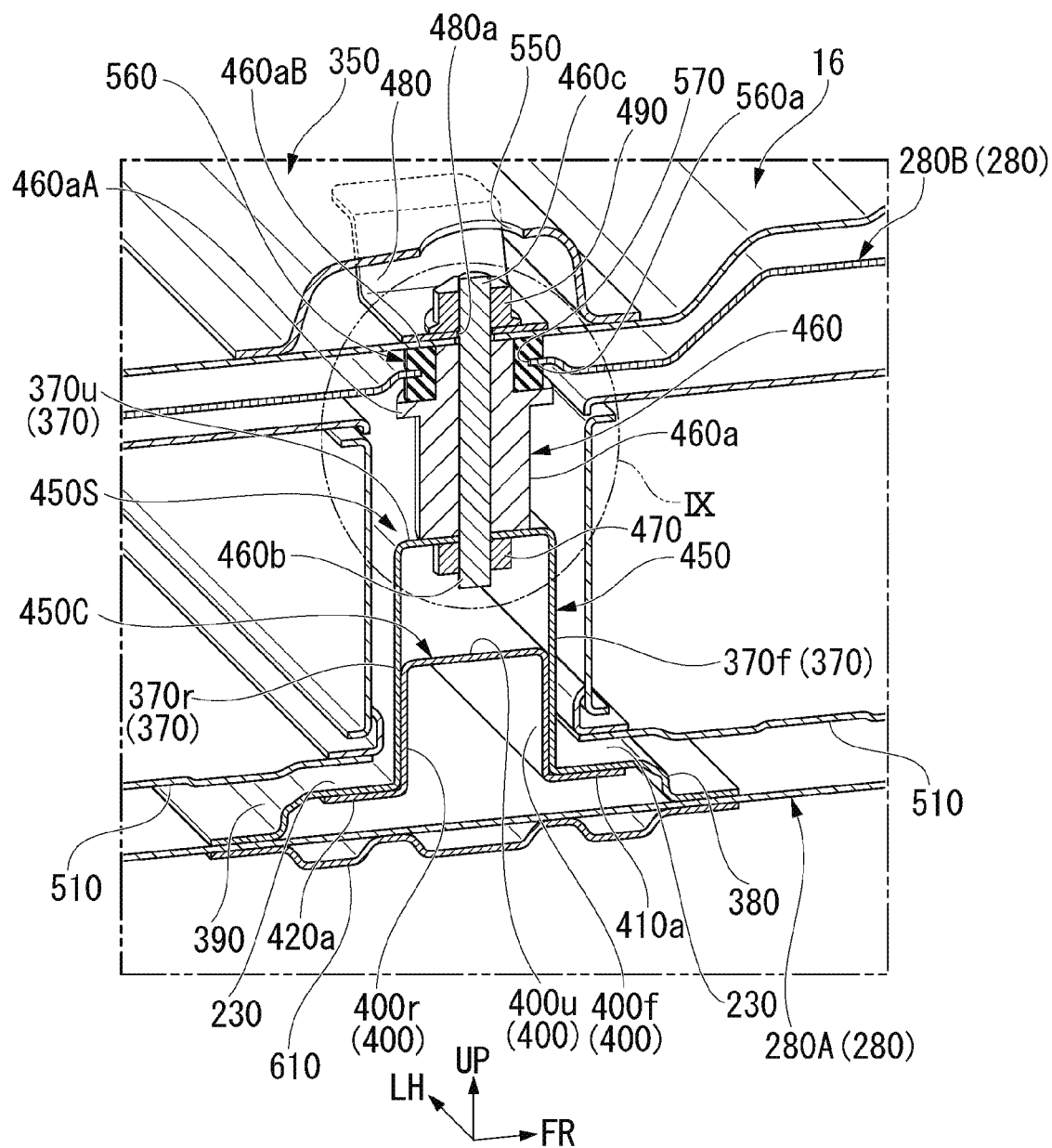
FIG. 23 is a perspective view of a partial cross section at a part of the vehicle body substructure according to the second embodiment of the present invention cut along line VI-VI in FIG. 20.
Figure 24:
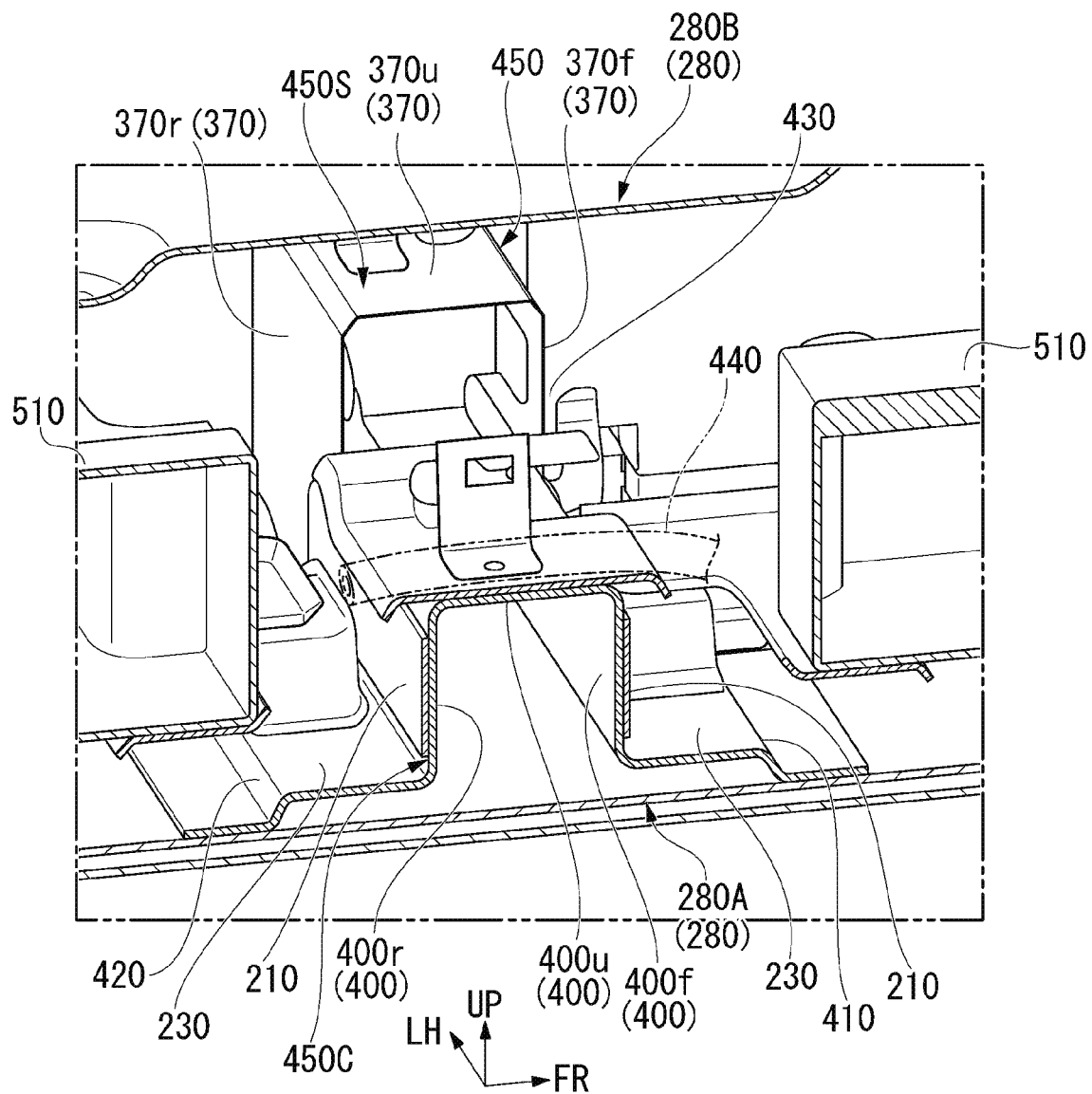
FIG. 24 is a perspective view of a partial cross section at a part of the vehicle body substructure according to the second embodiment of the present invention cut along line VII-VII in FIG. 20.
Figure 25:
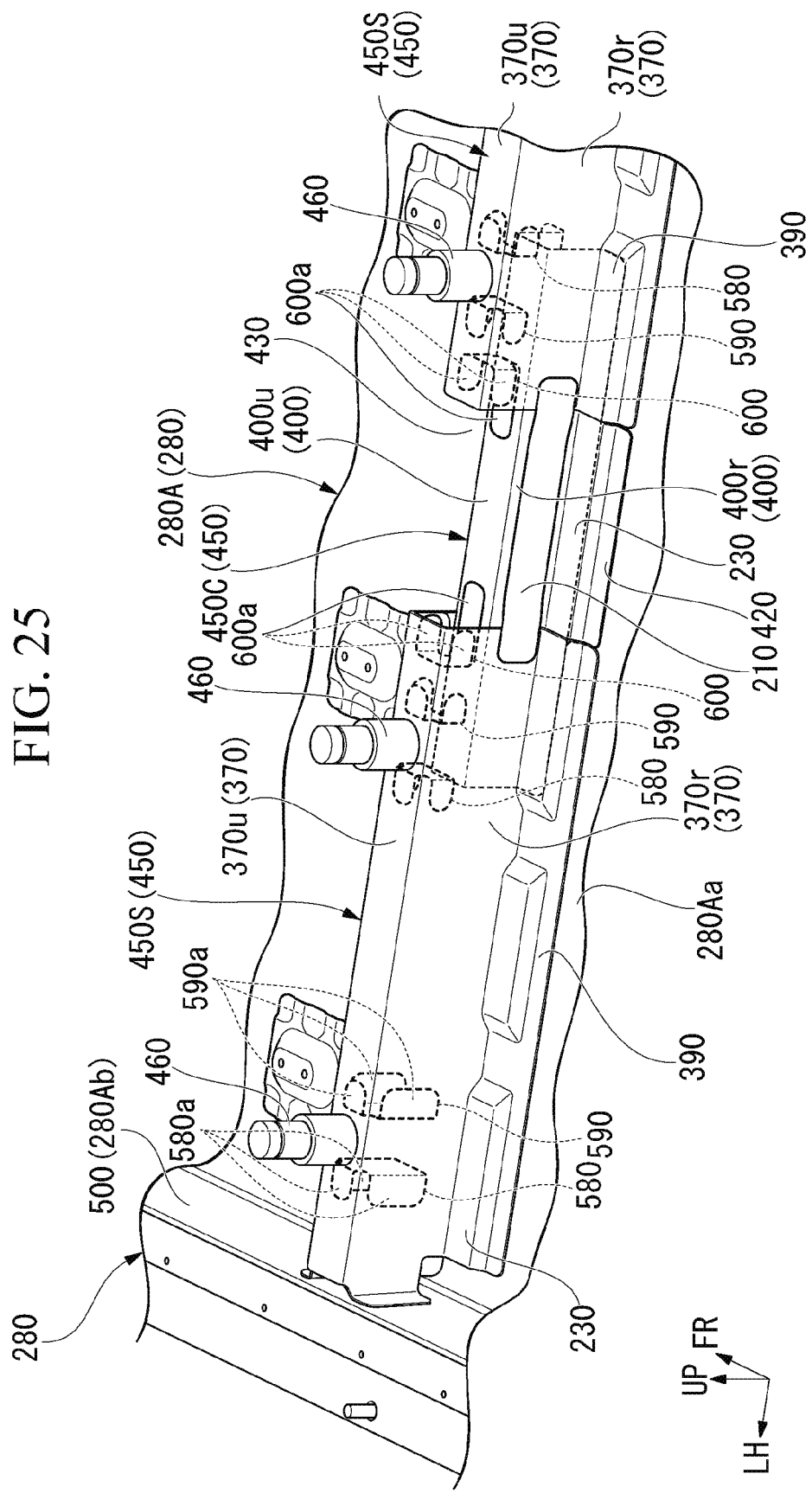
FIG. 25 is a perspective view of a part of the vehicle body substructure according to the second embodiment of the present invention.
Figure 26:
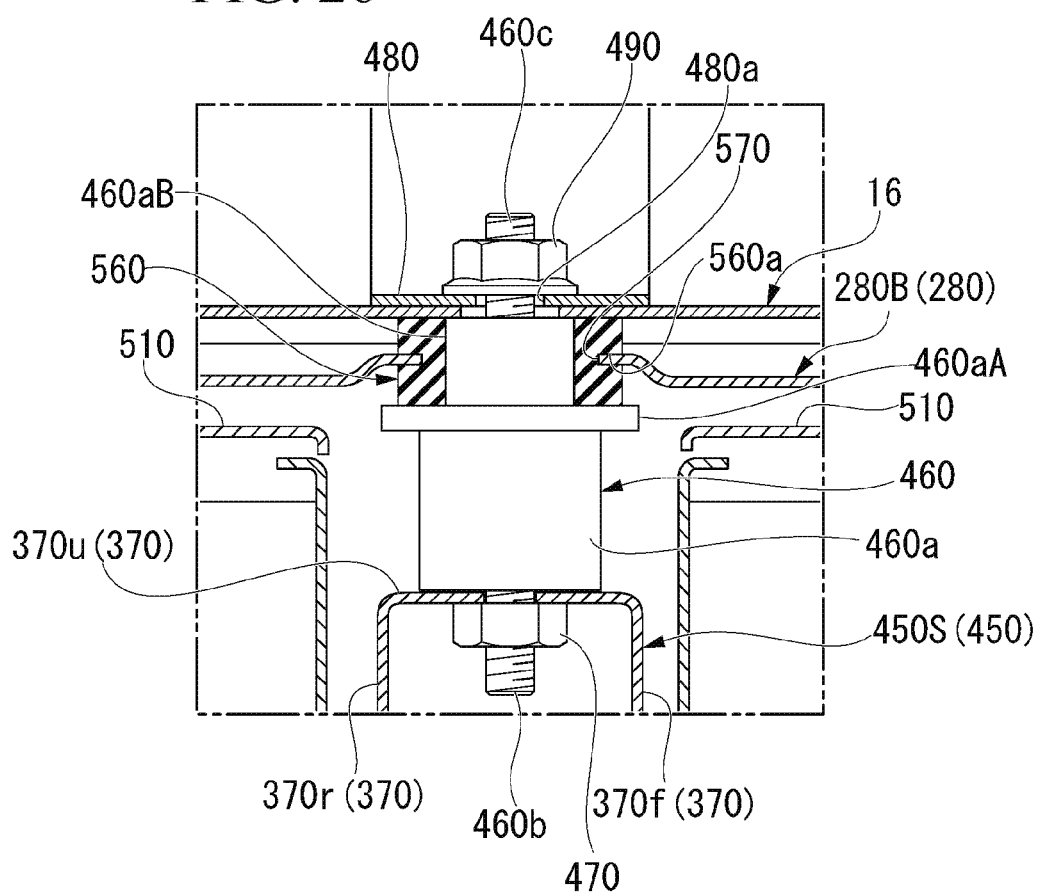
FIG. 26 is an enlarged cross-sectional view showing the same part as a IX-part in FIG. 23 in the vehicle body substructure according to the second embodiment of the present invention.

FIG. 21 is an enlarged view showing a IV-part in FIG. 20. FIG. 22 is a perspective view of the vehicle body substructure 12 including a cross section taken along line V-V in FIG. 20. FIG. 23 is a perspective view of the vehicle body substructure 12 including a cross section taken along line VI-VI in FIG. 20. FIG. 24 is a perspective view of the vehicle body substructure 12 including a cross section taken along line VII-VII in FIG. 20. In addition, FIG. 25 is a view of a part inside the battery case 280 of the vehicle body substructure 12 viewed from obliquely above on the right side in a rear portion. FIG. 26 is an enlarged cross-sectional view of the same part as the IX-part in FIG. 23.

As shown in FIGS. 20 and 21, the battery cross-member 450 includes left and right side portion members 450S which are disposed on the left and right sides in the vehicle width direction, and a central member 450C which is disposed at the center in the vehicle width direction. The left and right side portion members 450S are formed to have the same shape as each other. In all of the side portion members 450S and the central member 450C, a cross section orthogonal to the vehicle width direction has a substantially hat-shaped cross-sectional shape. However, the height of an upper surface of the central member 450C is set lower than the height of upper surfaces of the side portion members 450S.

As shown in FIGS. 22 and 23, the side portion member 450S has a front wall 370f, an upper wall 370u, and a rear wall 370r. The side portion member 450S includes a member main body portion 370 which has a substantially U-shaped cross section and stands upright, a forward protruding seat 380 which protrudes forward from a lower edge of the front wall 370f, and a rearward protruding seat 390 which protrudes rearward from a lower edge of the rear wall 370r. Similarly, as shown in FIGS. 23 and 24, the central member 450C has a front wall 400f, an upper wall 400u, and a rear wall 400r. The central member 450C includes a member main body portion 400 which stands upright and has a substantially U-shaped cross section, a forward protruding seat 410 which protrudes forward from a lower edge of the front wall 40f, and a rearward protruding seat 420 which protrudes rearward from a lower edge of the rear wall 400r. As shown in FIGS. 20, 23, and 25, in the central member 450C, end edges on both sides in the vehicle width direction are inserted into the inner sides of the left and right side portion members 450S and are welded and fixed respectively to the left and right side portion members 450S in an overlapping state by a predetermined amount in the vehicle width direction.

Specifically, the left and right end edges of the central member 450C are welded and fixed to inner surfaces of the front wall 370f and the rear wall 370r of the side portion member 450S corresponding to a front surface of the front wall 400f and a rear surface of the rear wall 400r. The upper wall 400u and the corresponding upper wall 370u of the side portion member 450S are separated from each other by a predetermined distance. In addition, in the forward protruding seat 410 and the rearward protruding seat 420 of the left and right end edges of the central member 450C, parts thereof on the front and rear sides are cut and constitute joint pieces 410a and 420a as shown in FIG. 23. Upper surfaces of the joint pieces 410a and 420a are welded and fixed to lower surfaces on a proximal portion side of the forward protruding seat 380 and the rearward protruding seat 390 of the corresponding left and right side portion members 450S.

In the central member 450C, only the left and right end edges overlap the left and right side portion members 450S, and a central region does not overlap the side portion members 450S. Therefore, a recessed portion 430 allowing communication in the front-rear direction of the vehicle body is formed between the left and right side portion members 450S by the upper surface of the central member 450C and end surfaces of the left and right side portion members 450S on the inner sides in the vehicle width direction. As shown in FIGS. 20 and 24, a member such as a distribution cable 440 straddling the battery cross-member 450 forward and rearward is disposed in this recessed portion 430.

A plurality of places separated from each other in the vehicle width direction in an upper portion of the battery cross-member 450 are coupled to the corresponding floor cross-member 350 thereabove using a plurality of stud bolts 460. Specifically, the upper walls 370u of the left and right side portion members 450S are coupled respectively to the left half portion and the right half portion of the floor cross-member 350 using two stud bolts 460 for each.

As shown in FIGS. 23 and 26, the stud bolt 460 has a body portion 460a at the center of a substantially columnar shape, a screw portion 460b on a lower side protruding downward from a lower surface of the body portion 460a, and a screw portion 460c on an upper side protruding upward from an upper surface of the body portion 460a.

In each of the left and right side portion members 450S, a lower end of the stud bolt 460 is coupled to a part closer to the outer side and a part closer to the inner side in the vehicle width direction in the upper wall 370u of the member main body portion 370. As shown in FIGS. 23 and 26, each of the stud bolts 460 is fixed to the side portion member 450S by a nut 470 which is screwed to the screw portion 460b penetrating the upper wall 370u of the member main body portion 370 downward from above. In addition, in each of the stud bolts 460, the screw portion 460c penetrating the floor panel 16 upward from below further penetrates a bracket 480 of the floor cross-member 350 upward, and a nut 490 is screwed to the screw portion 460c. Accordingly, an upper portion of the stud bolt 460 is fixed to the floor cross-member 350.

The bracket 480 is a metal member which has a substantially hat-shaped cross section and also serves as a cross section reinforcing portion of the floor cross-member 350. A part corresponding to a hat-shaped flange portion is joined to a lower surface of an upper wall of the floor cross-member 350, and an insertion hole 480a, into which the screw portion 460c of the stud bolt 460 is inserted, is formed in a part corresponding to a hat-shaped apex portion. The stud bolt 460 is welded to the upper wall of the floor cross-member 350 such that the hat-shaped apex portion is directed downward. A work hole 550 for tightening the nut 490 into the screw portion 460c protruding upward from the insertion hole 480a is formed in a part of the upper wall of the floor cross-member 350 facing the insertion hole 480a of the bracket 480.

As shown in FIGS. 23 and 26, a support flange 460aA and a shaft portion 460aB which has a small diameter and protrudes upward from the support flange 460aA are provided in the body portion 460a of the stud bolt 460. An elastic seal member 560 having a cylindrical shape with a thick wall is fitted to the shaft portion 460aB. A support groove 560a is provided on an outer circumferential surface of the elastic seal member 560. A part of the support groove 560a is interlocked with a circumferential edge portion of a penetration hole 570 of the case cover 280B. The body portion 460a of the stud bolt 460 is held in the penetration hole 570 of the case cover 280B with the elastic seal member 560 interposed therebetween. In addition, a lower surface of the elastic seal member 560 abuts an upper surface of the support flange 460aA, and an upper surface of the elastic seal member 560 abuts a lower surface of the floor panel 16.

Here, the installation portions (coupling portions with respect to the floor cross-member 350) of the stud bolts 460 closer to the inner sides of the left and right side portion members 450S in the vehicle width direction are disposed above coupling regions of the central member 450C and the side portion members 450S. In other words, the side portion members 450S are coupled to the central member 450C in the vicinity of parts below the installation portions (coupling portions with respect to the floor cross-member 350) of the stud bolts 460.

In addition, inside each of the left and right side portion members 450S, as shown in FIGS. 20, 21, 25, and the like, a first partition wall member (partition wall member) 580 and a second partition wall member (partition wall member) 590 are provided in front of and behind each of the installation portions of the stud bolts 460 in the extending direction of the side portion members 450S. Both the first partition wall member 580 and the second partition wall member 590 have joint flanges 580a and 590a (refer to FIG. 25) and are fixed to at least three surfaces such as the front wall 370f, the upper wall 370u, and the rear wall 370r of the side portion member 450S through welding or the like.

The first partition wall member 580 and the second partition wall member 590 disposed closer to the inner side of the side portion member 450S in the vehicle width direction are disposed on an upper side of a joint region of the side portion member 450S and the central member 450C. That is, the central member 450C is coupled to each of the left and right side portion members 450S in lower regions of the first partition wall member 580 and the second partition wall member 590. Therefore, a closed cross section constituted by the central member 450C and the left and right side portion members 450S coupled to each other is reinforced internally by the first partition wall member 58 and the second partition wall member 59.

In addition, auxiliary partition wall members 600, which substantially block gaps between the end portions of the left and right side portion members 450S on the inner sides in the vehicle width direction facing the recessed portion 430 and the central member 450C, are coupled to both thereof. The auxiliary partition wall member 600 has a joint flange 600a and is coupled to the inner surfaces of the front wall 370f and the rear wall 370r of the side portion member 450S and an upper surface of the upper wall 400u of the central member 450C through welding or the like.

As shown in FIG. 22, a reinforcement plate 200 which has a substantially U-shaped cross section and is joined to the upper wall 370u, the front wall 370f, and the rear wall 370r of the member main body portion 370 is disposed inside the member main body portion 370 of each of the left and right side portion members 450S. That is, in the member main body portion 370, each wall is constituted as a double wall due to the metal reinforcement plate 200, and each of the members described above is coupled to each of the walls reinforced by the reinforcement plate 200.

In addition, as shown in FIGS. 24 and 25, a metal reinforcement plate 210 is individually laid between front surfaces of the front walls 370f and between rear surfaces of the rear walls 370r of the left and right side portion members 450S. The reinforcement plate 210 is formed of a rectangular metal plate extending in the vehicle width direction, and edge portions on both sides in the vehicle width direction are coupled to the front walls 370f of the left and right side portion members 450S or the rear walls 370r of the left and right side portion members 450S through welding or the like.

As described above, the left and right side portion members 450S and the central member 450C of the battery cross-member 450 have the forward protruding seats 380 and 410 which protrude forward from the lower edges of the front walls 370f and 400f of the member main body portions 370 and 400, and the rearward protruding seats 390 and 420 which protrude rearward from the lower edges of the rear walls 370r and 400r of the member main body portions 370 and 400. That is, the side portion members 450S and the central member 450C are formed to have an inverted T-shaped cross section.

In the battery cross-member 450, the forward protruding seats 380 and 410 and the rearward protruding seats 390 and 420 are disposed to face an upper surface of the bottom wall 280Aa of the battery case 280. In contrast, a lower surface reinforcement member 610 is disposed at a position immediately below the installation portion of the battery cross-member 450 on the lower surface of the bottom wall 280Aa of the battery case 280.

The lower surface reinforcement member 610 is constituted of a plate-shaped metal member of which a substantially wave-shaped cross section extends substantially in the vehicle width direction. The forward protruding seats 380 and 410 and the rearward protruding seats 390 and 420 of the battery cross-member 450 are coupled to the lower surface reinforcement member 610 in a state where the bottom wall 280Aa of the battery case 280 is sandwiched therebetween. For example, flat flanges of the forward protruding seats 380 and 410 and the rearward protruding seats 390 and 420 and a flat flange of the lower surface reinforcement member 610 overlap the upper and lower surfaces of the bottom wall 280Aa, and the members are welded to each other in a three-layered manner in such a state. Accordingly, in the battery cross-member 450, the forward protruding seats 380 and 410 and the rearward protruding seats 390 and 420 protruding forward and rearward from the member main body portions 370 and 400 are integrated with the lower surface reinforcement member 610 on the lower surface with the bottom wall 280Aa interposed therebetween.

As shown in FIG. 27, an alternative lower surface reinforcement member 620 extending substantially in the front-rear direction of the vehicle body is coupled to the lower surface of the bottom wall 280Aa of the battery case 280. Accordingly, the bottom wall 280Aa of the battery case 280 is reinforced firmly on a lower surface side in the front-rear direction of the vehicle body and the vehicle width direction.

In addition, as shown in FIGS. 22 to 24, a pedestal portion 230 which swells upward with respect to a surface joined to the bottom wall 280Aa at a circumferential edge and has a flat upper surface is provided in a part on the proximal portion side (side connected to the member main body portions 370 and 400) of the forward protruding seats 380 and 410 and the rearward protruding seats 390 and 420 of the battery cross-member 450. As shown in FIG. 23, the battery 510 can be placed on an upper surface of the pedestal portion 230. In addition, a lower surface side of the pedestal portion 230 communicates with an internal space of the member main body portion 370.

Hereinabove, as described above, in the vehicle body substructure 12 according to the present embodiment, the battery cross-member 450 has the left and right side portion members 450S and the central member 450C having a substantially hat-shaped cross section. The upper surface of the central member 450C is formed lower than the upper surfaces of the left and right side portion members 450S. The recessed portion 430 allowing communication in the front-rear direction is constituted by the upper surface of the central member 450C and the end portions of the left and right side portion members 450S on the inner sides in the vehicle width direction. Therefore, the recessed portion 430 provided in the battery cross-member 450 can be used as an insertion groove for a distribution cable or the like, and a main portion of the battery cross-member 450 can be constituted of a press-formed article or the like which can be manufactured at low cost.

In addition, in the vehicle body substructure 12 according to the present embodiment, each of the left and right side portion members 450S is coupled to the floor cross-member 350 thereabove, and each of the side portion members 450S is coupled to the central member 450C in the vicinity of a part below each of the coupling portions (fastening portions of the stud bolts 460). Therefore, as shown in FIG. 21, when an impact load F is input laterally to the side portion member 450S of the battery cross-member 450 through the side sill 140 of the vehicle body, the input load F can be dispersed to and supported by the floor cross-member 350 and the central member 450C. Therefore, while a structure of the battery cross-member 450 which can be manufactured at low cost is employed, bending of the battery cross-member 450 in the central region can be suppressed when the impact load F is input from the side sill 140.

Thus, in the vehicle body substructure 12 according to the present embodiment, while the recessed portion 430 allowing communication in the front-rear direction is constituted substantially in the central region of the battery cross-member 450 in the vehicle width direction, a sufficient rigidity in the vehicle width direction can be ensured without causing an increase in manufacturing cost.

In addition, in the vehicle body substructure 12 according to the present embodiment, the first partition wall member 580 and the second partition wall member 590 are provided at positions in front of and behind the coupling portion (fastening portion of the stud bolt 460) with respect to the floor cross-member 350 in the extending direction of the left and right side portion members 450S. The first partition wall member 580 and the second partition wall member 590 are fixed to at least three surfaces such as the front wall 370f, the upper wall 370u, and the rear wall 370r of the side portion member 450S. Therefore, cross sections at the positions in front of and behind the coupling portion with respect to the floor cross-member 350 of each of the left and right side portion members 450S are reinforced firmly by the first partition wall member 580 and the second partition wall member 590. Therefore, in a case where the vehicle body substructure 12 according to the present embodiment is employed, when an impact load is input laterally to the side portion member 450S of the vehicle body, crushing of a cross section of the side portion member 450S in the vicinity of the coupling portion with respect to the floor cross-member 350 can be suppressed.

Particularly, in the case of the vehicle body substructure 12 according to the present embodiment, since the central member 450C is coupled to the left and right side portion members 450S in the lower regions of the first partition wall member 580 and the second partition wall member 590, a closed cross section constituted by the central member 450C and the side portion member 450S coupled to each other is reinforced internally by the first partition wall member 580 and the second partition wall member 590. Therefore, crushing of a cross section of the side portion member 450S can be suppressed more effectively by employing this constitution.

In addition, in the vehicle body substructure 12 according to the present embodiment, the stud bolts 460 fastened to the upper walls 370u of the side portion members 450S are used in the coupling portions of the left and right side portion members 450S with respect to the floor cross-member 350. The first partition wall member 580 and the second partition wall member 590 are provided in front of and behind the protruding position of the stud bolt 460 in the extending direction of the left and right side portion members 450S. Therefore, the floor cross-member 350 and the left and right side portion members 450S separated from each other in the up-down direction can be easily coupled to each other using the stud bolts 460. In addition, crushing of a cross section in the fastening portions of the stud bolts 460 of the left and right side portion members 450S when an impact load is input laterally can be suppressed by a closed cross section formed by the central member 450C and the side portion member 450S, and the first partition wall member 580 and the second partition wall member 590.

Moreover, in the vehicle body substructure 12 according to the present embodiment, the screw portion 460c of the stud bolt 460 protrudes upward from the case cover 280B of the battery case 280, so that the battery case 280 is fastened and fixed to the floor cross-member 350 by the screw portion 460c. In addition, the body portion 460a of the stud bolt 460 is held in the penetration hole 570 of the case cover 280B with the elastic seal member 560 interposed therebetween. Therefore, the body portion 460a of the stud bolt 460 is held in the penetration hole 570 of the case cover 280B with the elastic seal member 560 interposed therebetween. Therefore, the position or the direction of the screw portion 460c protruding upward from the case cover 280B can be adjusted finely at the time of work of fastening the floor cross-member 350 to the stud bolt 460. Therefore, when this constitution is employed, workability of fastening the floor cross-member 350 to the stud bolt 460 becomes favorable.

In addition, in the vehicle body substructure 12 of the present embodiment, the penetration hole 570 of the case cover 280B can be blocked by the elastic seal member 560. Therefore, infiltration of water into the battery case 280 through the penetration hole 570 of the case cover 280B can be suppressed by the elastic seal member 560.

In addition, in the vehicle body substructure 12 according to the present embodiment, the auxiliary partition wall members 600 substantially blocking gaps between the lower surfaces of the side portion members 450S and the upper surface of the central member 450C are coupled to the end edges of the left and right side portion members 450S on the inner sides in the vehicle width direction and the central member 450C. Therefore, crushing of a cross section at the end edge of each of the left and right side portion members 450S on the inner sides in the vehicle width direction can be suppressed by the auxiliary partition wall member 600, so that the rigidity of the battery cross-member 450 can be further enhanced. In addition, the gap between the end edge of each of the left and right side portion members 450S on the inner sides in the vehicle width direction and the central member 450C is substantially blocked by the auxiliary partition wall member 600. Therefore, entry of a foreign substance into the side portion member 450S from the end portion of each of the left and right side portion members 450S on the inner sides in the vehicle width direction can be suppressed.

In addition, in the vehicle body substructure 12 according to the present embodiment, the battery cross-member 450 includes the forward protruding seats 380 and 410 which protrude forward from the lower edges of the front walls 370f and 400f, and the rearward protruding seats 390 and 420 which protrude rearward from the lower edges of the rear walls 370r and 400r. The forward protruding seats 380 and 410 and the rearward protruding seats 390 and 420 are disposed on the upper surface side of the bottom wall 280Aa of the battery case 280. The lower surface reinforcement member 610 is disposed on the lower surface side of the bottom wall 280Aa. The forward protruding seats 380 and 410 and the rearward protruding seats 390 and 420 are coupled to the lower surface reinforcement member 610 in a state where the bottom wall 280Aa is sandwiched therebetween.

In the vehicle body substructure 12 of the present embodiment, due to this constitution, the forward protruding seats 380 and 410 and the rearward protruding seats 390 and 420 are integrated with the bottom wall 280Aa of the battery case 280 together with the lower surface reinforcement member 610. Therefore, even when a load in the front-rear direction is input to the battery cross-member 450 from the floor cross-member 350 side through the stud bolt 460, falling of the battery cross-member 450 in the front-rear direction can be suppressed. Therefore, in this vehicle body substructure 12, the front and rear lower ends of the battery cross-member 450 can be supported by the battery case 280 with a high rigidity.

Particularly, as in the present embodiment, when the lower surface reinforcement member 610 is constituted of a plate-shaped portion seat which has a substantially wave-shaped cross section and extends substantially in the vehicle width direction, while increase in weight of the vehicle body is suppressed, the rigidity of the bottom wall 280Aa of the battery case 280 can be enhanced efficiently.

Moreover, in the vehicle body substructure 12 according to the present embodiment, not only the lower surface reinforcement member 610 extending substantially in the vehicle width direction but also the alternative lower surface reinforcement member 620 extending substantially in the front-rear direction of the vehicle body are coupled to the lower surface of the bottom wall 280Aa of the battery case 280. Therefore, in the vehicle body substructure 12 of the present embodiment, the rigidity of the bottom wall 280Aa of the battery case 280 in its entirety can be enhanced.

Figure 28:
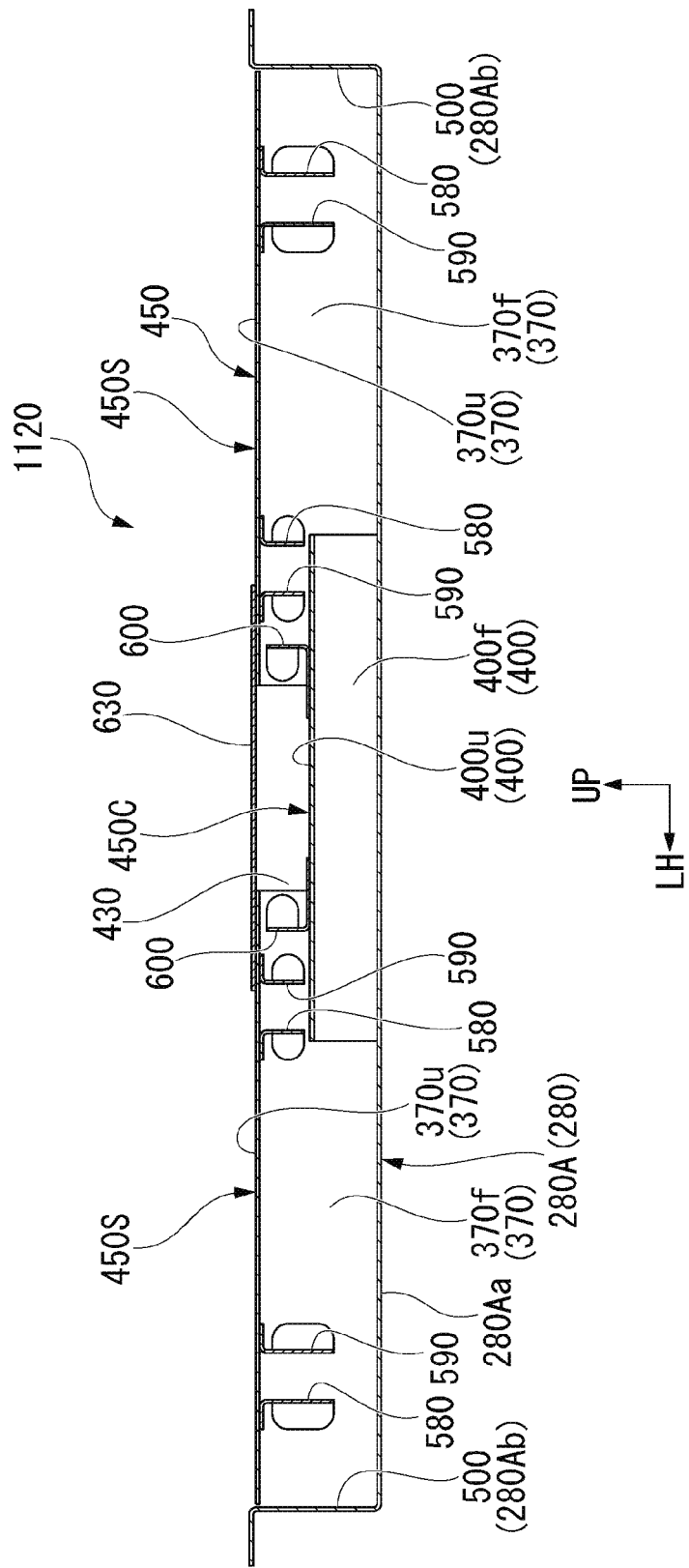
FIG. 28 is a cross-sectional view of a vehicle body substructure according to an alternative second embodiment of the present invention.

FIG. 28 is a cross-sectional view showing a vehicle body substructure 1120 according to an alternative embodiment. FIG. 28 shows a cross section of the case main body 280A of the battery case 280 and the inside thereof orthogonal to the front-rear direction of the vehicle body. In FIG. 28, the same reference signs are applied to parts common to those in the foregoing embodiments.

The basic constitution of the vehicle body substructure 1120 according to the alternative embodiment is substantially similar to that of the embodiment described above. However, a load transmitting plate 630 is laid between the upper surfaces of the left and right side portion members 450S having a higher upper surface height than the central member 450C. The load transmitting plate 630 is constituted of a metal plate having substantially the same width as the side portion members 450S.

In the vehicle body substructure 1120 according to the foregoing alternative embodiment, the bending rigidity of a central region of the battery cross-members 450 in the vehicle width direction can be enhanced efficiently by the load transmitting plate 630. In addition, in this vehicle body substructure 1120, the bending rigidity of the battery cross-member 450 can be enhanced efficiently by only laying the load transmitting plate 630 across the upper surfaces of the left and right side portion members 450S. Therefore, an increase in manufacturing cost for reinforcement of the battery cross-members 450 can be suppressed.

The present invention is not limited to the foregoing embodiments, and various design changes can be made within a range not departing from the gist thereof.

A third embodiment of the present invention will be described based on the drawings. In the drawings, the arrow FR indicates the front side of the vehicle, the arrow UP indicates the upper side of the vehicle, and the arrow LH indicates the left side of the vehicle.

Figure 29:
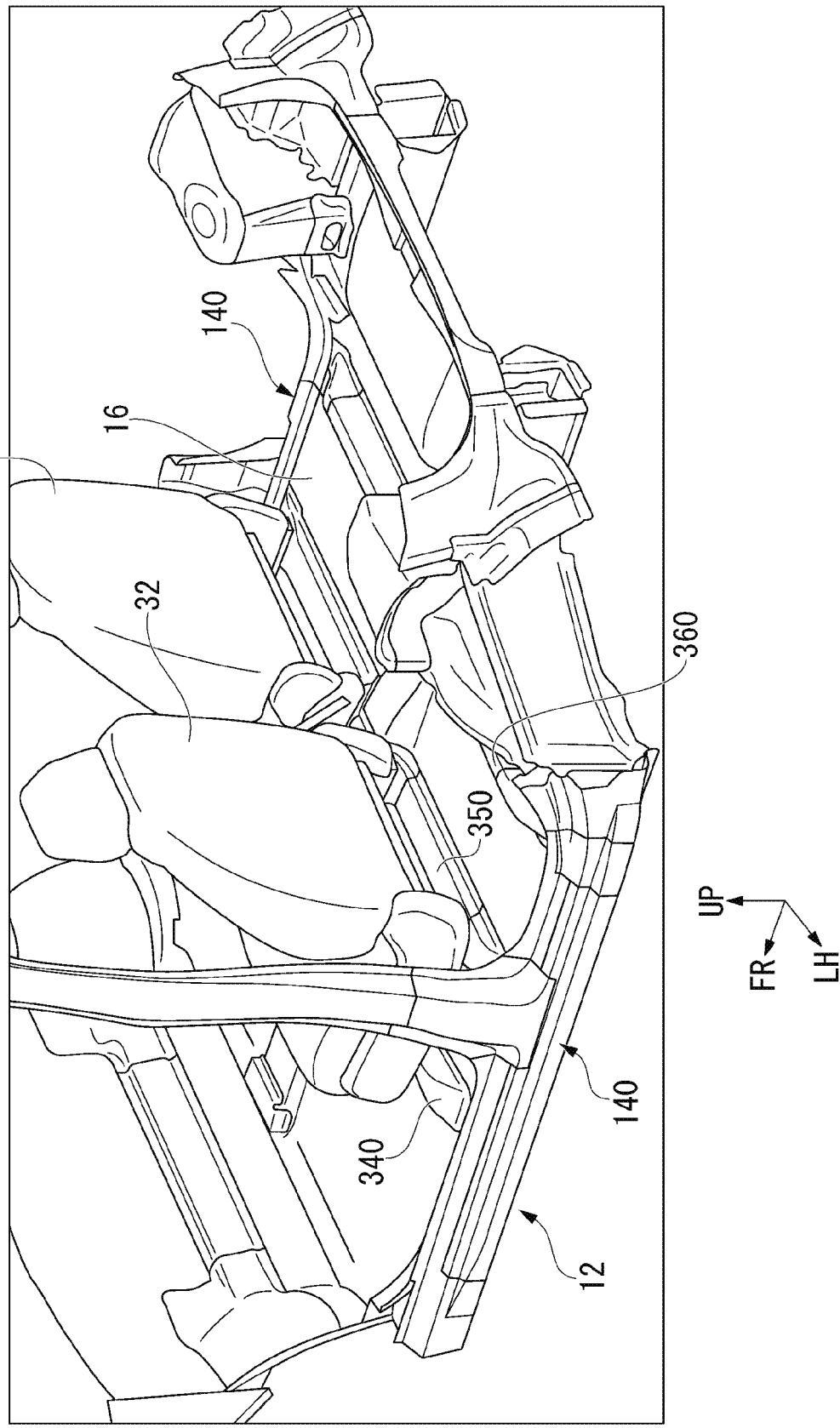
FIG. 29 is a perspective view showing a vehicle body substructure according to a third embodiment of the present invention.
Figure 30:
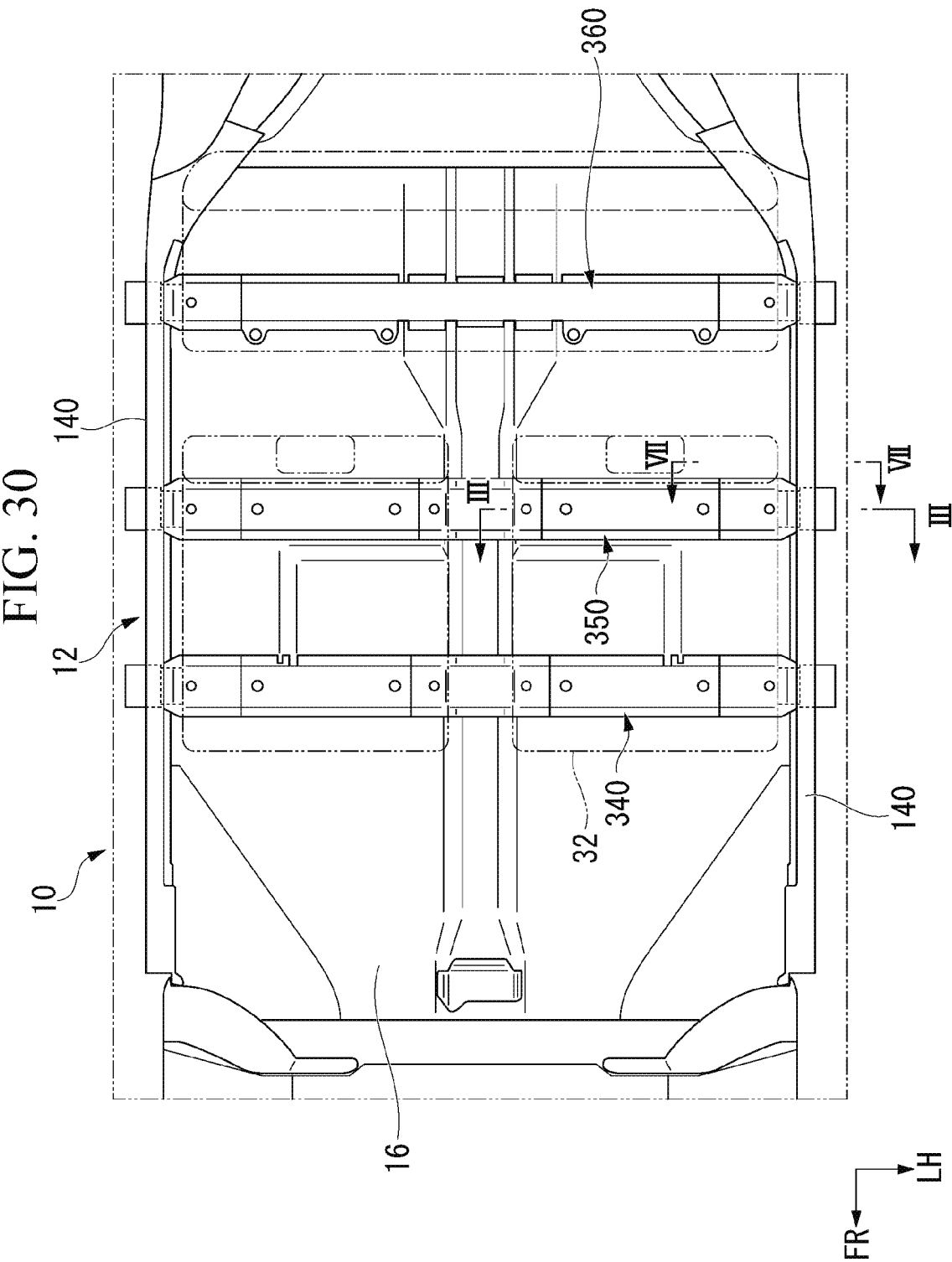
FIG. 30 is a plan view in which some components are removed from the vehicle body substructure according to the third embodiment of the present invention.
Figure 31:
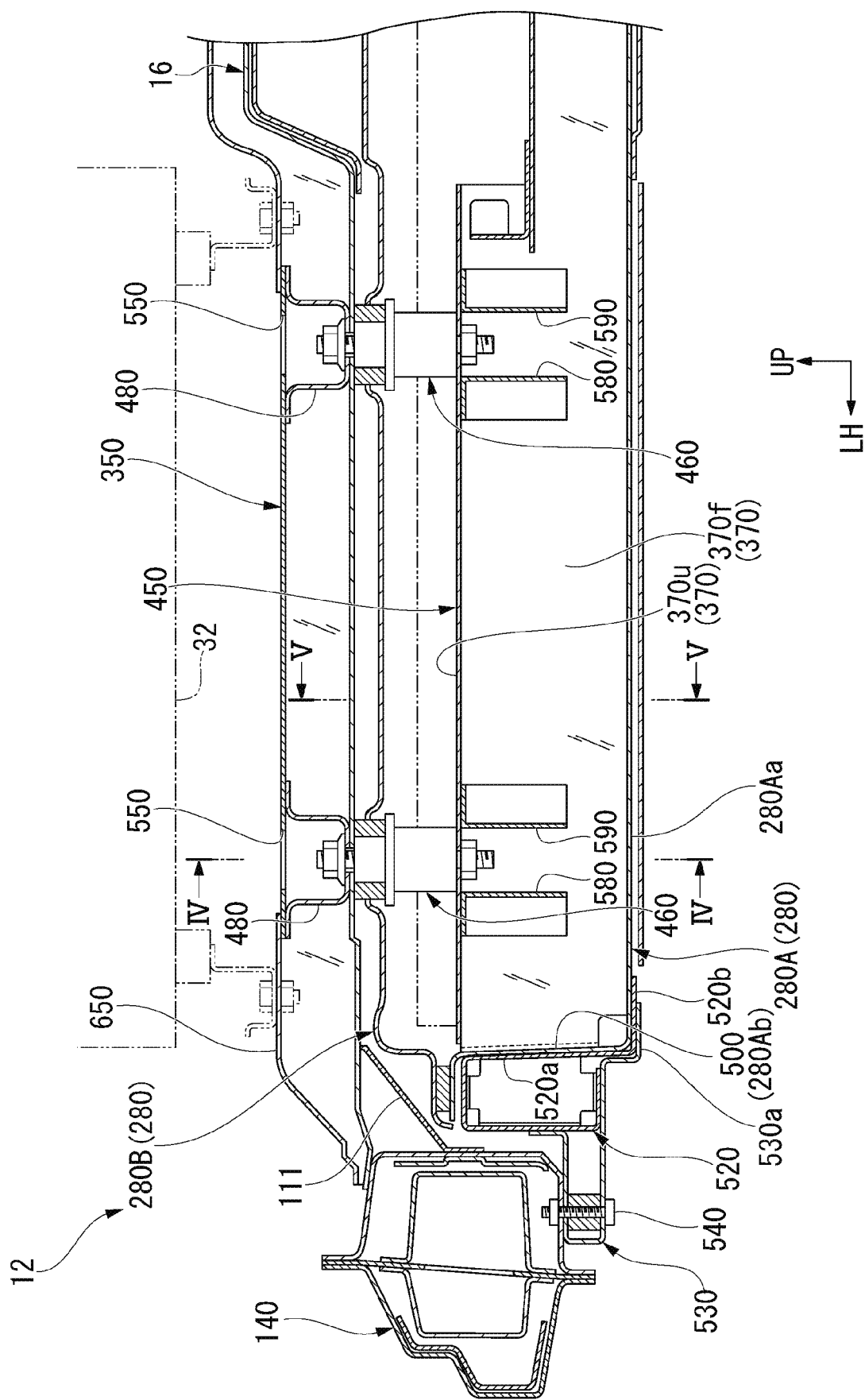
FIG. 31 is a cross-sectional view of the vehicle body substructure according to the third embodiment of the present invention cut along line III-III in FIG. 30.

FIG. 29 is a view of a skeleton part of the vehicle body 10 according to the present embodiment viewed from obliquely above on the left side in a rear portion, and FIG. 30 is a view of the vehicle body substructure 12 of the vehicle body 10 viewed from above. In addition, FIG. 31 is a cross-sectional view of the vehicle body substructure 12 taken along line III-III in FIG. 30.

The vehicle body substructure 12 is a structure body positioned on the lower portion side of the vehicle body 10 and is a structure body including a pair of side sills 140 which are disposed in the left and right side portions on the lower end side of the vehicle body and extend substantially in the front-rear direction of the vehicle body.

The vehicle body substructure 12 includes the pair of side sills 140, the floor panel 16 of which both end portions in the vehicle width direction are laid between the left and right side sills 140, a plurality of floor cross-members 340, 350, and 360 (vehicle body-side cross-member) which are disposed on the upper surface side of the floor panel 16, the battery case 280 which is laid between the left and right side sills 140 on the lower side of the floor panel 16 (refer to FIG. 31), and a plurality of battery cross-members (underfloor cross-member) 450 which are provided inside the battery case 280. In the case of the present embodiment, the front and rear installation portions for each of the driver's seat 31 and the passenger seat 32 installed inside the vehicle cabin are attached to two floor cross-members 340 and 350 on the front side.

All of the floor cross-members 340, 350, and 360 extend substantially in the vehicle width direction, and both end portions thereof in the extending direction are coupled to the left and right side sills 140. The floor cross-members 340, 350, and 360 are disposed away from each other in the front-rear direction of the vehicle body.

Figure 35:
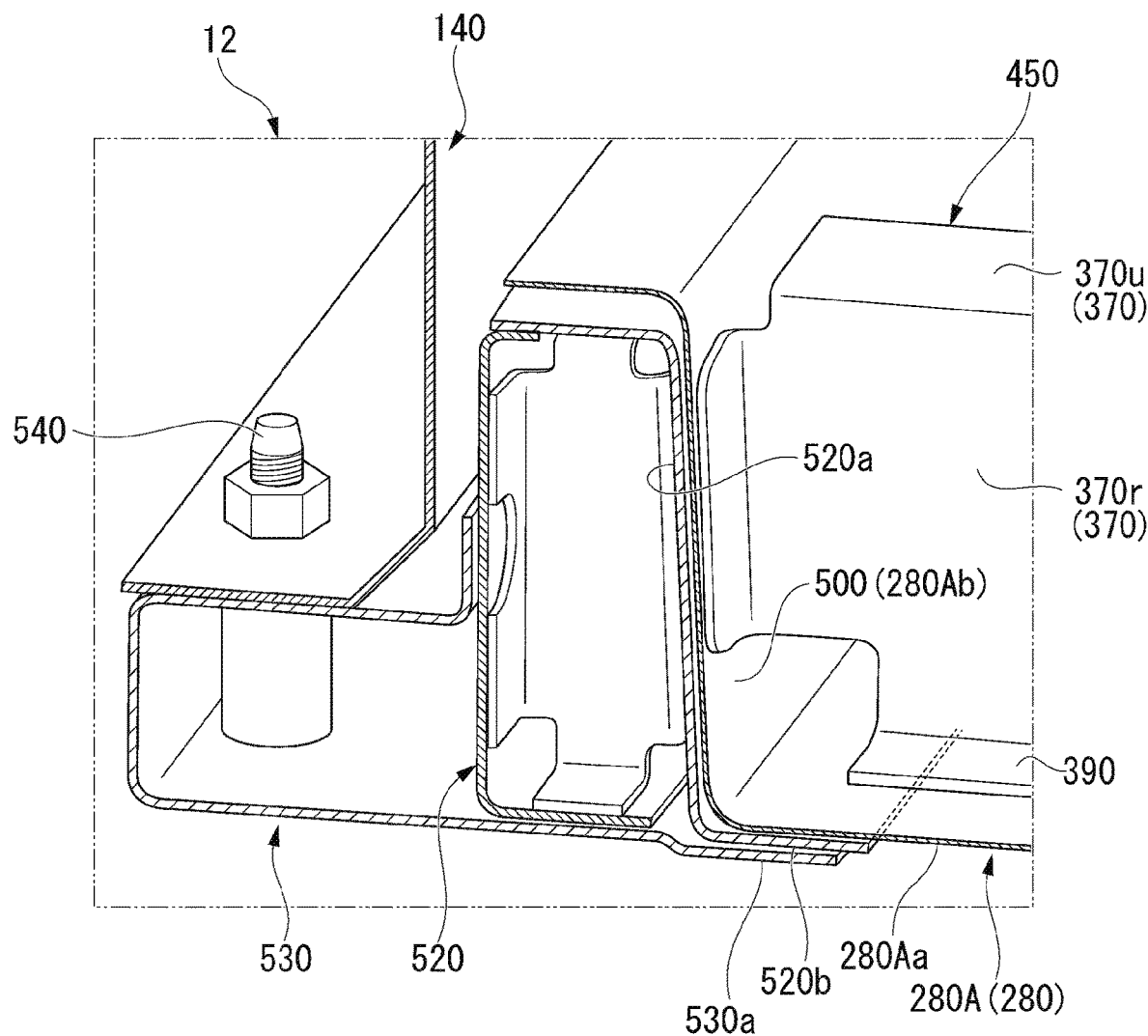
FIG. 35 is a perspective view of a partial cross section at a part of the vehicle body substructure according to the third embodiment of the present invention cut along line VII-VII in FIG. 30.
Figure 36:
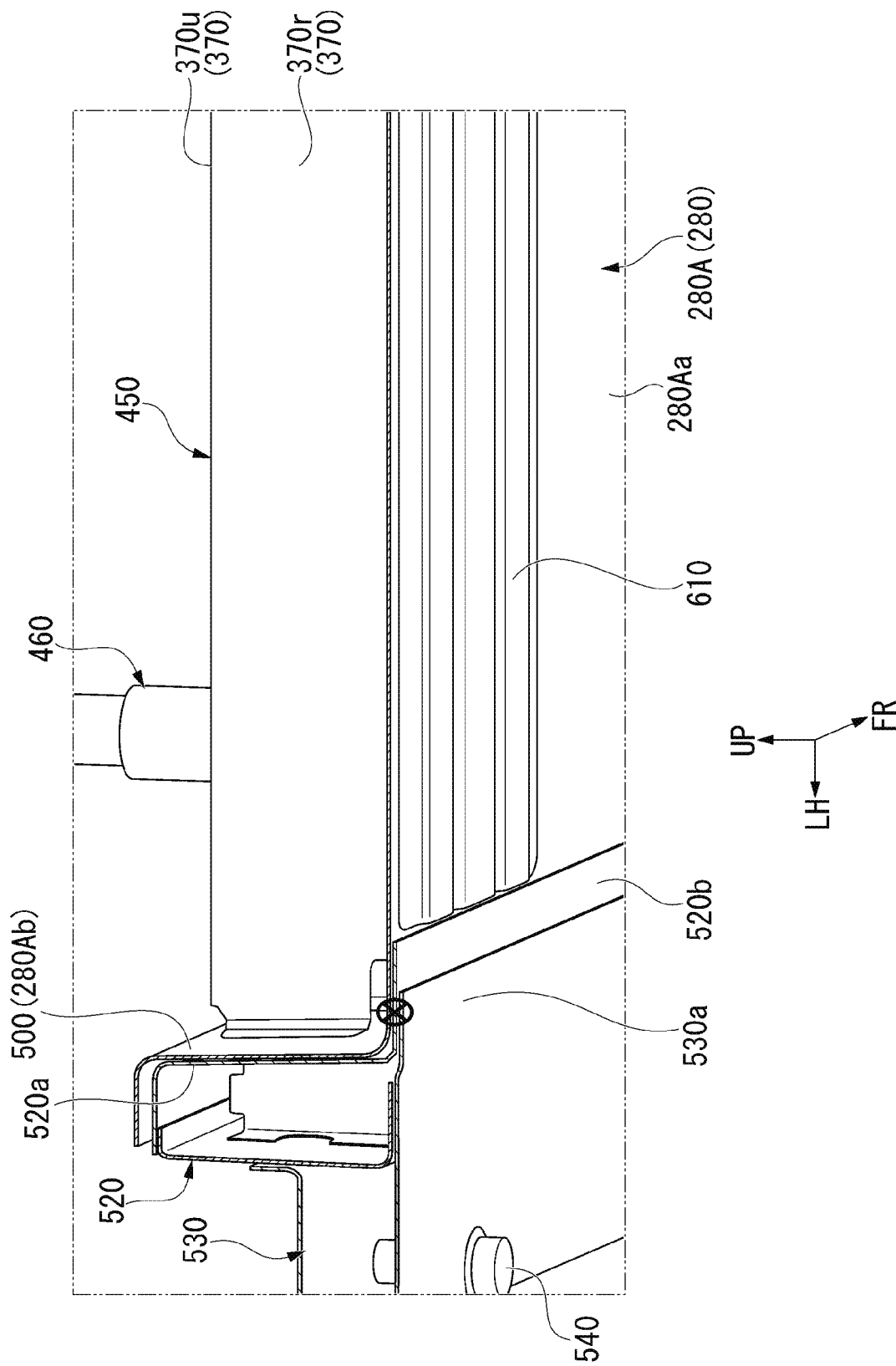
FIG. 36 is a perspective view of a partial cross section at a part of the vehicle body substructure according to the third embodiment of the present invention cut along line VII-VII in FIG. 30.

FIGS. 35 and 36 are perspective views of a partial cross section at a part cut along line VII-VII in FIG. 30. FIG. 35 is a view of a cross-sectional part viewed from obliquely above on the right side in a rear portion, and FIG. 36 is a view of a cross-sectional part viewed from obliquely below on the right side in the rear portion.

As shown in FIGS. 31, 35, and 36, the battery case 280 includes the case main body 280A which opens upward, and the case cover 280B which blocks the opening of the upper portion of the case main body 280A. In a plan view, the case main body 280A includes the bottom wall 280Aa which has a substantially rectangular shape, and the circumferential walls 280Ab which rise upward from the surrounding area of the bottom wall 280Aa. Hereinafter, parts of the circumferential walls 280Ab rising upward from the left and right side end portions will be referred to as the case side walls 500.

A plurality of batteries 510 (refer to FIG. 32), and the plurality of battery cross-members 450 which extend substantially in the vehicle width direction such that the inside of the battery case 280 is partitioned into front and rear sections are disposed inside the battery case 280. In the case of the present embodiment, three battery cross-members 450 are provided. The battery cross-members 450 are respectively disposed at positions immediately below the floor cross-members 340, 350, and 360 on the floor panel 16. Three floor cross-members 340, 350, and 360 and the battery cross-members 450 are disposed in a manner substantially parallel to each other.

Structures in cross sections (cross sections substantially orthogonal to the front-rear direction of the vehicle body) including the floor cross-members 340, 350, and 360 and the corresponding battery cross-members 450 are substantially similar to each other. Therefore, hereinafter, a cross section including the floor cross-member 350 at the center in the front-rear direction and the battery cross-member 450 therebelow will be described representatively as a cross-sectional structure of the vehicle body substructure 12.

As shown in FIGS. 31, 35, and 36, each of the case frames 520 having an angled tube shape extending substantially in the front-rear direction of the vehicle body is coupled to the outer side surface of the case side wall 500 of the case main body 280A. In the case frame 520, a lower end of the side wall 520a on the inner side joined to the case side wall 500 of the case main body 280A is bent inward in the vehicle width direction, and the extension piece 520b is provided at the tip of the bent portion. The extension piece 520b overlaps the lower surface of the bottom wall 280Aa of the case main body 280A and is joined to the lower surface of the bottom wall 280Aa.

In addition, the attachment frame 530 swelling from the lower portion region of the case frame 520 outward in the vehicle width direction is coupled to the outer side of the case frame 520 in the vehicle width direction. In a state of being coupled to the case frame 520, the attachment frame 530 forms a rectangular cross section elongated laterally together with the side walls of the case frame 520 on the outer side. This rectangular cross section extends substantially in the front-rear direction of the vehicle body. The attachment frame 530 overlaps each of the lower surfaces of the left and right side sills 140 on the inner side and is coupled to the lower surfaces of the side sills 140 using the fastening members 540.

In addition, the lower wall of the attachment frame 530 is joined to the lower surface of the case frame 520, and the frame extension piece 530a extending around the lower surface side of the bottom wall 280Aa of the case main body 280A is provided in the tip end portion of the lower wall thereof. The frame extension piece 530a overlaps the lower surface of the extension piece 520b of the case frame 520 and is joined to the lower surface of the bottom wall 280Aa of the case main body 280A together with the extension piece 520b. For example, the frame extension piece 530a, the extension piece 520b, and the bottom wall 280Aa are joined to each other through welding in a three-layered state.

Figure 32:
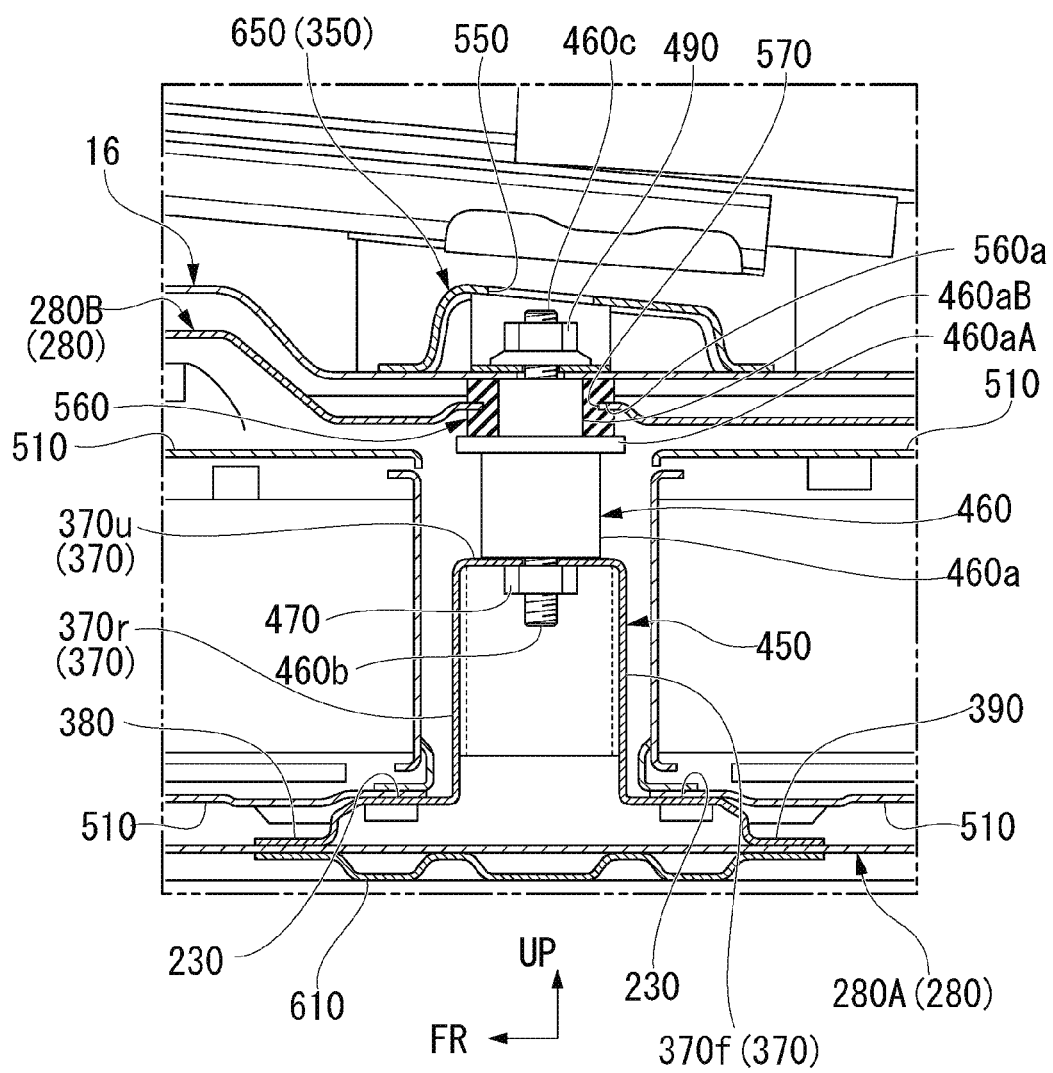
FIG. 32 is a cross-sectional view of the vehicle body substructure according to the third embodiment of the present invention cut along line IV-IV in FIG. 31.
Figure 33:
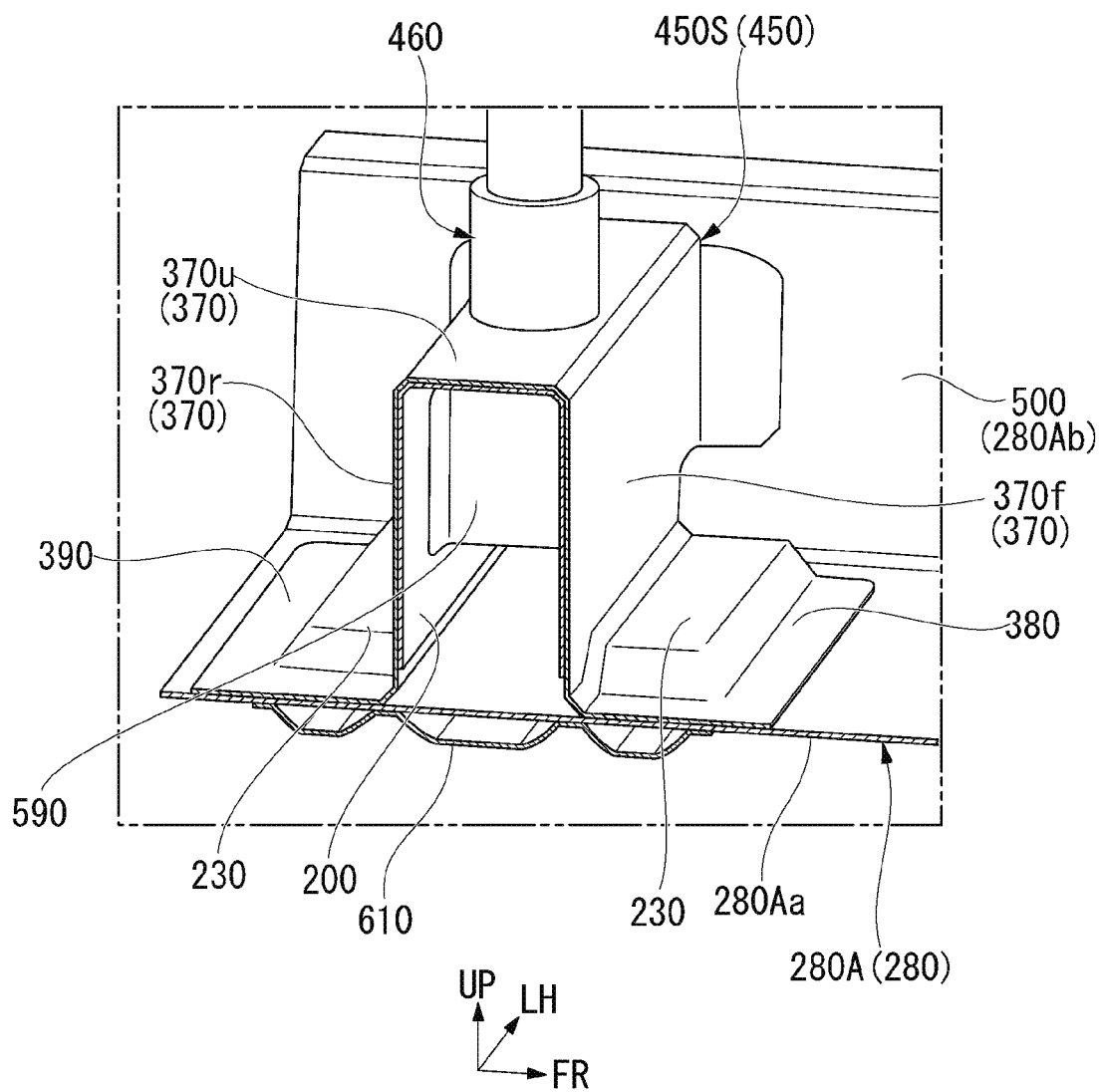
FIG. 33 is a perspective view of a partial cross section at a part of the vehicle body substructure according to the third embodiment of the present invention cut along line V-V in FIG. 31.
Figure 34:
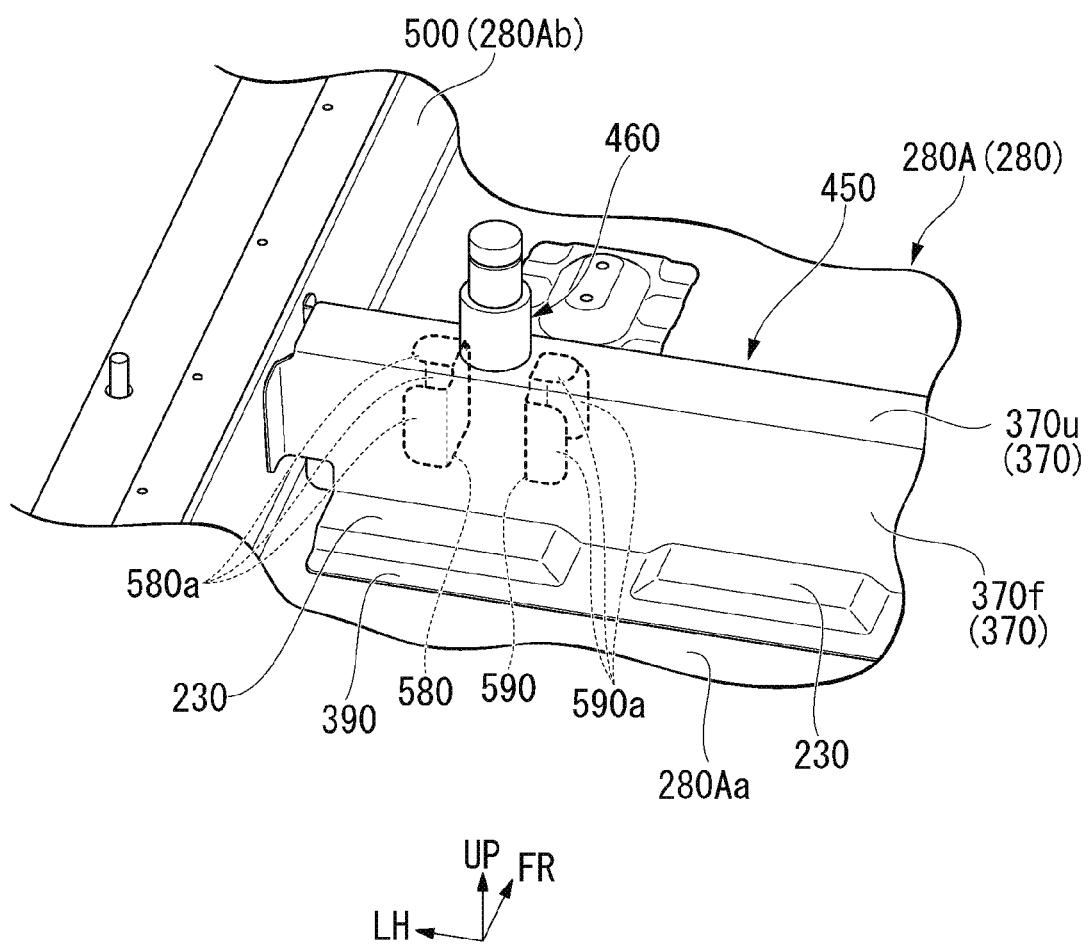
FIG. 34 is a perspective view of a part of the vehicle body substructure according to the third embodiment of the present invention.

FIG. 32 is a view showing a cross section taken along line IV-IV in FIG. 31, and FIG. 33 is a perspective view of the vehicle body substructure 12 including a cross section taken along line V-V in FIG. 31. FIG. 34 is a view of a part inside the battery case 280 of the vehicle body substructure 12 viewed from obliquely above on the right side in a rear portion.

As shown in FIGS. 32 and 33, the battery cross-member 450 has the front wall 370f, the upper wall 370u, and the rear wall 370r. The battery cross-member 450 includes the member main body portion 370 which has a substantially U-shaped cross section and stands upright, the forward protruding seat 380 which protrudes forward from the lower edge of the front wall 370f, and the rearward protruding seat 390 which protrudes rearward from the lower edge of the rear wall 370r.

A plurality of places separated from each other in the vehicle width direction in the upper portion of the battery cross-member 450 are coupled to the corresponding floor cross-member 350 thereabove using a plurality of stud bolts 460 (fastening members). Specifically, the upper walls 370u of the member main body portions 370 of the battery cross-members 450 are coupled respectively to the left half portion and the right half portion of the floor cross-member 350 using four stud bolts 460.

As shown in FIG. 32, the stud bolt 460 has the body portion 460a at the center of a substantially columnar shape, the screw portion 460b on the lower side protruding downward from the lower surface of the body portion 460a, and the screw portion 460c on the upper side protruding upward from the upper surface of the body portion 460a.

In the battery cross-member 450, the lower end of the stud bolt 460 is coupled to the upper wall 370u of the member main body portion 370. As shown in FIG. 32, the stud bolt 460 is fixed to the battery cross-member 450 by the nut 470 which is screwed to the screw portion 460b penetrating the upper wall 370u of the member main body portion 370 downward from above. In addition, in each of the stud bolts 460, the screw portion 460c penetrating the floor panel 16 upward from below further penetrates the bracket 480 of the floor cross-member 350 upward, and the nut 490 is screwed to the screw portion 460c portion. Accordingly, the upper portion of the stud bolt 460 is fixed to the floor cross-member 350.

The bracket 480 is a metal member which has a substantially hat-shaped cross section and also serves as a cross section reinforcing portion of the floor cross-member 350 (cross-plate 650 which will be described below). In the bracket 480, a part corresponding to the hat-shaped flange portion is joined to the lower surface of the upper wall of the floor cross-member 350 (cross-plate 650), and the insertion hole 480a, into which the screw portion 460c of the stud bolt 460 is inserted, is formed in a part corresponding to the hat-shaped apex portion. The stud bolt 460 is welded to the upper wall of the floor cross-member 350 such that the hat-shaped apex portion is directed downward. The work hole 550 for tightening the nut 490 into the screw portion 460c protruding upward from the insertion hole 480a is formed in a part of the upper wall of the floor cross-member 350 facing the insertion hole 480a of the bracket 480.

As shown in FIG. 32, the support flange 460aA and the shaft portion 460aB which has a small diameter and protrudes upward from the support flange 460aA are provided in the body portion 460a of the stud bolt 460. The elastic seal member 560 having a cylindrical shape with a thick wall is fitted to the shaft portion 460aB. The support groove 560a is provided on the outer circumferential surface of the elastic seal member 560. A part of the support groove 560a is interlocked with a circumferential edge portion of the penetration hole 570 of the case cover 280B. The body portion 460a of the stud bolt 460 is held in the penetration hole 570 of the case cover 280B with the elastic seal member 560 interposed therebetween. In addition, the lower surface of the elastic seal member 560 abuts the upper surface of the support flange 460aA, and the upper surface of the elastic seal member 560 abuts the lower surface of the floor panel 16.

In addition, inside the battery cross-member 450, as shown in FIGS. 31, 35, and the like, the first partition wall member (partition wall member) 580 and the second partition wall member (partition wall member) 590 are provided in front of and behind each of the installation portions of the stud bolts 460 in the extending direction of the battery cross-member 450. Both the first partition wall member 580 and the second partition wall member 590 have the joint flanges 580*a* and 590*a* (refer to FIG. 34) and are fixed to at least three surfaces such as the front wall 370*f*, the upper wall 370*u*, and the rear wall 370*r* of the battery cross-member 450 through welding or the like.

As shown in FIG. 33, the reinforcement plate 200 which has a substantially U-shaped cross section and is joined to the upper wall 370*u*, the front wall 370*f*, and the rear wall 370*r* of the member main body portion 370 is disposed inside the member main body portion 370 of the battery cross-member 450. That is, in the member main body portion 370, each wall is constituted as a double wall due to the metal reinforcement plate 200, and each of the members described above is coupled to each of the walls reinforced by the reinforcement plate 200.

As described above, the battery cross-member 450 has the forward protruding seat 380 which protrudes forward from the lower edge of the front wall 370*f* of the member main body portion 370, and the rearward protruding seat 390 which extends rearward from the lower edge of the rear wall 370*r* of the member main body portion 370. That is, the battery cross-member 450 is formed to have an inverted T-shaped cross section.

In the battery cross-member 450, the forward protruding seat 380 and the rearward protruding seat 390 are disposed to face the upper surface of the bottom wall 280Aa of the battery case 280. In contrast, the lower surface reinforcement member 610 is disposed at a position immediately below the installation portion of the battery cross-member 450 on the lower surface of the bottom wall 280Aa of the battery case 280.

The lower surface reinforcement member 610 is constituted of a plate-shaped metal member of which a substantially wave-shaped cross section extends substantially in the vehicle width direction. The forward protruding seat 380 and the rearward protruding seat 390 of the battery cross-member 450 are coupled to the lower surface reinforcement member 610 in a state where the bottom wall 280Aa of the battery case 280 is sandwiched therebetween. For example, the flat flanges of the forward protruding seat 380 and the rearward protruding seat 390 and the flat flange of the lower surface reinforcement member 610 overlap the upper and lower surfaces of the bottom wall 280Aa, and the members are welded to each other in a three-layered manner in such a state. Accordingly, in the battery cross-member 450, the forward protruding seat 380 and the rearward protruding seat 390 protruding forward and rearward from the member main body portion 370 are integrated with the lower surface reinforcement member 610 on the lower surface with the bottom wall 280Aa interposed therebetween.

In addition, in an end portion region of the battery cross-member 450 in the vehicle width direction, as shown in FIGS. 35 and 36, the extension piece 520*b* of the case frame 520 described above is joined to the lower surface of the bottom wall 280Aa of the battery case 280. This extension piece 520*b* constitutes a lower surface reinforcement member. Similar to the foregoing lower surface reinforcement member 610, the forward protruding seat 380 and the rearward protruding seat 390 are coupled to each other in a state where the bottom wall 280Aa is sandwiched therebetween.

In addition, as shown in FIGS. 32 and 33, the pedestal portion 230 which swells upward with respect to a surface joined to the bottom wall 280Aa at the circumferential edge and has a flat upper surface is provided in a part on the proximal portion side (side connected to the member main body portion 370) of the forward protruding seat 380 and the rearward protruding seat 390 of the battery cross-member 450. As shown in FIG. 32, the battery 510 can be placed on the upper surface of the pedestal portion 230. In addition, the lower surface side of the pedestal portion 230 communicates with the internal space of the member main body portion 370.

As shown in FIG. 31, the floor cross-member 350 includes the cross-plate 650 which is joined to the upper surface of the floor panel 16 and forms a closed cross section extending substantially in the vehicle width direction between the cross-plate 650 and the floor panel 16, and the gusset inclination portion 111 which is laid between the lower surface in the end portion region of the floor panel 16 in the vehicle width direction and the inner side surface of the side sill 14 and forms a closed cross section extending substantially in the vehicle width direction between the gusset inclination portion 111 and the floor panel 16. In the cross-plate 650, a cross section is formed to have a substantially hat shape, and both end portions in the vehicle width direction are joined to the upper surfaces of the left and right side sills 140. In the gusset inclination portion 111, a cross section is formed to have a substantially hat shape, and both end portions in the vehicle width direction are joined to the lower surface of the floor panel 16 and the inner side surface of the side sill 140. In the present embodiment, the cross-plate 650 is constituted of a plurality of plate materials joined to each other.

The upper wall in the end portion region of the cross-plate 650 in the vehicle width direction inclines downward to a side outward in the vehicle width direction. Accordingly, in a closed cross section formed by the cross-plate 650 and the upper surface of the floor panel 16, the opening area of the inside is narrowed gradually outward in the vehicle width direction. In addition, similarly, the lower wall of the gusset inclination portion 111 also inclines downward to a side outward in the vehicle width direction. Accordingly, in a closed cross section formed by the gusset inclination portion 111 and the lower surface of the floor panel 16, the opening area of the inside expands gradually outward in the vehicle width direction.

In the floor cross-member 350, the central region in the vehicle width direction has a shape lifted upward with respect to the side sill 140. However, in the floor cross-member 350, due to the foregoing constitution, a closed cross section of the central region formed by the floor panel 16 and the cross-plate 650, and an inclined closed cross section in the end portion region formed by the cross-plate 650 and the gusset inclination portion 111 are connected to each other while having a substantially uniform cross-sectional area.

Hereinabove, as described above, in the vehicle body substructure 12 according to the present embodiment, the forward protruding seat 380 and the rearward protruding seat 390 extend at the lower edge of the member main body portion 370 of the battery cross-member 450, and the forward protruding seat 380 and the rearward protruding seat 390 are coupled to the bottom wall 280Aa of the battery case 280. When an impact load is input or the like, for example, if a load in the front-rear direction is input to the vehicle body-side cross-member from a seatbelt, the load is input to the upper portion of the member main body portion 370 of the battery cross-member 450 via the stud bolt 460 (fastening member). At this time, a moment in a direction tilting forward and rearward acts on the member main body portion 370 through the stud bolt 460. However, the moment is received by the forward protruding seat 380 and the rearward protruding seat 390 protruding forward and rearward from the lower edge of the member main body portion 370, and each of the coupling portions with respect to the battery case 28. Therefore, when a load in the front-rear direction is input to the battery cross-member 450 from the floor cross-member 350 (vehicle body-side cross-member), falling of the battery cross-member 450 in the front-rear direction can be suppressed with a high rigidity.

Therefore, a high support rigidity of the floor cross-member 350 can be maintained by employing the vehicle body substructure 12 of the present embodiment.

In addition, in the vehicle body substructure 12 according to the present embodiment, the forward protruding seat 380 and the rearward protruding seat 390 are disposed on the upper surface side of the bottom wall 280Aa of the battery case 280. The lower surface reinforcement member 610 is disposed on the lower surface side of the bottom wall 280Aa. The forward protruding seat 380 and the rearward protruding seat 390 are coupled to the lower surface reinforcement member 610 in a state where the bottom wall 280Aa is sandwiched therebetween. The forward protruding seat 380 and the rearward protruding seat 390 of the battery cross-member 450 are integrated with the bottom wall 280Aa of the battery case 280 together with the lower surface reinforcement member 610. Therefore, when this constitution is employed, forward and rearward falling of the member main body portion 370 of the battery cross-member 450 can be suppressed more firmly.

In addition, when this constitution is employed, members to be coupled to the battery cross-member 450 can be constituted of press-formed articles which can be manufactured at low cost, and the members can be welded and fixed to each other.

Particularly, in the present embodiment, since the lower surface reinforcement member is constituted of a plate-shaped member of which a substantially wave-shaped cross section extends substantially in the vehicle width direction, the rigidity of the bottom wall 280Aa of the battery case 280 can be enhanced efficiently due to the plate-shaped lower surface reinforcement member 610.

In addition, in the vehicle body substructure 12 according to the present embodiment, the case frame 520 is coupled to the outer side of the case side wall 500 of the battery case 280. The extension piece 520b extending to the case frame 520 overlaps the lower surface of the bottom wall 280Aa of the battery case 280. The forward protruding seat 380 and the rearward protruding seat 390 of the battery cross-member 450 are coupled to the extension piece 520b in a state where the bottom wall 280Aa is sandwiched therebetween. Therefore, in the end portion region of the battery cross-member 450 in the vehicle width direction, the forward protruding seat 380 and the rearward protruding seat 390 are integrated with the extension piece 520b in a state where the bottom wall 280Aa of the battery case 280 is sandwiched therebetween. Therefore, when this constitution is employed, forward and rearward falling of the member main body portion 370 of the battery cross-member 450 can be restricted more firmly.

Moreover, in the vehicle body substructure 12 according to the present embodiment, the first partition wall member 580 and the second partition wall member 590 restricting three surfaces such as the upper wall 370u, the front wall 370f, and the rear wall 370r of the member main body portion 370 are coupled to each other in the vicinity of the fastening portion of the stud bolt 460 in the member main body portion 370 of the battery cross-member 450. Accordingly, since the cross-sectional rigidity in the vicinity of the fastening portion of the stud bolt 460 of the member main body portion is enhanced by the first partition wall member 580 and the second partition wall member 590, cross-sectional deformation in the vicinity of the fastening portion of the stud bolt 460 can be suppressed efficiently. Therefore, when this constitution is employed, even when the wall thickness of the member main body portion 370 has to be reduced for weight reduction, tilting or sinking of the stud bolt 460 can be suppressed, and the floor cross-member 350 can be supported by the battery cross-member 450 with a high rigidity.

In addition, in the vehicle body substructure 12 according to the present embodiment, the floor cross-member (vehicle body-side cross-member) 350 includes the cross-plate 650 which has a substantially hat-shaped cross section and of which both end portions in the vehicle width direction are laid between the side sills 140, and the gusset inclination portion 111 which has a substantially hat-shaped cross section and is laid between the lower surface in the end portion region of the floor panel 16 in the vehicle width direction and the side surface of the side sill 140. The end portion region of the cross-plate 650 in the vehicle width direction and the gusset inclination portion 111 are formed to incline downward to a side outward in the vehicle width direction. Then, the bracket 480 which also serves as the cross section reinforcing portion is internally attached in a region closer to the center of the cross-plate 650 in the vehicle width direction. The bracket 480 is coupled to the member main body portion 370 of the battery cross-member 450 using the stud bolt 460. Therefore, while the central region of the floor cross-member 350 has a shape lifted upward with respect to the side sills 140, the left and right side sills 140 can be connected to each other through a closed cross section of the floor cross-member 350 connected in a substantially uniform manner.

When the foregoing constitution is employed, since the central region of the floor cross-member 350 has a shape lifted upward with respect to the side sills 140, the battery case 280 disposed below the central region of the floor cross-member 350 can be positioned on the upper side. Therefore, the ground clearance below the battery case 280 can be ensured easily.

In addition, in the case of the foregoing constitution, a cross section in the central region of the cross-plate 650 is reinforced by the bracket 480 which also serves as the cross section reinforcing portion, and the bracket 480 is coupled to the battery cross-member 450 using the stud bolt 460. Therefore, when a load is input to the floor cross-member 350, the input load can be supported by the battery cross-member 450 in a state where cross-sectional deformation of the cross-plate 650 is suppressed.

Moreover, in the case of the present embodiment, the body portion 460a of the stud bolt 460 connecting the battery cross-member 450 and the floor cross-member 350 to each other is held in the penetration hole 570 of the case cover 280B with the elastic seal member 560 interposed therebetween. Therefore, the position or the direction of the screw portion 460c protruding upward from the case cover 280B can be adjusted finely when the stud bolt 460 and the floor cross-member 350 are fastened and fixed to each other. Therefore, when this constitution is employed, workability of fastening the floor cross-member 350 to the stud bolt 460 becomes favorable.

In addition, when this constitution is employed, since the penetration hole 570 of the case cover 280B is blocked by the elastic seal member 560, infiltration of water into the battery case 280 through the penetration hole 570 can be prevented. In addition, in the case of the present embodiment, since the elastic seal member 560 is interposed between the stud bolt 460 and the case cover 280B, vibration of the case cover 280B can be suppressed by the elastic seal member 560.

In addition, in the foregoing constitution, when the upper surface of the elastic seal member 560 abuts the lower surface of the surrounding area of the penetration hole 570 of the floor panel 16, infiltration of water into the vehicle cabin through the penetration hole 570 of the floor panel 16 can be prevented by the elastic seal member 560. Moreover, in this case, vibration of the floor panel 16 can also be suppressed by the elastic seal member 560.

In addition, in the vehicle body substructure 12 according to the present embodiment, the attachment frame 530 connecting the case frame 520 to the lower surface of the side sill 140 is coupled to the case frame 520. The frame extension piece 530a extending to the attachment frame 530 overlaps the lower surface of the extension piece 520b of the case frame 520, and the frame extension piece 530a is coupled to the bottom wall 280Aa of the battery case 280 together with the extension piece 520b. Therefore, the attachment frame 530 and the case frame 520 can be coupled to each other more firmly, and the rigidity of the bottom wall 280Aa of the battery case 280 can also be enhanced.

In addition, in the vehicle body substructure 12 according to the present embodiment, the reinforcement plate 200 which has a substantially U-shaped cross section and is joined to the upper wall 370u, the front wall 370f, and the rear wall 370r of the member main body portion 370 is disposed inside the member main body portion 370 of the battery cross-member 450. Therefore, the rigidity of the member main body portion 370 to which the stud bolt 460 is fastened can be enhanced easily with a simple constitution. In addition, since the reinforcement plate 200 can be formed of a press-formed article which can be manufactured at low cost, the product cost can be reduced.

In addition, in the case of the vehicle body substructure 12 according to the present embodiment, the forward protruding seat 380 and the rearward protruding seat 390 are provided with the pedestal portion 230 of which the lower surface projecting upward communicates with the internal space of the member main body portion 370 and of which the upper surface is substantially flat. Therefore, the upper surface of each of the pedestal portions 230 provided in the forward protruding seat 380 and the rearward protruding seat 390 can be utilized as a battery support portion or the like. In addition, when this constitution is employed, since the lower surface sides of the forward protruding seat 380 and the rearward protruding seat 390 can communicate with the internal space of the member main body portion 370 in a wide opening area due to the pedestal portions 230 standing upright, an electrodeposition coating solution for rust prevention can be applied easily everywhere inside the battery cross-member 450 at the time of manufacturing.

The present invention is not limited to the foregoing embodiment, and various design changes can be made within a range not departing from the gist thereof.

A fourth embodiment of the present invention will be described based on the drawings. In the drawings, the arrow FR indicates the front side of the vehicle, the arrow UP indicates the upper side of the vehicle, and the arrow LH indicates the left side of the vehicle.

First Embodiment

Figure 37:
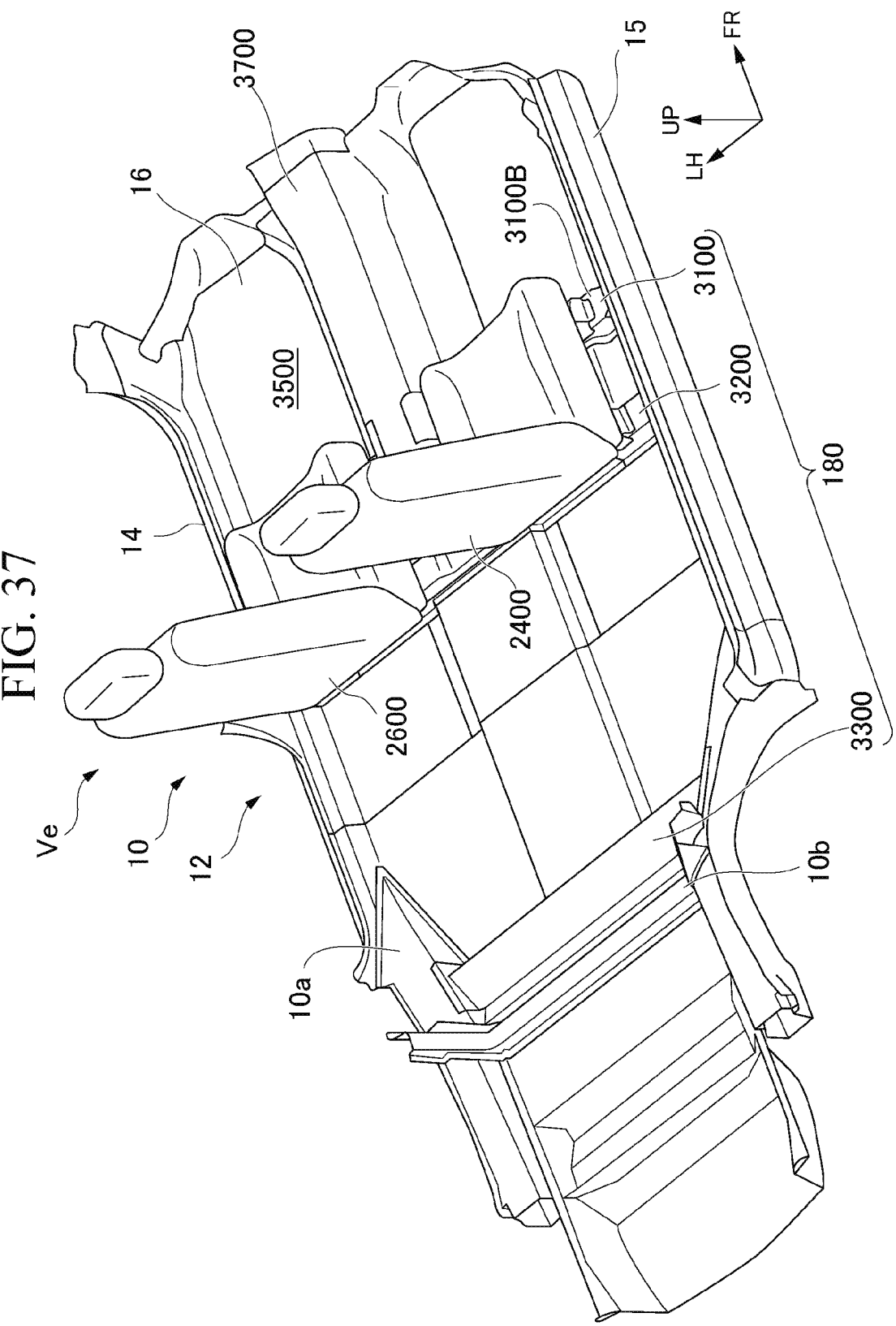
FIG. 37 is a perspective view showing a vehicle body substructure according to a fourth embodiment of the present invention.
Figure 38:
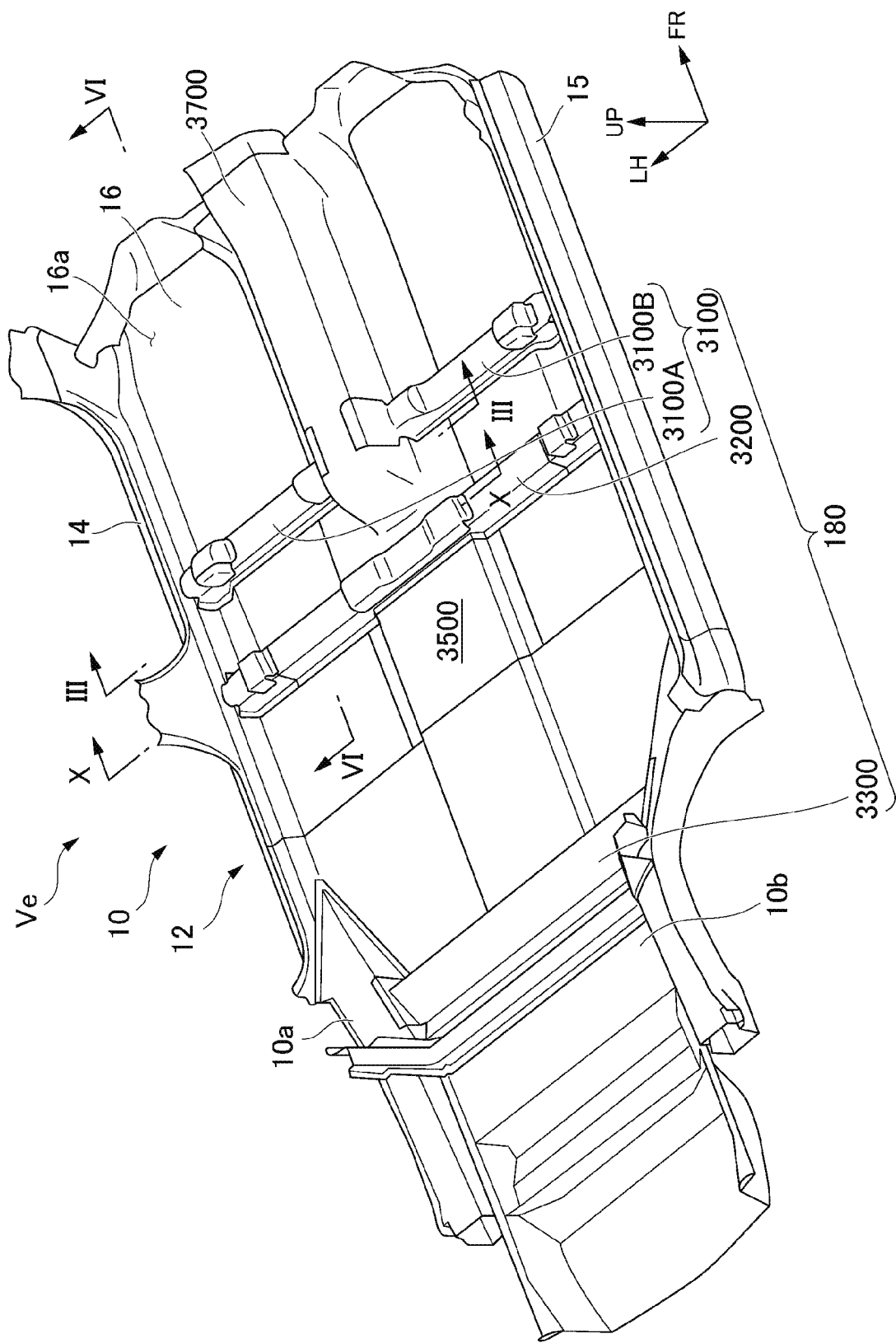
FIG. 38 is a perspective view showing a state where a seat is removed from the vehicle body substructure according to the fourth embodiment of the present invention.

As shown in FIGS. 37 and 38, the vehicle body 10 includes the vehicle body substructure 12 constituting the lower portion of the vehicle body 10. The vehicle body substructure 12 includes the left side sill (side sill) 14, the right side sill (side sill) 15, the floor panel 16, a floor cross-member unit 180, a battery pack 2000 (refer to FIG. 39), a battery pack frame unit 2200 (refer to FIG. 39), a driver's seat (seat) 2400, and a passenger seat (seat) 2600.

The vehicle body substructure 12 is constituted of members having a substantially bilateral symmetry. Therefore, hereinafter, each of constituent members on the left side will be described, and description of each of the constituent members on the right side will be omitted.

Figure 39:
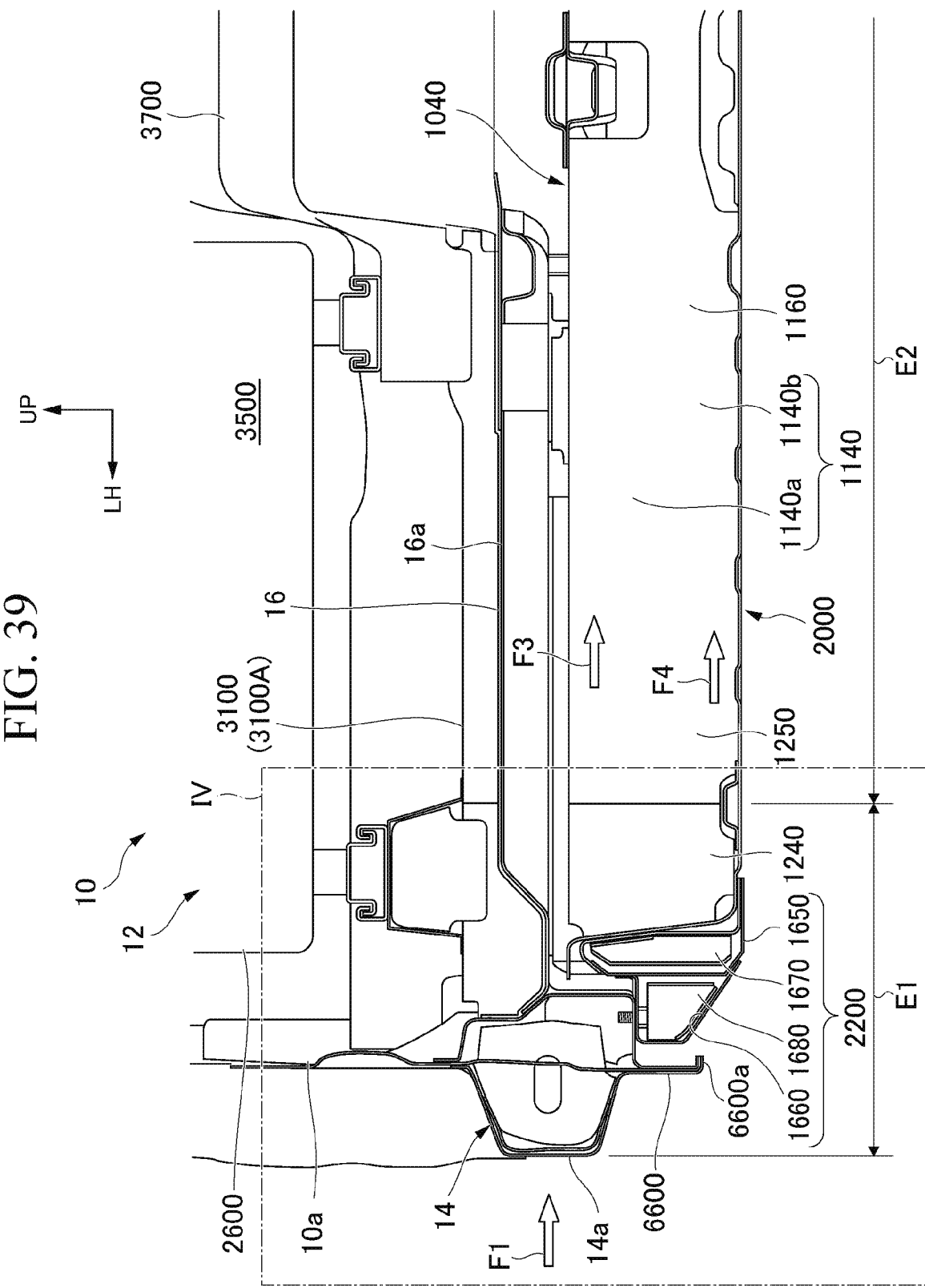
FIG. 39 is a cross-sectional view cut along line III-III in FIG. 38 according to the fourth embodiment of the present invention.

As shown in FIGS. 38 and 39, the left side sill 14 is provided in the left side portion (outer side) 10a of the vehicle body 10 and extends in the front-rear direction of the vehicle body. The right side sill 15 is provided in the right side portion (outer side) 10b of the vehicle body 10 and extends in the front-rear direction of the vehicle body.

The floor panel 16 is disposed between the left side sill 14 and the right side sill 15. The floor panel 16 is laid between the left side sill 14 and the right side sill 15. The floor cross-member unit 180 is attached to the upper surface 16a of the floor panel 16. The floor cross-member unit 180 includes a first floor cross-member 3100, a second floor cross-member 3200, and a third floor cross-member 3300.

The first floor cross-member 3100 is disposed on the front side of the vehicle body inside a vehicle cabin 3500. The first floor cross-member 3100 includes a first floor cross-member 3100A on the left side and a first floor cross-member 3100B on the right side.

The first floor cross-member 3100A on the left side is laid between the left side sill 14 and a floor tunnel 3700 in the vehicle width direction. The first floor cross-member 3100B on the right side is laid between the right side sill 15 and the floor tunnel 3700 in the vehicle width direction.

The first floor cross-member 3100A on the left side and the first floor cross-member 3100B on the right side are disposed linearly in the vehicle width direction.

The floor tunnel 3700 is a part swelling upward at the center of the floor panel 16 in the vehicle width direction.

The first floor cross-member 3100A on the left side and the first floor cross-member 3100B on the right side are members having a substantially bilateral symmetry. Thus, hereinafter, the first floor cross-member 3100A on the left side will be described as "a first floor cross-member 3100", and description of the first floor cross-member 3100B on the right side will be omitted.

The first floor cross-member 3100 is laid between the left side sill 14 and the right side sill 15 in the vehicle width direction.

The second floor cross-member 3200 is disposed on the rear side of the first floor cross-member 3100 in the vehicle body. The second floor cross-member 3200 is laid between the left side sill 14 and the right side sill 15 in the vehicle width direction and extends in a manner parallel to the first floor cross-member 3100.

The third floor cross-member 3300 is disposed on the rear side of the second floor cross-member 3200 in the vehicle body. The third floor cross-member 3300 is laid between the left side sill 14 and the right side sill 15 in the vehicle width direction and extends in a manner parallel to the second floor cross-member 3200.

The first floor cross-member 3100, the second floor cross-member 3200, and the third floor cross-member 3300 are provided at intervals in the front-rear direction of the vehicle body.

For example, the driver's seat 2400 (refer to FIG. 37) is attached to the right half portions of the first floor cross-member 3100B and the second floor cross-member 3200 on the right side using fastening members such as bolts and nuts. For example, the passenger seat 2600 (refer to FIG. 37) is attached to the left half portions of the first floor cross-member 3100 and the second floor cross-member 3200 using fastening members such as bolts and nuts. In addition, a rear seat is provided in the third floor cross-member 3300.

Figure 40:
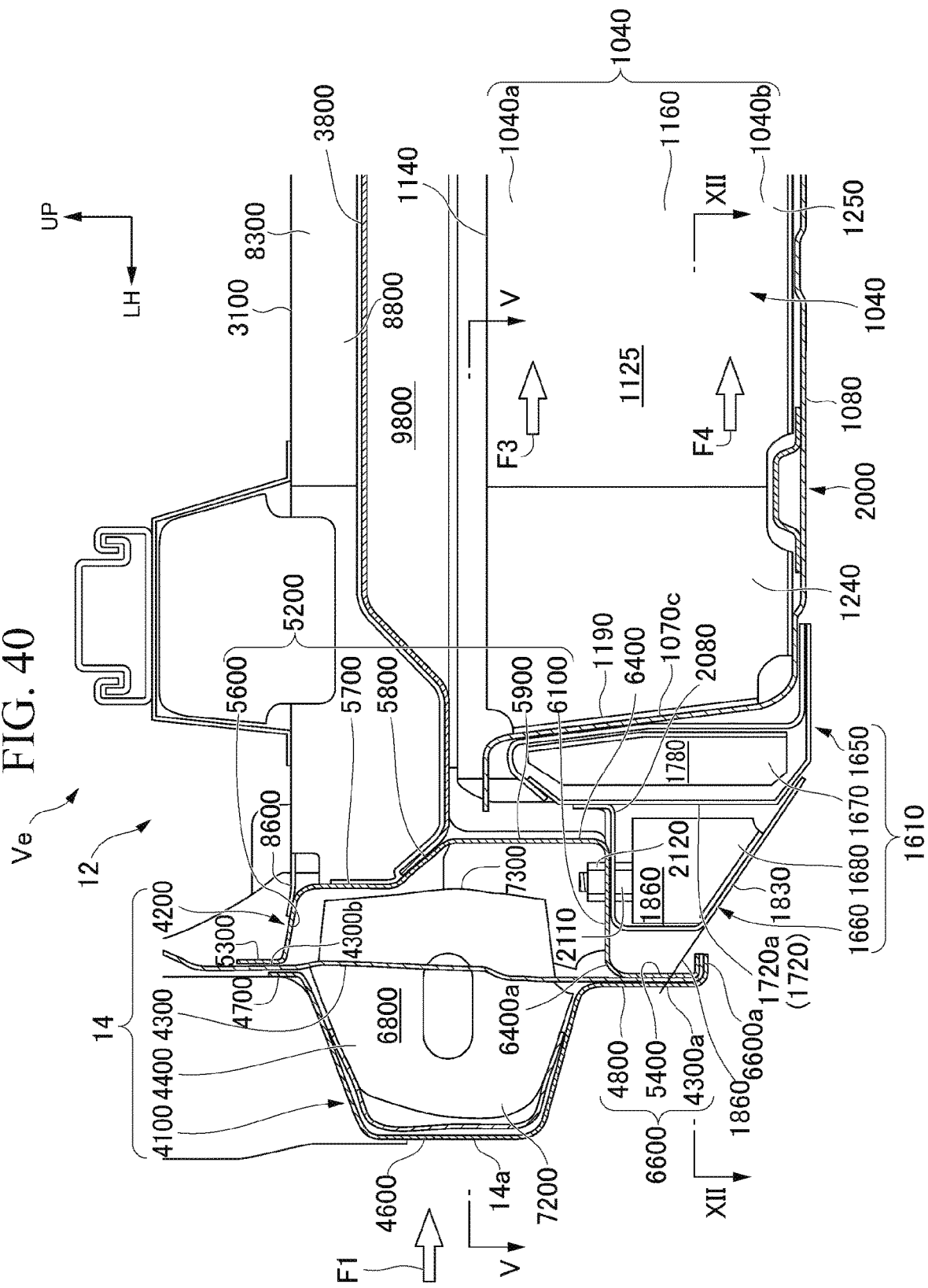
FIG. 40 is an enlarged cross-sectional view showing a IV-part in FIG. 39 according to the fourth embodiment of the present invention.
Figure 41:
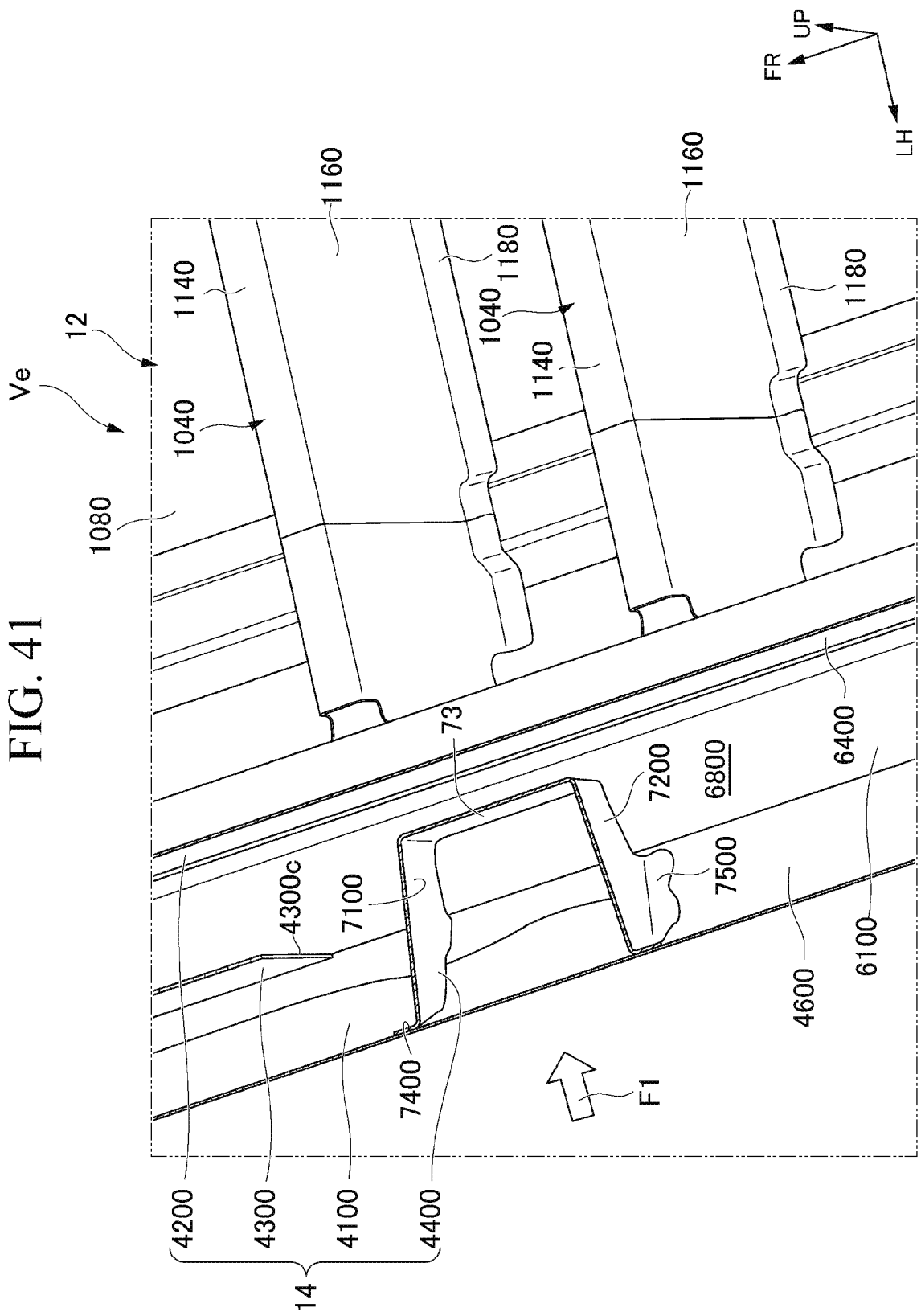
FIG. 41 is a perspective view showing a state cut along line V-V in FIG. 40 according to the fourth embodiment of the present invention.

As shown in FIGS. 40 and 41, the left side sill 14 includes a side sill outer 4100, a side sill inner 4200, a stiffener 4300, and a first energy absorption member 4400.

The side sill outer 4100 is provided on the outer side in the vehicle width direction. The side sill outer 4100 has an outer swelling portion 4600, an upper outer flange 4700, and a lower outer flange 4800. The outer swelling portion 4600 swells outward in the vehicle width direction from the upper outer flange 4700 and the lower outer flange 4800. A reinforcement member is attached to the inner surface of the outer swelling portion 4600. The upper outer flange 4700 protrudes upward from the upper end of the outer swelling portion 4600. The lower outer flange 4800 protrudes downward from the lower end of the outer swelling portion 4600.

The side sill inner 4200 is joined to the side sill outer 4100 from the inner side in the vehicle width direction and is provided on the inner side of the side sill outer 4100 in the vehicle width direction. The side sill inner 4200 has an inner swelling portion 5200, an upper inner flange 5300, and a lower inner flange 5400. The inner swelling portion 5200 swells inward in the vehicle width direction from the upper inner flange 5300 and the lower inner flange 5400.

The inner swelling portion 5200 has an inner upper portion 5600, a first inner inside wall 5700, an inner central portion 5800, a second inner inside wall 5900, and an inner lower portion 6100. The inner upper portion 5600 protrudes inward in the vehicle width direction from the lower end of the upper inner flange 5300. The first inner inside wall 5700 protrudes downward from the inner end of the inner upper portion 56. The inner central portion 5800 protrudes with a downward slope inward in the vehicle width direction from the lower end of the first inner inside wall 5700. The second inner inside wall 5900 protrudes downward from the lower end of the inner central portion 5800. The inner lower portion 6100 protrudes outward in the vehicle width direction from the lower end of the second inner inside wall 5900. The lower inner flange 5400 protrudes downward from the lower end of the inner lower portion 6100.

The inner lower portion 6100 extends in a manner orthogonal to the second inner inside wall 5900. An inner corner portion 6400 is formed in an orthogonal manner due to the inner lower portion 6100 and the second inner inside wall 5900. The inner corner portion 6400 is formed in the lower portion on the inner side of the left side sill 14 in the vehicle width direction.

The stiffener 4300 is interposed between the side sill outer 4100 and the side sill inner 4200. The stiffener 4300 is formed to have a flat plate shape. Specifically, an upper stiffener flange 4300b is joined between the upper outer flange 4700 of the side sill outer 4100 and the upper inner flange 5300 of the side sill inner 4200 in a sandwiched state. In addition, a lower stiffener flange 4300a of the stiffener 4300 is joined between the lower outer flange 4800 of the side sill outer 4100 and the lower inner flange 5400 of the side sill inner 4200 in a sandwiched state.

Since the lower outer flange 4800, the lower stiffener flange 4300a, and the lower inner flange 5400 are joined to each other, a side sill flange 6600 is formed by the flanges 4800, 4300a, and 5400. The side sill flange 6600 extends downward from an outer end portion 6400a on the outer side of the inner corner portion 6400 in the vehicle width direction, and a lower end portion 6600a protrudes inward in the vehicle width direction.

The left side sill 14 is formed to have a rectangular frame-like exterior shape (that is, a closed cross section) by the side sill outer 4100 and the side sill inner 4200. The upper stiffener flange 4300b of the stiffener 4300 is interposed between the upper outer flange 4700 and the upper inner flange 5300. In addition, the lower stiffener flange 4300a of the stiffener 4300 is interposed between the lower outer flange 4800 and the lower inner flange 5400. Accordingly, the stiffener 4300 is disposed to be directed in the up-down direction.

A side sill space 6800 is formed between the side sill outer 4100 and the side sill inner 4200.

The first energy absorption member 4400 is disposed in the side sill space 6800 (that is, a closed cross section). The first energy absorption member 4400 is attached to the side sill outer 4100 and swells to the side sill inner 4200 side via an opening portion 4300c of the stiffener 4300.

The first energy absorption member 4400 has a first front wall 7100, a first rear wall 7200, a first side wall 7300, a first front flange 7400, and a first rear flange 7500.

The first front flange 7400 protrudes toward the front side of the vehicle body from the base end of the first front wall 7100. The first rear wall 7200 is disposed at an interval from the rear side of the vehicle body with respect to the first front wall 7100. The first rear flange 7500 protrudes toward the rear side of the vehicle body from the base end of the first rear wall 7200. The tip end of the first front wall 7100 and the tip end of the first rear wall 7200 are connected to each other through the first side wall 7300.

The first energy absorption member 4400 is formed to have a U-shaped cross section by the first front wall 7100, the first rear wall 7200, and the first side wall 7300. The first front flange 7400 is joined to the side sill outer 4100. The first rear flange 7500 is joined to the side sill outer 4100. Accordingly, the first energy absorption member 4400 is attached to the side sill outer 4100 and swells to the side sill inner 4200 side via the opening portion 4300c of the stiffener 4300.

Thus, when the impact load F1 is input laterally to the vehicle Ve, the first energy absorption member 4400 can be crushed by the impact load F1.

In this manner, the first energy absorption member 4400 is attached to the side sill outer 4100. Thus, the degree of freedom of the shape of the side sill inner 4200 can be enhanced, so that the inner corner portion 6400 can be formed easily in the side sill inner 4200. Since the inner corner portion 6400 is formed to have a right-angled shape, when the impact load F1 is input laterally to the vehicle Ve, the inner corner portion 6400 can be engaged favorably with a frame engagement portion 2080 (which will be described below).

Figure 42:
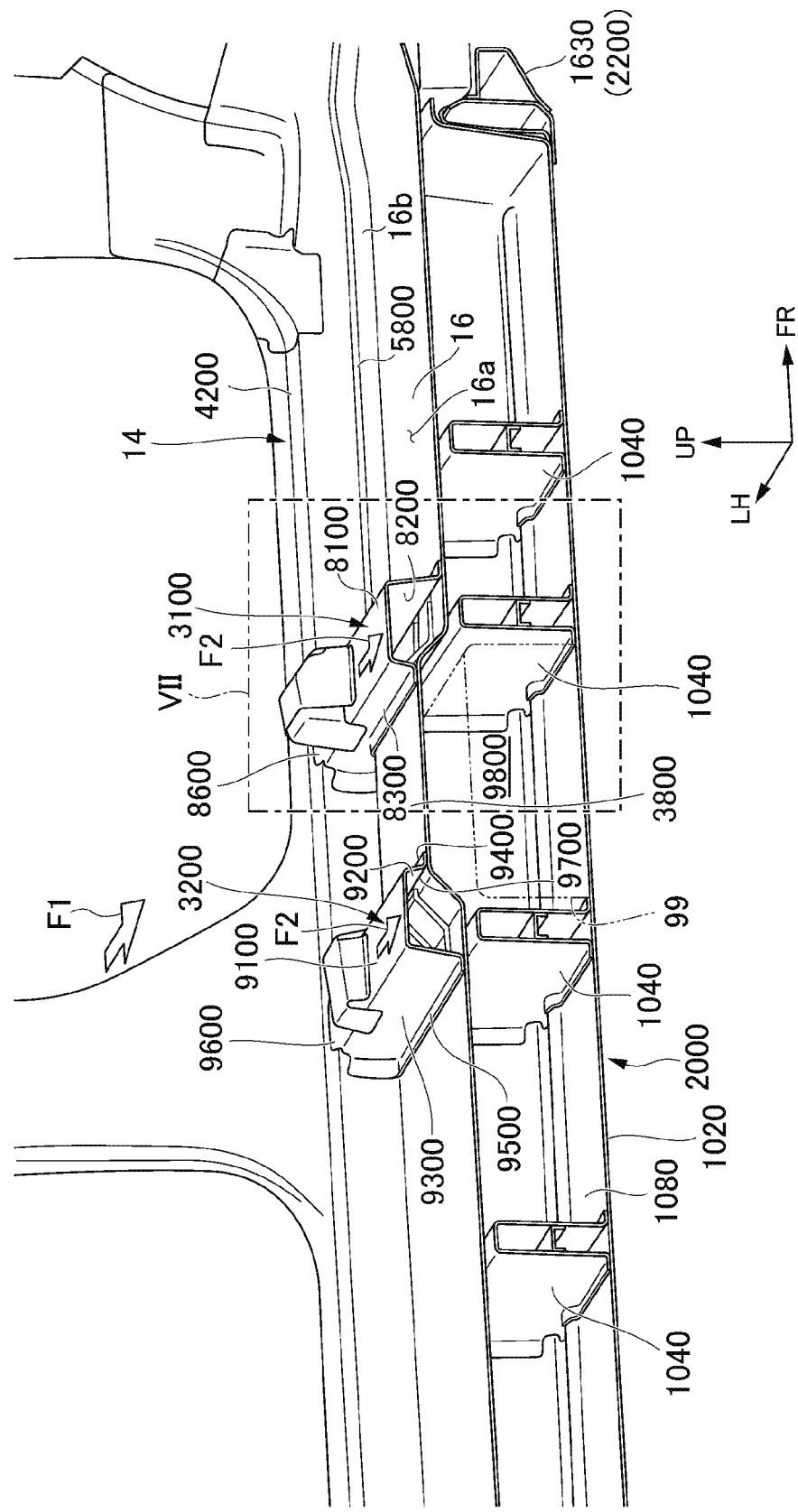
FIG. 42 is a perspective view showing a state cut along line VI-VI in FIG. 38 according to the fourth embodiment of the present invention.
Figure 43:
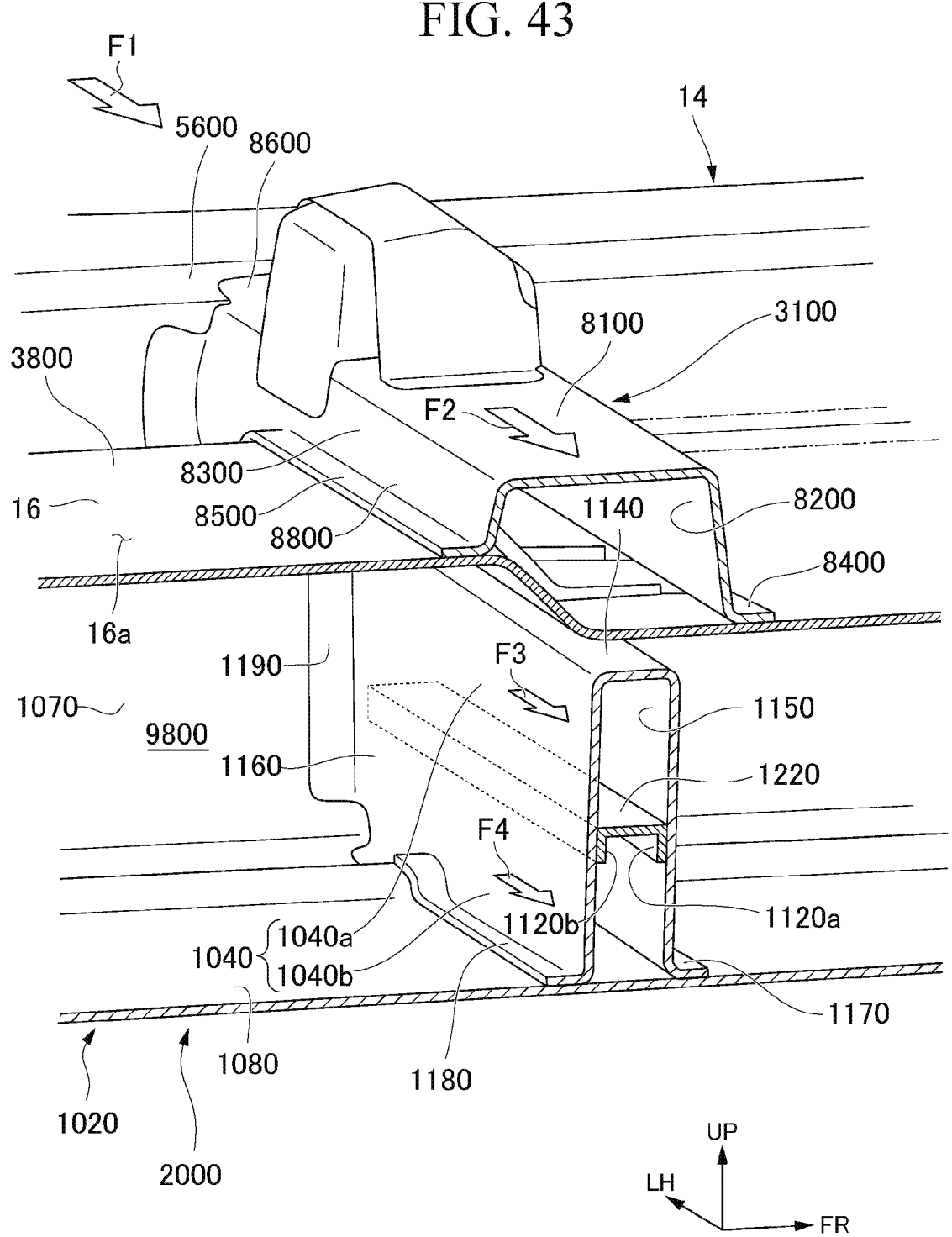
FIG. 43 is an enlarged perspective view showing a VII-part in FIG. 42 according to the fourth embodiment of the present invention.

As shown in FIGS. 42 and 43, a left side portion 16b of the floor panel 16 is attached to the inner central portion 5800 of the side sill inner 4200. The first floor cross-member 3100 and the second floor cross-member 3200 extend in the vehicle width direction along the upper surface 16a of the floor panel 16. The first floor cross-member 3100 and the second floor cross-member 3200 are provided at an interval in the front-rear direction of the vehicle body.

The first floor cross-member 3100 has a first member apex portion (apex portion) 8100, a first member front wall portion 8200, a first member rear wall portion 8300, a first member front flange (front flange) 8400, and a first member rear flange (rear flange) 8500.

The first member front wall portion 8200 protrudes downward toward the floor panel 16 from the front side of the first member apex portion 8100. The first member rear wall portion 8300 protrudes downward toward the floor panel 16 from the rear side of the first member apex portion 8100. The first floor cross-member 3100 is formed to have a U-shaped cross section by the first member apex portion 8100, the first member front wall portion 8200, and the first member rear wall portion 8300.

Moreover, the first floor cross-member 3100 is formed to have a hat-shaped cross section by the first member apex portion 8100, the first member front wall portion 8200, the first member rear wall portion 8300, the first member front flange 8400, and the first member rear flange 8500.

The first member front flange 8400 protrudes to the front side of the vehicle body from the lower side of the first member front wall portion 8200 along the upper surface 16a of the floor panel 16. The first member rear flange 8500 protrudes to the rear side of the vehicle body from the lower side of the first member rear wall portion 8300 along the upper surface 16a of the floor panel 16.

Since the first member front flange 8400 and the first member rear flange 8500 are joined to the upper surface 16a of the floor panel 16, the first floor cross-member 3100 is attached to the upper surface 16a of the floor panel 16. A closed cross section is formed by the first floor cross-member 3100 and the floor panel 16.

In this state, a left flange 8600 of the first member apex portion 8100 is joined to the upper portion of the left side sill 14 (specifically, the inner upper portion 5600 of the left side sill 14). Thus, the first member apex portion 8100 of the first floor cross-member 3100 is disposed in the same plane as the inner upper portion 5600 of the left side sill 14.

In addition, the first floor cross-member 3100 has a first recessed portion 8800 (also refer to FIG. 40) which is recessed upward to the first member rear wall portion 8300 facing the second floor cross-member 3200.

The second floor cross-member 3200 has a second member apex portion (apex portion) 9100, a second member front wall portion 9200, a second member rear wall portion 9300, a second member front flange (front flange) 9400, and a second member rear flange (rear flange) 9500.

The second member front wall portion 9200 protrudes downward toward the floor panel 16 from the front side of the second member apex portion 9100. The second member rear wall portion 9300 protrudes downward toward the floor panel 16 from the rear side of the second member apex portion 9100. The second floor cross-member 3200 is formed to have a U-shaped cross section by the second member apex portion 9100, the second member front wall portion 9200, and the second member rear wall portion 9300.

Moreover, the second floor cross-member 3200 is formed to have a hat-shaped cross section by the second member apex portion 9100, the second member front wall portion 9200, the second member rear wall portion 9300, the second member front flange 9400, and the second member rear flange 9500.

The second member front flange 9400 protrudes to the front side of the vehicle body from the lower side of the second member front wall portion 9200 along the upper surface 16a of the floor panel 16. The second member rear flange 9500 protrudes to the rear side of the vehicle body from the lower side of the second member rear wall portion 9300 along the upper surface 16a of the floor panel 16.

Since the second member front flange 9400 and the second member rear flange 9500 are joined to the upper surface 16a of the floor panel 16, the second floor cross-member 3200 is attached to the upper surface 16a of the floor panel 16. A closed cross section is formed by the second floor cross-member 3200 and the floor panel 16.

In this state, a flange 9600 of the second member apex portion 9100 is joined to the upper portion of the left side sill 14 (specifically, the inner upper portion 5600 of the left side sill 14). Thus, the second member apex portion 9100 of the second floor cross-member 3200 is disposed in the same plane as the inner upper portion 5600 of the left side sill 14.

In addition, the second floor cross-member 3200 has a second recessed portion 9700 which is recessed upward to the second member front wall portion 9200 facing the first floor cross-member 3100.

The left half portions of the first floor cross-member 3100 and the second floor cross-member 3200 withstand the passenger seat 2600 (refer to FIG. 37). That is, the first floor cross-member 3100 and the second floor cross-member 3200 are reinforced by the passenger seat 2600. Thus, the first recessed portion 8800 or the second recessed portion 9700 can be formed in a state where the strengths of the first floor cross-member 3100 and the second floor cross-member 3200 are ensured.

Thus, the impact load F1 input laterally to the left side sill 14 of the vehicle Ve can be transferred to the first floor cross-member 3100 and the second floor cross-member 3200 as the load F2 through the first load path.

The first recessed portion 8800 and the second recessed portion 9700 are joined along a projection portion 3800 of the floor panel 16 (refer to FIG. 42). That is, the floor panel 16 has the projection portion 3800 which projects upward along the first recessed portion 8800 and the second recessed portion 9700.

Since the projection portion 3800 of the floor panel 16 projects upward along the first recessed portion 8800 or the second recessed portion 9700, a significant space 9800 can be ensured below the floor panel 16. Accordingly, the volume of the battery pack 2000 (that is, a battery 99) to be disposed below the floor panel can be increased.

The projection portion 3800 of the floor panel 16 is formed between the first floor cross-member 3100 and the second floor cross-member 3200. Thus, the projection portion 3800 is positioned below the passenger seat 2600. For example, the projection portion 3800 is disposed on the rear side of the vehicle body with respect to feet (a part around a place where feet of an occupant are placed) of an occupant being seated in the passenger seat 2600. Accordingly, the projection portion 3800 can be prevented from becoming a hindrance when an occupant being seated in the passenger seat 2600 places his/her feet.

Figure 44:
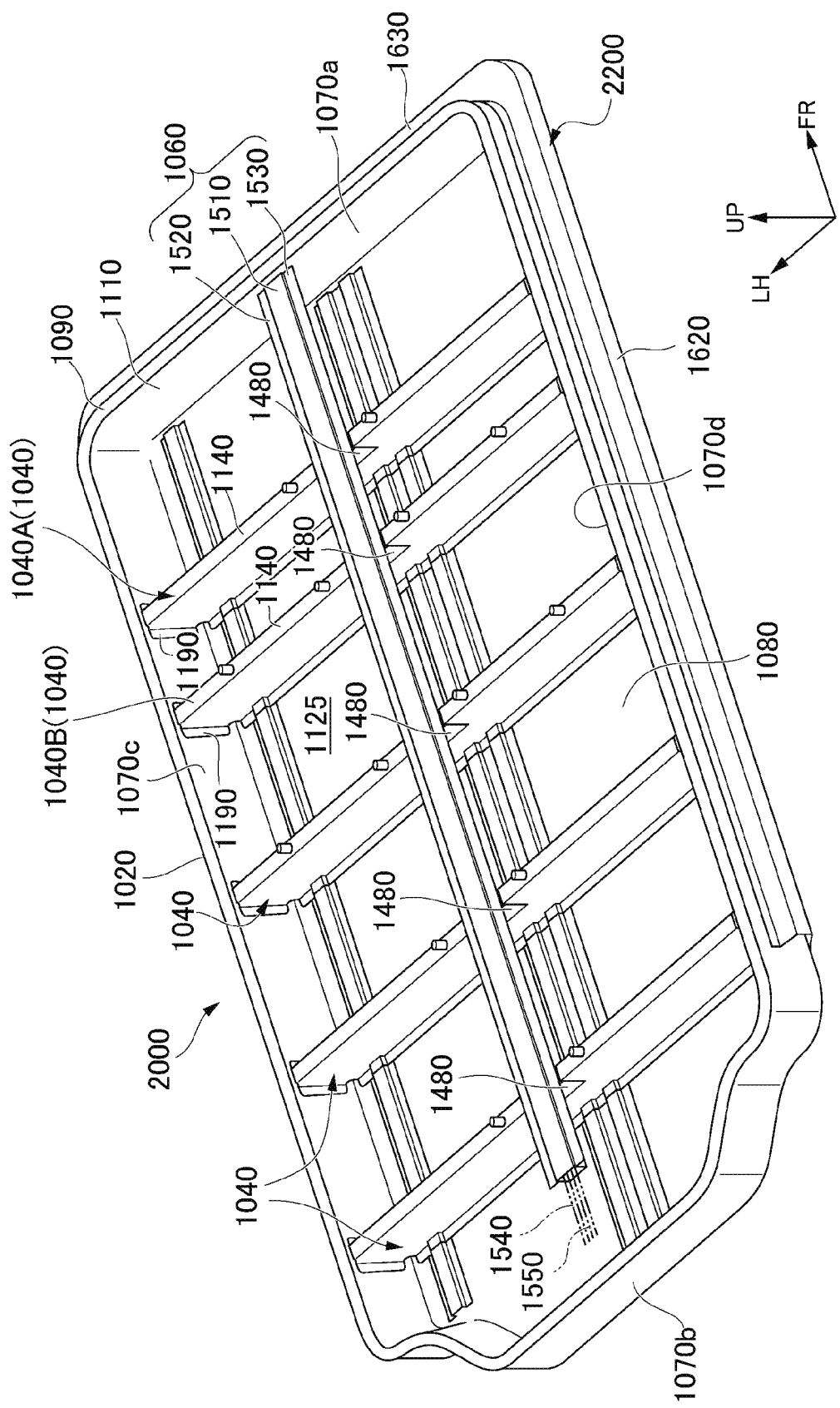
FIG. 44 is a perspective view showing a battery pack and a battery pack frame unit according to the fourth embodiment of the present invention.

As shown in FIGS. 43 and 44, the battery pack 2000 (underfloor mounting component) is provided between the left side sill 14 and the right side sill 15 (refer to FIG. 38) and below the floor panel 16. The battery pack 2000 includes a battery case 1020, a plurality of battery cross-members (underfloor cross-member) 1040, and a pipe accommodation portion 1060.

The battery case 1020 has a case wall portion (outer circumferential wall) 1070, a case bottom portion (lower surface) 1080, and a case flange 1090.

The case wall portion 1070 has a case front wall 1070a, a case rear wall 1070b, a case left side wall 1070c, and a case right side wall 1070d. The case wall portion 1070 is formed to have a rectangular frame shape by the case front wall 1070a, the case rear wall 1070b, the case left side wall 1070c, and the case right side wall 1070d.

In the case wall portion 1070, the lower end portion is blocked by the case bottom portion 1080, and a case opening portion 1110 is formed in the upper end portion. The case flange 1090 protrudes from the whole circumference of the case opening portion 1110 to the outer side of the battery case 1020.

The plurality of battery cross-members 1040 are provided in an inside 1125 of the battery case 1020. The battery cross-member 1040 extends in the vehicle width direction in the inside 1125 of the battery case 1020.

The battery cross-member 1040 has a battery cross-member apex portion (upper surface) 1140, a battery cross-member front wall portion 1150, a battery cross-member rear wall portion 1160, a battery cross-member front flange 1170, a battery cross-member rear flange 1180, a battery cross-member left end flange 1190, a battery cross-member right end flange 1210, and a battery cross-member partitioning wall (partitioning wall) 1220.

The battery cross-member apex portion 1140 is disposed above (specifically, the same height position as the case opening portion 1110) the case bottom portion 1080 and extends in the vehicle width direction along the case bottom portion 1080.

The battery cross-member front wall portion 1150 extends from the front side of the battery cross-member apex portion 1140 toward the case bottom portion 1080. The battery cross-member rear wall portion 1160 extends from the rear side of the battery cross-member apex portion 1140 toward the case bottom portion 1080.

The battery cross-member front flange 1170 protrudes from the lower side of the battery cross-member front wall portion 1150 toward the front side of the vehicle body. The battery cross-member rear flange 1180 protrudes from the lower side of the battery cross-member rear wall portion 1160 toward the rear side of the vehicle body.

The battery cross-member left end flange 1190 protrudes from the left end portion of the battery cross-member front wall portion 1150 toward the front side of the vehicle body. The battery cross-member right end flange 1210 protrudes from the left end portion of the battery cross-member rear wall portion 1160 toward the front side of the vehicle body.

The battery cross-member 1040 is formed to have a U-shaped cross section by the battery cross-member apex portion 1140, the battery cross-member front wall portion 1150, and the battery cross-member rear wall portion 1160.

The battery cross-member 1040 is formed to have a hat-shaped cross section by the battery cross-member apex portion 1140, the battery cross-member front wall portion 1150, the battery cross-member rear wall portion 1160, the battery cross-member front flange 1170, and the battery cross-member rear flange 1180.

The battery cross-member front flange 1170 and the battery cross-member rear flange 1180 are joined to the case bottom portion 1080.

Thus, the battery cross-member 1040 is formed to have a hollow shape (that is, a closed cross section) by the battery cross-member apex portion 1140, the battery cross-member front wall portion 1150, the battery cross-member rear wall portion 1160, and the case bottom portion 1080.

The battery cross-member partitioning wall 1220 is provided at the center of the battery cross-member 1040 in the up-down direction. Specifically, a front flange 1120a of the battery cross-member partitioning wall 1220 is joined to the battery cross-member front wall portion 1150, and a rear flange 1120b of the battery cross-member partitioning wall 1220 is joined to the battery cross-member rear wall portion 1160. Accordingly, the battery cross-member partitioning wall 1220 is provided at the center of the battery cross-member 1040 in the up-down direction.

That is, the battery cross-member 1040 is vertically partitioned by the battery cross-member partitioning wall 1220. Thus, the battery cross-member 1040 is divided into a cross-member upper portion (upper portion) 1040a and a cross-member lower portion (lower portion) 1040b by the battery cross-member partitioning wall 1220.

Accordingly, a part of the impact load F1 input laterally to the left side sill 14 of the vehicle Ve can be transferred to the cross-member upper portion 1040a as a so-called horizontal load F3 through the path of the second load path. In addition, a part of the impact load F1 input laterally to the left side sill 14 of the vehicle Ve can be transferred to the cross-member lower portion 1040b as a so-called offset load F4 through the path of the third load path.

In this manner, a part of the impact load F1 input laterally to the left side sill 14 of the vehicle Ve can be transmitted in a manner divided into two paths such as the cross-member upper portion 1040a and the cross-member lower portion 1040b. As a result, the cross-member upper portion 1040a and the cross-member lower portion 1040b can favorably withstand a part of the impact load F1.

In addition, the battery cross-member left end flange 1190 is joined to the case left side wall 1070c of the battery case 1020. The battery cross-member right end flange 1210 is joined to the case right side wall 1070d of the battery case 1020.

In this state, in the battery cross-member 1040, the battery cross-member apex portion (upper surface) 1140 is disposed to confront (face) a side sill central portion (central portion) 14a (refer to FIG. 40) in the up-down direction of the left side sill 14. Thus, a part of the impact load F1 input laterally to the left side sill 14 of the vehicle Ve can be transferred reliably to the cross-member upper portion 1040a as a so-called horizontal load through the path of the second load path.

As shown in FIG. 39, the battery cross-member 1040 is formed to have a hollow shape and includes a fragile portion 1240 and a firm portion 1250.

The fragile portion 1240 is formed in an outer region E1 on the outer side in the vehicle width direction. The firm portion 1250 is formed in an inner region E2 on the inner side in the vehicle width direction.

In this manner, the fragile portion 1240 is formed in the outer region E1 of the battery cross-member 1040. Thus, the impact load F1 input laterally to the vehicle Ve can be absorbed by crushing the fragile portion 1240.

Meanwhile, the firm portion 1250 is formed in the inner region E2 of the battery cross-member 1040. Thus, the firm portion 1250 can withstand the remaining load absorbed by the fragile portion 1240.

Accordingly, the floor panel (that is, a vehicle body floor) 16 can be divided into the energy absorption region (that is, the outer region) E1 on the outer side in the vehicle width direction and the protection region (that is, the inner region) E2 on the inner side in the vehicle width direction.

Figure 45:
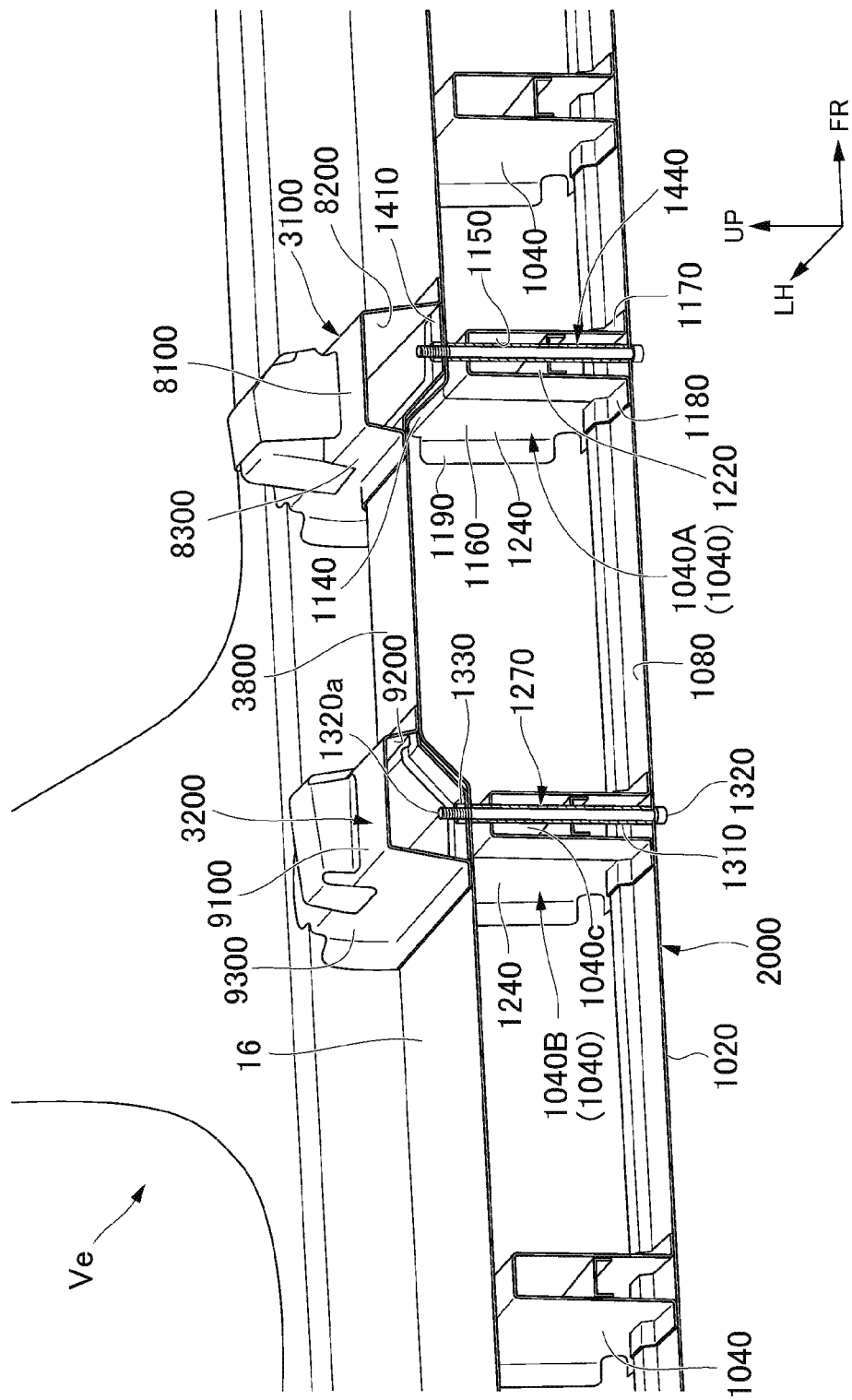
FIG. 45 is a perspective view showing a connected state of a floor cross-member and a battery cross-member in the fourth embodiment of the present invention.
Figure 46:
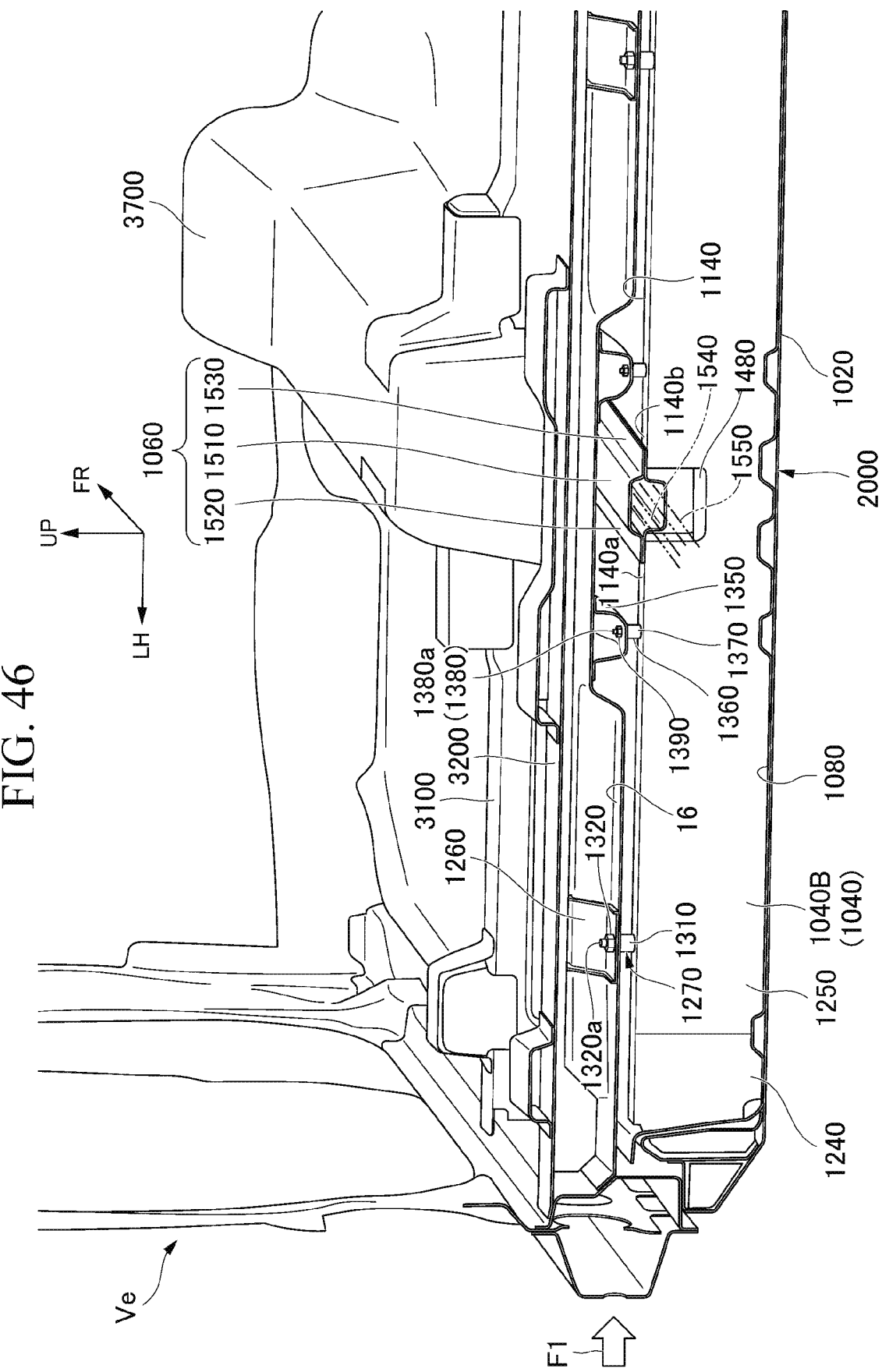
FIG. 46 is a cross-sectional view cut along line X-X in FIG. 38 according to the fourth embodiment of the present invention.

As shown in FIGS. 45 and 46, a battery cross-member 1040 of the plurality of battery cross-members 1040 on a second row from the front side of the vehicle body is disposed below the first floor cross-member 3100.

In addition, a battery cross-member 1040 of the plurality of battery cross-members 1040 on a fourth row from the front side of the vehicle body is disposed below the second floor cross-member 3200.

Hereinafter, in FIGS. 45 and 46, for convenience, the battery cross-member 1040 on the second row will be described as a battery cross-member (underfloor cross-member) 1040A. A battery cross-member 1040 on a third row will be described as a battery cross-member (underfloor cross-member) 1040B.

An outer attachment bracket 1260 is provided in the floor panel 16 below the outer end side of the second floor cross-member 3200. The battery cross-member 104B on the third row is connected to the outer attachment bracket 1260 by an outer connection member 1270.

The outer connection member 1270 includes a collar 1310, a bolt 1320, and a nut 1330. The collar 1310 is disposed between the floor panel 16 below the second floor cross-member 3200 and the case bottom portion 1080 in a state extending in the vertical direction. In addition, the collar 1310 is disposed in a state penetrating an inside 1040c of the battery cross-member 1040B. The bolt 1320 is thrust into the collar 1310 from below the case bottom portion 1080 via the case bottom portion 1080, and a screw portion 1320a protrudes upward from the floor panel 16 and the outer attachment bracket 1260. The nut 1330 is screwed and coupled to the screw portion 1320a.

An inner attachment bracket 1350 is provided in the floor panel 16 below the inner end side of the second floor cross-member 3200. The battery cross-member 1040B is connected to the inner attachment bracket 1350 using an inner connection member 1360.

The inner connection member 1360 includes a collar 1370, a bolt 1380, and a nut 1390. The collar 1370 is disposed between the floor panel 16 below the second floor cross-member 3200 and the case bottom portion 1080 in a state extending in the vertical direction. In addition, the collar 1370 is disposed in a state penetrating the inside 1040c of the battery cross-member 1040B. The bolt 1380 is thrust into the collar 1370 from below the case bottom portion 1080 via the case bottom portion 1080, and a screw portion 1380a protrudes upward from the inner attachment bracket 1350. The nut 1390 is screwed and coupled to a screw portion 1380a.

The battery cross-member 1040B is connected to the floor panel 16 below the outer end side of the second floor cross-member 3200 with the outer attachment bracket 1260 interposed therebetween using the outer connection member 1270. In addition, the battery cross-member 1040B is connected to the floor panel 16 below the inner end side of the second floor cross-member 3200 with the inner attachment bracket 1350 interposed therebetween using the inner connection member 1360. Thus, the floor panel 16 below the second floor cross-member 3200 is reinforced by the battery cross-member 1040B.

That is, the rigidity of the floor panel 16 below the first floor cross-member 3100 is enhanced. Accordingly, even if the second floor cross-member 3200 and the battery cross-member 1040B partially have the fragile portion 1240, a yield strength with respect to the impact load F1 input laterally to the vehicle Ve can be improved.

An outer attachment bracket 1410 and an inner attachment bracket 1420 are provided in the floor panel 16 of the first floor cross-member 3100. The battery cross-member 1040A on the second row is connected to the outer attachment bracket 1410 and the inner attachment bracket 1420 using an outer connection member 1440 and the inner connection member 1360.

A constitution in which the battery cross-member 1040A on the second row is connected to the floor panel 16 of the first floor cross-member 3100 is similar to the constitution in which the battery cross-member 1040B on the third row is connected to the floor panel 16 of the second floor cross-member 3200. Thus, detailed description of the constitution in which the battery cross-member 1040A on the second row is connected to the floor panel 16 of the first floor cross-member 3100 will be omitted.

The rigidity of the floor panel 16 below the second floor cross-member 3200 is enhanced by connecting the battery cross-member 1040A on the second row to the floor panel 16 of the first floor cross-member 3100. Accordingly, even if the first floor cross-member 3100 and the battery cross-member 1040A partially have the fragile portion 1240, a yield strength with respect to an impact load input laterally to the vehicle Ve can be improved.

As shown in FIGS. 44 and 46, the battery cross-member 1040 has a battery cross-member recessed portion (recessed portion) 1480 at the center in the vehicle width direction. The battery cross-member recessed portion 1480 is formed to be recessed downward.

The pipe accommodation portion 1060 is attached to the battery cross-member recessed portion 148 in a manner extending in the front-rear direction of the vehicle body. The pipe accommodation portion 1060 has a pipe portion 1510, a left flange 1520, and a right flange 1530.

The pipe portion 1510 is formed to have a hollow closed cross section. A piping 1540, a hose 1550, and the like are accommodated inside the pipe portion 1510. The left flange 1520 protrudes from the left side portion of the pipe portion 1510 to the left side in the vehicle width direction. The left flange 1520 is attached to a left side portion 1140a of the battery cross-member apex portion 1140 in the battery cross-member recessed portion 1480.

The right flange 1530 protrudes from the right side portion of the pipe portion 1510 to the right side in the vehicle width direction. The right flange 1530 is attached to a right side portion 1140b of the battery cross-member apex portion 1140 in the battery cross-member recessed portion 1480.

That is, the pipe accommodation portion 1060 is laid across the left side portion 1140a and the right side portion 1140b of the battery cross-member recessed portion 1480 in a manner straddling the battery cross-member recessed portion 1480.

Since the battery cross-member recessed portion 1480 is formed in the battery cross-member 1040, the battery cross-member recessed portion 1480 can include the pipe accommodation portion 1060. The pipe accommodation portion 1060 accommodates the piping 1540, the hose 1550, and the like.

In addition, since the pipe accommodation portion 1060 is laid across the battery cross-member recessed portion 1480 of the battery cross-member 1040, the battery cross-member recessed portion 1480 is reinforced by the pipe accommodation portion 1060. Thus, when a load is transmitted laterally to the battery cross-member 1040 of the vehicle Ve, the pipe accommodation portion 1060 can withstand the transmitted load. Accordingly, the battery cross-member recessed portion 1480 can be prevented from being broken due to the transmitted load, and the battery cross-member 1040 can withstand the transmitted load.

Figure 47:
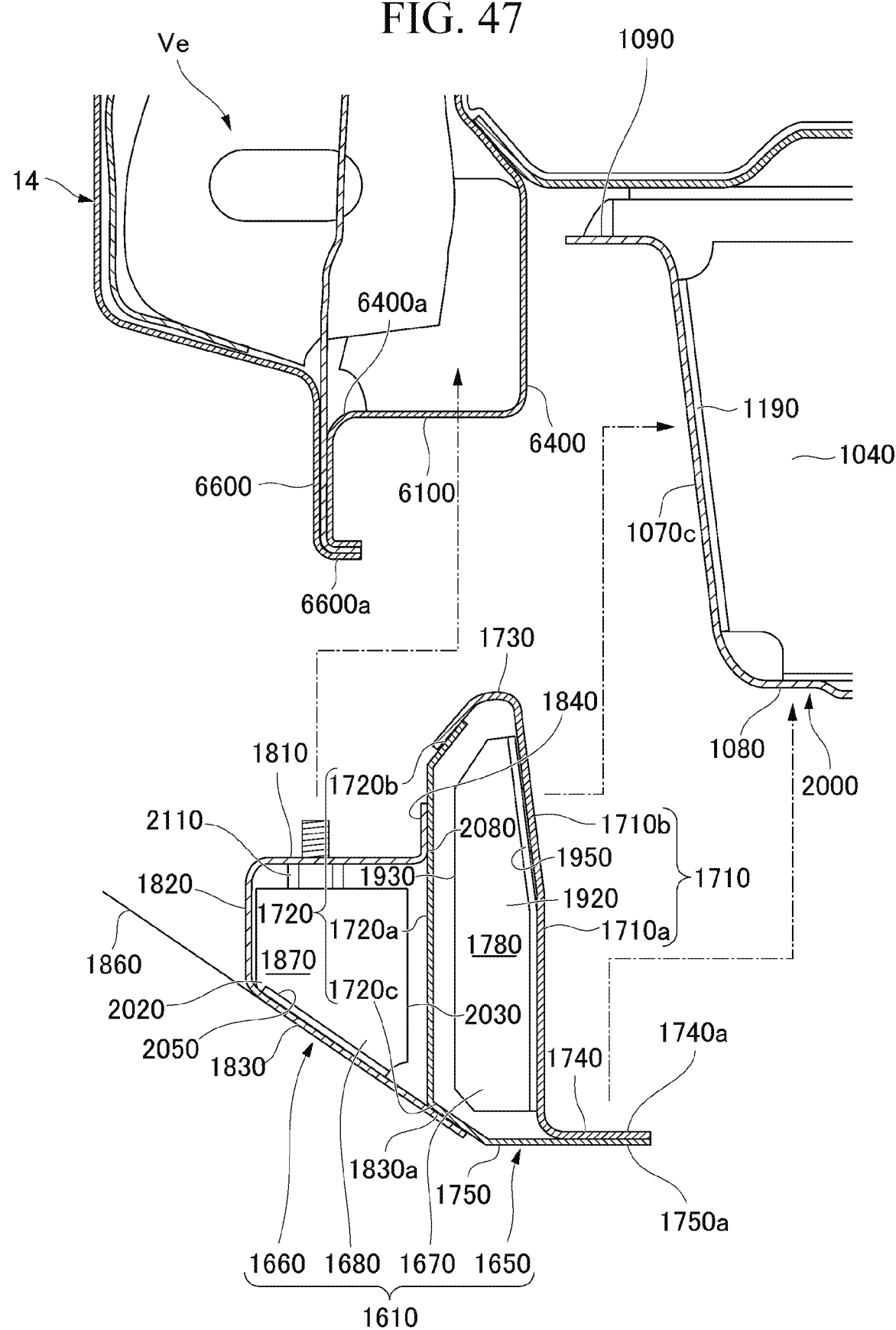
FIG. 47 is a cross-sectional view showing a state where a left frame portion is exploded from the vehicle body substructure according to the fourth embodiment of the present invention.

As shown in FIGS. 44 and 47, the battery pack frame unit 2200 is attached to the battery pack 2000. The battery pack frame unit 2200 includes a left frame portion (frame portion) 1610, a right frame portion (frame portion) 1620, and a front frame portion (frame portion) 1630.

The left frame portion 1610 is provided in the case left side wall 1070*c* of the battery case 1020 from the outer side of the battery case 1020. The right frame portion 1620 is provided in the case right side wall 1070*d* of the battery case 1020 from the outer side of the battery case 1020. The front frame portion 1630 is provided in the case front wall 1070*a* of the battery case 1020 from the outer side of the battery case 1020.

The left frame portion 1610, the right frame portion 1620, and the front frame portion 1630 are constituted in a similar manner. Thus, hereinafter, the left frame portion 1610 will be described, and description of the right frame portion 1620 and the front frame portion 1630 will be omitted.

The left frame portion 1610 includes a first frame portion 1650, a second frame portion 1660, a first frame energy absorption member (second energy absorption member) 1670, and a second frame energy absorption member (second energy absorption member) 1680. The left frame portion 1610 is formed to have an L-shaped cross section.

The first frame portion 1650 has a first frame inside wall portion 1710, a first frame outside wall portion 1720, a first frame apex portion 1730, a first frame joint portion 1740, and a first frame bottom portion 1750.

The first frame inside wall portion 1710 has an inside wall lower half portion 1710*a* and an inside wall upper half portion 1710*b*. The inside wall lower half portion 1710*a* rises in a substantially vertical manner. The inside wall upper half portion 1710*b* extends in a manner inclining outward in the vehicle width direction from the upper end of the inside wall lower half portion 1710*a* and upward to the first frame apex portion 1730.

The first frame outside wall portion 1720 has an outside wall central portion 1720*a*, an outside wall upper portion 1720*b*, and an outside wall lower portion 1720*c*. The outside wall central portion 1720*a* is disposed on the outer side in the vehicle width direction with respect to the first frame inside wall portion 1710 and rises in a substantially vertical manner. The outside wall upper portion 1720*b* extends in a manner inclining inward in the vehicle width direction from the upper end of the outside wall central portion 1720*a* and upward to the first frame apex portion 1730. The outside wall lower portion 1720*c* extends in a manner inclining inward in the vehicle width direction from the lower end of the outside wall central portion 1720*a* and downward to the first frame bottom portion 1750.

The first frame apex portion 1730 communicates with the upper end of the inside wall upper half portion 1710*b* and the upper end of the outside wall upper portion 1720*b*.

The first frame joint portion 1740 extends from the lower end of the inside wall lower half portion 1710*a* inward in the vehicle width direction (specifically, the case bottom portion 1080).

The first frame bottom portion 1750 extends from the lower end of the outside wall lower portion 1720*c* inward in the vehicle width direction (specifically, the case bottom portion 1080) along the lower surface of the first frame joint portion 1740.

The first frame portion 1650 is formed to have a closed cross section by the first frame inside wall portion 1710, the first frame outside wall portion 1720, the first frame apex portion 1730, and the first frame bottom portion 1750.

The inside wall upper half portion 1710*b* of the first frame portion 1650 is joined to the case left side wall 1070*c* of the battery case 1020 and the battery cross-member left end flange 1190. In addition, an inner end portion 1740*a* of the first frame joint portion 1740 and an inner end portion 1750*a* of the first frame bottom portion 1750 are joined to the case bottom portion 1080 of the battery case 1020.

The first frame energy absorption member 1670 is accommodated in an inside 1780 (that is, a closed cross section) of the first frame portion 1650.

The second frame portion 1660 has a second frame apex portion 1810, a second frame outside wall portion 1820, a second frame inclination portion (inclination portion) 1830, and a second frame flange 1840.

The second frame outside wall portion 1820 is disposed on the outer side of the first frame portion 1650 in the vehicle width direction and rises in a substantially vertical manner.

The second frame apex portion 1810 extends horizontally from the upper end of the second frame outside wall portion 1820 inward in the vehicle width direction to the outside wall central portion 1720*a* of the first frame outside wall portion 1720.

The second frame flange 1840 extends upward from the inner end of the second frame apex portion 1810 along the outer surface of the outside wall central portion 1720*a*. The second frame flange 1840 is joined to the outside wall central portion 1720*a*.

The second frame inclination portion 1830 extends with a downward slope inward in the vehicle width direction from the lower end of the second frame outside wall portion 1820 and downward to the outside wall lower portion 1720*c* of the first frame outside wall portion 1720. A lower portion 1830*a* of the second frame inclination portion 1830 is disposed along the lower surface of the outside wall lower portion 1720*c*. The lower portion 1830*a* of the second frame inclination portion 1830 and the outside wall lower portion 1720*c* are joined to each other.

Since the second frame flange 1840 is joined to the outside wall central portion 1720*a* and the lower portion 1830*a* of the second frame inclination portion 1830 is joined to the outside wall lower portion 1720*c*, the second frame portion 1660 is attached to the first frame portion 1650.

The second frame inclination portion 1830 extends in a manner inclining upward from the case bottom portion (lower surface) 1080 side of the battery case 1020 toward the lower end portion 6600*a* of the side sill flange 6600 such that an imaginary extension line 1860 intersects the side sill flange 6600.

As shown in FIG. 40, the side sill flange 6600 of the left side sill 14 extends downward from the outer end portion 6400*a* on the outer side of the inner corner portion 6400 in the vehicle width direction. In addition, the second frame inclination portion 1830 extends in a manner inclining upward from the case bottom portion 1080 side toward the lower end portion 6600*a* of the side sill flange 6600 such that the imaginary extension line 1860 of the second frame inclination portion 1830 intersects the side sill flange 6600.

Thus, the second frame inclination portion 183 can be concealed by the side sill flange 6600 such that it is unlikely to be viewed from the outside of the vehicle Ve. Accordingly, a large-sized battery pack 2000 in which the case bottom portion 1080 of the battery pack 2000 is disposed below the left side sills 14 can be mounted in the vehicle Ve without affecting the appearance of the vehicle Ve.

In addition, the second frame inclination portion 1830 is formed in the second frame portion 1660. Accordingly, a part of the impact load F1 input laterally to the left side sill 14 of the vehicle Ve can be transferred to the lower portion (that is, the cross-member lower portion) 1040b of the battery cross-member 1040 as a so-called offset load F4 via the left frame portion 1610.

Moreover, the upper portion (that is, the cross-member upper portion) 1040a of the battery cross-member 1040 faces the lower half portion of the left side sill 14. That is, a part of the impact load F1 input laterally to the left side sill 14 of the vehicle Ve can be transferred to the cross-member upper portion 1040a as a so-called horizontal load F3.

Thus, the impact load F1 input laterally to the left side sill 14 of the vehicle Ve can be dispersed and transferred to the cross-member upper portion 1040a and the cross-member lower portion 1040b. Accordingly, the battery cross-member 1040 can withstand the impact load F1. As a result, a large-sized battery pack 2000 in which the case bottom portion 1080 of the battery pack 2000 is disposed below the left side sill 14 can be protected from the impact load F1.

As shown in FIG. 47, the second frame portion 1660 is formed to have a closed cross section by the second frame apex portion 1810, the second frame outside wall portion 1820, the second frame inclination portion 1830, and the outside wall central portion 1720a of the first frame portion 1650.

The second frame energy absorption member (that is, the second energy absorption member) 1680 is accommodated in an inside 1870 (that is, a closed cross section) of the second frame portion 1660.

That is, the first frame energy absorption member 1670 and the second frame energy absorption member 1680 (that is, the second energy absorption member) are provided inside the left frame portion 1610.

Figure 48:
FIG. 48 is a perspective view showing a state cut along line XII-XII in FIG. 40 according to the fourth embodiment of the present invention.

As shown in FIGS. 47 and 48, the first frame energy absorption member 1670 is accommodated in an inside 1780 of the first frame portion 1650. The first frame energy absorption member 1670 has a second front wall 1910, a second rear wall 1920, a second side wall 1930, a second front flange 1940, and a second rear flange 1950.

The second front flange 1940 protrudes from the base end of the second front wall 1910 toward the front side of the vehicle body. The second rear wall 1920 is disposed at an interval from the rear side of the vehicle body with respect to the second front wall 1910. The second rear flange 1950 protrudes from the base end of the second rear wall 1920 toward the rear side of the vehicle body. The tip end of the second front wall 1910 and the tip end of the second rear wall 1920 are connected to each other through the second side wall 1930.

The first frame energy absorption member 1670 is formed to have a U-shaped cross section by the second front wall 1910, the second rear wall 1920, and the second side wall 1930. The second front flange 1940 is joined to the first frame inside wall portion 1710. The second rear flange 1950 is joined to the first frame inside wall portion 1710. Accordingly, the first frame energy absorption member 1670 is attached to the first frame inside wall portion 1710.

The second frame energy absorption member 1680 is accommodated in the inside 1870 of the second frame portion 1660. The second frame energy absorption member 1680 has a third front wall 2010, a third rear wall 2020, a third side wall 2030, a third front flange 2040, and a third rear flange 2050.

The third front flange 2040 protrudes from the base end of the third front wall 2010 toward the front side of the vehicle body. The third rear wall 2020 is disposed at an interval from the rear side of the vehicle body with respect to the third front wall 2010. The third rear flange 2050 protrudes from the base end of the third rear wall 2020 toward the rear side of the vehicle body. The tip end of the third front wall 2010 and the tip end of the third rear wall 2020 are connected to each other through the third side wall 2030.

The second frame energy absorption member 1680 is formed to have a U-shaped cross section by the third front wall 2010, the third rear wall 2020, and the third side wall 2030. The third front flange 2040 is joined to the second frame inclination portion 1830. The third rear flange 205 is joined to the second frame inclination portion 183. Accordingly, the second frame energy absorption member 1680 is attached to the second frame inclination portion 1830.

As shown in FIGS. 40 and 47, the first frame energy absorption member 1670 and the second frame energy absorption member 1680 can be crushed by the impact load F1 input laterally to the vehicle Ve. Since the first frame energy absorption member 1670 and the second frame energy absorption member 1680 are crushed by the impact load F1, the inner corner portion 6400 of the left side sill 14 can be engaged favorably with the left frame portion 1610.

Accordingly, a part of the impact load F1 input laterally to the left side sill 14 of the vehicle Ve can be transferred reliably to the cross-member lower portion 1040b of the battery cross-member 1040 as a so-called offset load F4 via the left frame portion 1610.

The left frame portion 1610 has a frame engagement portion (engagement portion) 2080. Since the outside wall central portion 1720a of the first frame outside wall portion 1720 and the second frame apex portion 1810 are disposed to intersect (specifically, orthogonal to) each other, the frame engagement portion 2080 is formed by the outside wall central portion 1720a and the second frame apex portion 1810. In other words, the frame engagement portion 2080 is formed to have an L-shaped cross section by the upper portion 1720b of the outside wall central portion 1720a and the second frame apex portion 1810.

In this manner, the left frame portion 1610 has the frame engagement portion 2080 and the second frame inclination portion 1830. The left frame portion 1610 is formed to have an L-shaped closed cross section by the frame engagement portion 2080, the second frame inclination portion 1830, and the like.

In a state where the second frame apex portion 1810 of the second frame portion 1660 comes into contact with the inner lower portion 6100 of the left side sill 14 from below, the second frame portion 1660 is attached to the inner lower portion 6100 using a bolt 2110, a nut 2120 (refer to FIG. 40), and the like.

In this state, the frame engagement portion 2080 confronts (faces) the inner corner portion 6400 of the left side sill 14 (refer to FIG. 40). Moreover, the left frame portion 1610 is formed to have an L-shaped closed cross section by the frame engagement portion 2080, the second frame inclination portion 1830, and the like.

Thus, the frame engagement portion 2080 is formed firmly in the left frame portion 1610. That is, the inner corner portion 6400 (that is, the left side sill 14) can be received reliably by the left frame portion 1610 in which the frame engagement portion 2080 is formed. Accordingly, when the impact load F1 is input laterally to the vehicle Ve, the impact load F1 input to the left side sill 14 can be transmitted reliably to the left frame portion 1610.

The left frame portion 1610 is joined to the battery cross-member left end flange 1190 with the case left side wall 1070c of the battery case 1020 interposed therebetween. Thus, the battery cross-member 1040 is disposed to face the left frame portion 1610. Accordingly, a load transmitted to the left frame portion 1610 can be transferred to the battery cross-member 1040, and the battery cross-member 1040 can withstand the transferred load.

Next, an example in which the battery 99 is protected by the vehicle body substructure 12 when the impact load F5 is input laterally to the vehicle Ve will be described based on FIG. 49.

In order to facilitate the understanding of description, an example in which the impact load F5 is input to the first floor cross-member 3100 will be described.

Figure 49:
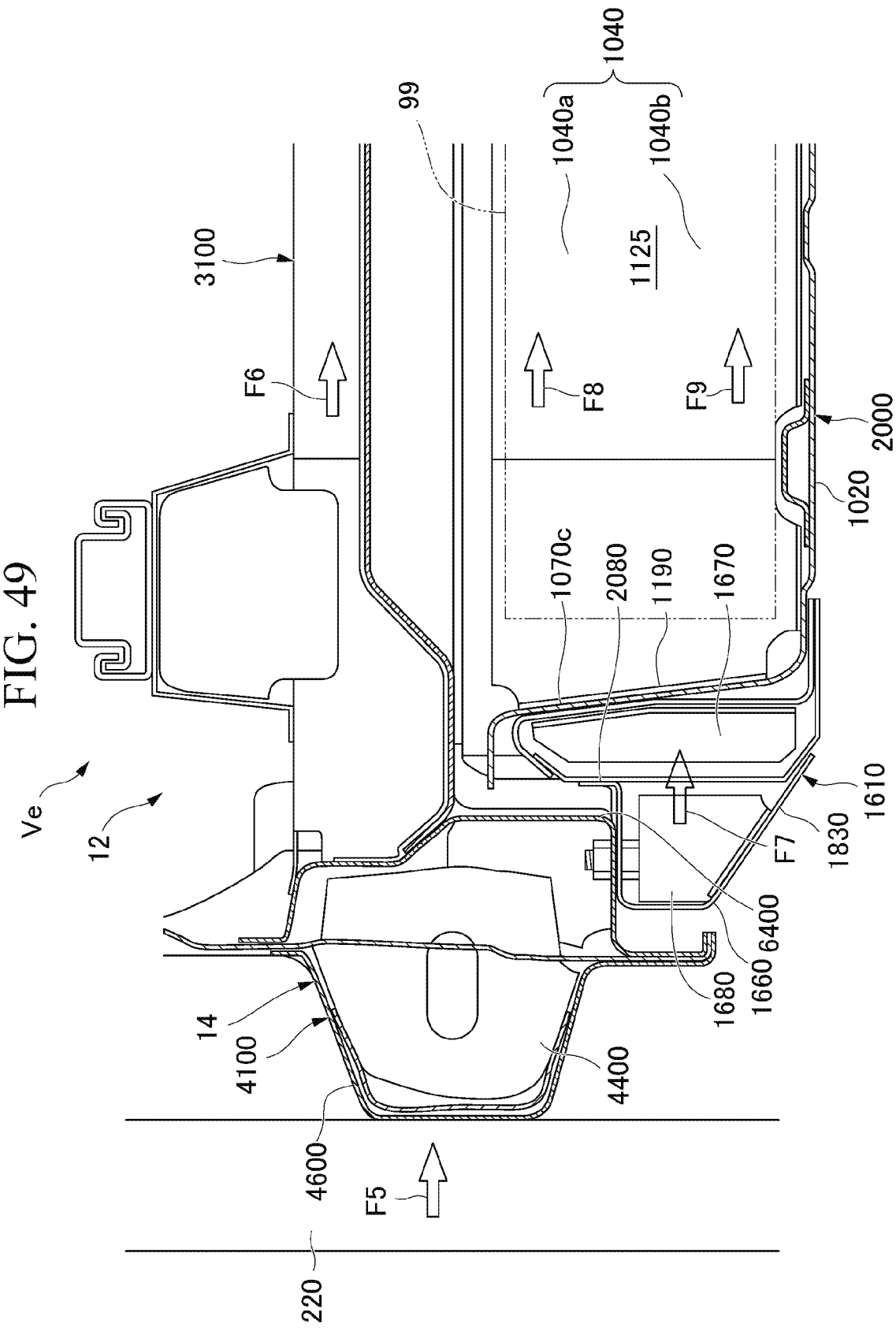
FIG. 49 is a cross-sectional view for describing an example in which the battery is protected by the vehicle body substructure when an impact load is input laterally to the vehicle, in the fourth embodiment of the present invention.

As shown in FIG. 49, an obstacle 220 collides laterally with the vehicle Ve. Therefore, the impact load F5 is input laterally to the left side sill 14 of the vehicle Ve. Due to the impact load F5 input to the left side sill 14, the outer swelling portion 4600 of the side sill outer 4100 of the left side sill 14 deforms inward in the vehicle width direction. The outer swelling portion 4600 is deformed, and the first energy absorption member 4400 is crushed by the impact load F5 and absorbs the impact energy.

A part of the remaining load absorbed by the first energy absorption member 4400 can be transferred to the first floor cross-member 3100 as a load F6 through the path of the first load path.

In this state, the inner corner portion 6400 of the left side sill 14 is received reliably by the frame engagement portion 2080 of the left frame portion 1610. Thus, the remaining load is transferred to the left frame portion 1610 via the inner corner portion 6400 of the left side sill 14 and the frame engagement portion 2080.

Since the load F7 is transferred to the left frame portion 1610, the second frame energy absorption member 1680 and the first frame energy absorption member 1670 of the left frame portion 1610 is crushed through buckling due to the load F7, and the impact energy is absorbed.

The left frame portion 1610 is joined to the battery cross-member left end flange 1190 with the case left side wall 1070c of the battery case 1020 interposed therebetween. Thus, the battery cross-member 1040 is disposed to face the left frame portion 1610. Accordingly, the load F7 transmitted to the left frame portion 1610 can be transferred to the battery cross-member 1040, and the battery cross-member 1040 can withstand the transferred load.

The upper portion 1040a of the battery cross-member 104 faces the lower half portion of the left side sill 14. Thus, a part of a load transmitted to the left frame portion 1610 can be transferred to the cross-member upper portion 1040a as a so-called horizontal load F8 through the path of the second load path.

Moreover, the second frame inclination portion 1830 is formed in the second frame portion 1660. Thus, the remaining load transmitted to the left frame portion 1610 can be transferred to the cross-member lower portion 1040b as a so-called offset load F9 via the left frame portion 1610 through the path of the third load path.

In this manner, the impact load F5 input laterally to the vehicle Ve can be absorbed favorably by the first energy absorption member 4400, the first frame energy absorption member 1670, and the second frame energy absorption member 1680. Moreover, the impact load F5 input laterally to the vehicle Ve can be dispersed to the paths of the first to third load paths.

Thus, the first floor cross-member 3100 or the battery cross-member 1040 can favorably withstand the loads F6, F8, and F9 dispersed to the paths of the first to third load paths. Accordingly, the battery 99 accommodated in the inside 1125 of the battery case 1020 can be protected from the impact load F5.

Next, a vehicle body substructure 300 of the second embodiment will be described based on FIGS. 50 to 52. In the vehicle body substructure 300 of the second embodiment, the same reference signs are applied to members the same as or similar to those in the vehicle body substructure 12 of the first embodiment, and detailed description will be omitted. Similar to the vehicle body substructure 12 of the first embodiment, the vehicle body substructure 300 of the second embodiment has a substantially bilateral symmetry. Thus, hereinafter, a constitution of the vehicle body substructure 300 on the left side will be described, and description of a constitution on the right side will be omitted.

Second Embodiment

Figure 50:
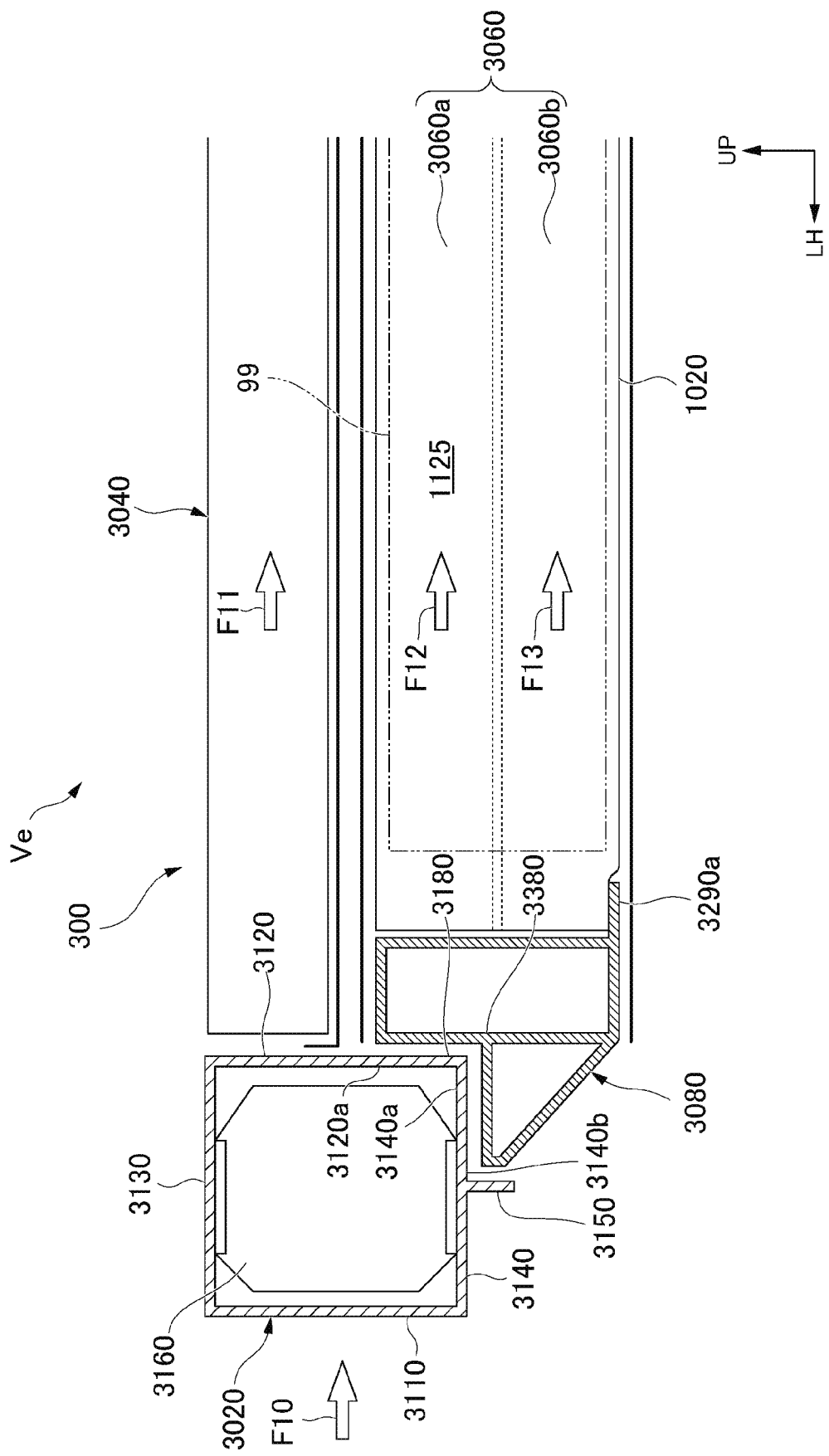
FIG. 50 is a cross-sectional view showing a vehicle body substructure according to an alternative fourth embodiment of the present invention.

As shown in FIG. 50, in the vehicle body substructure 300, a left side sill (side sill) 3020, a floor cross-member 3040, a battery cross-member 3060, and a left frame portion (frame portion) 3080 are formed of an aluminum alloy. The constitution of the vehicle body substructure 300 is otherwise similar to that of the vehicle body substructure 12 of the first embodiment.

Since the left side sill 3020, the floor cross-member 3040, the battery cross-member 3060, and the left frame portion 3080 are formed of an aluminum alloy, weight reduction of the vehicle body substructure 300 can be achieved. Moreover, since weight reduction of the vehicle body substructure 300 is achieved, improvement of fuel efficiency can be achieved.

The left side sill 3020 is an extrusion molded member using an aluminum alloy. The left side sill 3020 has a side sill outer side wall 3110, a side sill inner side wall 3120, a side sill apex portion 3130, a side sill bottom portion 3140, a side sill flange 3150, and a first energy absorption member 3160.

The left side sill 3020 is formed to have a rectangular closed cross section by the side sill outer side wall 3110, the side sill inner side wall 3120, the side sill apex portion 3130, and the side sill bottom portion 3140.

The first energy absorption member 3160 is accommodated inside the rectangular closed cross section of the left side sill 3020. An impact load F10 input laterally to the vehicle Ve can be absorbed by the first energy absorption member 3160.

The side sill inner side wall 3120 has a side sill lower half portion 3120a which forms the lower half portion in the up-down direction. The side sill bottom portion 3140 has a side sill inner half portion 3140a which forms an inner half portion in the vehicle width direction. The side sill lower half portion 3120a and the side sill inner half portion 3140a are formed to intersect (specifically, orthogonal to) each other. An inner corner portion 3180 is formed by the side sill lower half portion 3120a and the side sill inner half portion 3140a. The side sill flange 3150 extends downward from an outer end portion 3140b of the inner corner portion 3180 on the outer side in the vehicle width direction.

That is, the left side sill 3020 is formed similarly to the left side sill 14 of the first embodiment through extrusion molding of an aluminum alloy.

The floor cross-member 3040 is formed similarly to the first floor cross-member 3100 and the second floor cross-member 3200 of the first embodiment through extrusion molding of an aluminum alloy. A part of the remaining load absorbed by the first energy absorption member 3160 is transferred to the floor cross-member 3040 as a load F11 through the path of the first load path.

Figure 51:
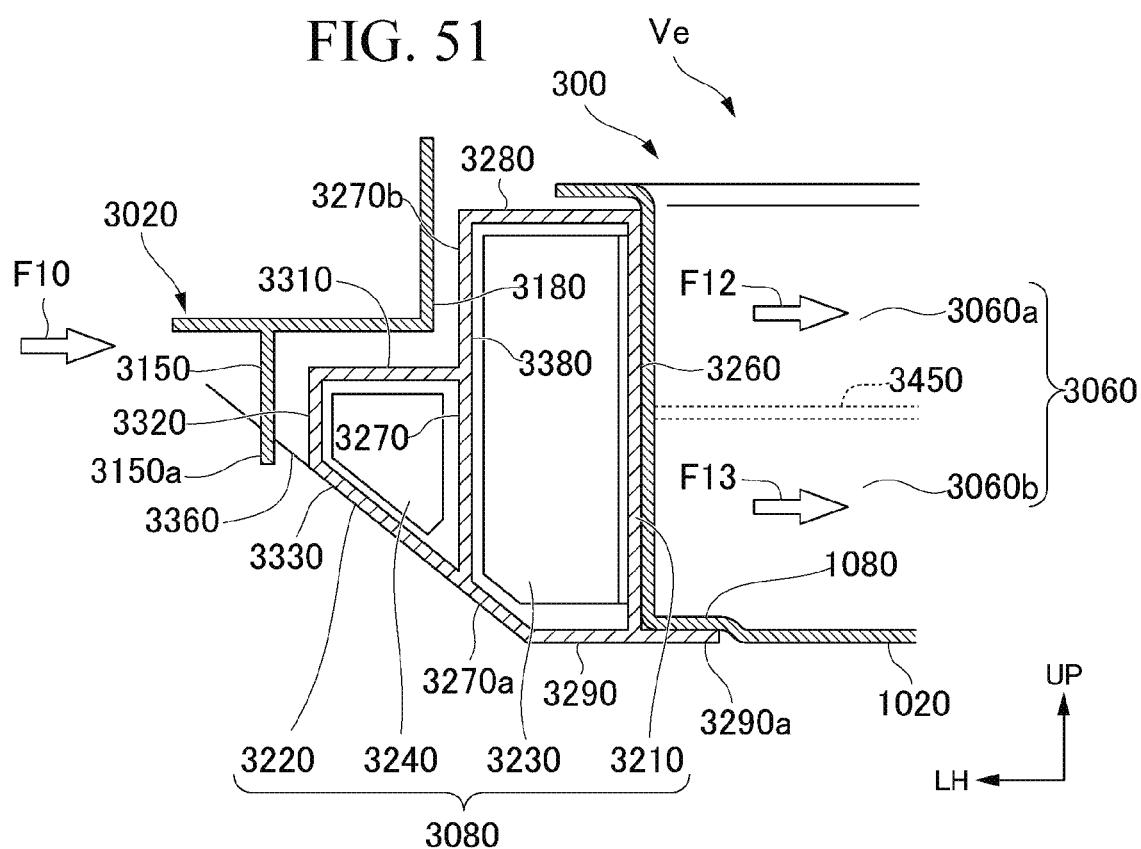
FIG. 51 is a cross-sectional view showing a left frame portion of the vehicle body substructure according to the alternative fourth embodiment of the present invention.

As shown in FIG. 51, the left frame portion 3080 is formed similarly to the left frame portion 1610 of the first embodiment through extrusion molding of an aluminum alloy.

The left frame portion 3080 includes a first frame portion 3210, a second frame portion 3220, a first frame energy absorption member (second energy absorption member) 3230, and a second frame energy absorption member (second energy absorption member) 3240. The left frame portion 3080 is formed to have an L-shaped cross section.

The first frame portion 3210 has a first frame inside wall portion 3260, a first frame outside wall portion 3270, a first frame apex portion 3280, and a first frame bottom portion 3290. An inner end portion 3290a of the first frame bottom portion 3290 is joined to the case bottom portion 1080 of the battery case 1020 from below. The first frame outside wall portion 3270 has an outside wall lower portion 3270a. The outside wall lower portion 3270a extends with a downward slope inward in the vehicle width direction and downward to the first frame bottom portion 3290.

The second frame portion 3220 has a second frame apex portion 3310, a second frame outside wall portion 3320, and a second frame inclination portion (inclination portion) 3330.

The second frame inclination portion 3330 extends with a downward slope inward in the vehicle width direction from the lower end of the second frame outside wall portion 3320 and downward to the upper end of the outside wall lower portion 3270a.

The second frame inclination portion 3330 extends in a manner inclining upward from the case bottom portion (lower surface) 1080 side of the battery case 1020 toward a lower end portion 3150a of the side sill flange 3150 such that an imaginary extension line 3360 intersects the side sill flange 3150.

Thus, the second frame inclination portion 3330 can be concealed by the side sill flange 3150 such that it is unlikely to be viewed from the outside of the vehicle Ve. Accordingly, a large-sized battery case 1020 (that is, the battery pack) in which the case bottom portion 1080 of the battery pack is disposed below the left side sill 3020 can be mounted in the vehicle Ve without affecting the appearance of the vehicle Ve.

The left frame portion 3080 has a frame engagement portion (engagement portion) 3380. Since an outside wall upper portion 3270b of the first frame outside wall portion 3270 and the second frame apex portion 3310 are disposed to intersect (orthogonal to) each other, the frame engagement portion 3380 is formed by the outside wall upper portion 3270b and the second frame apex portion 3310. In other words, the frame engagement portion 3380 is formed to have an L-shaped cross section by the outside wall upper portion 3270b and the second frame apex portion 3310.

The left frame portion 3080 is formed to have an L-shaped closed cross section by the frame engagement portion 3380, the second frame inclination portion 3330, the outside wall lower portion 3270a, and the like. The frame engagement portion 3380 confronts (faces) the inner corner portion 3180 of the left side sill 3020.

Thus, the inner corner portion 3180 (that is, the left side sill 3020) can be received reliably by the left frame portion 3080 in which the frame engagement portion 3380 is formed. When the impact load F10 is input laterally to the vehicle Ve, the impact load F10 input to the left side sill 3020 can be transmitted reliably to the left frame portion 3080.

The left frame portion 3080 has a first closed cross section and a second closed cross section. The first closed cross section is formed by the first frame portion 3210. The second closed cross section is formed by the second frame portion 3220 and the first frame outside wall portion 3270.

The first frame energy absorption member 3230 is accommodated in the first closed cross section. The second frame energy absorption member 3240 is accommodated in the second closed cross section.

Figure 52:
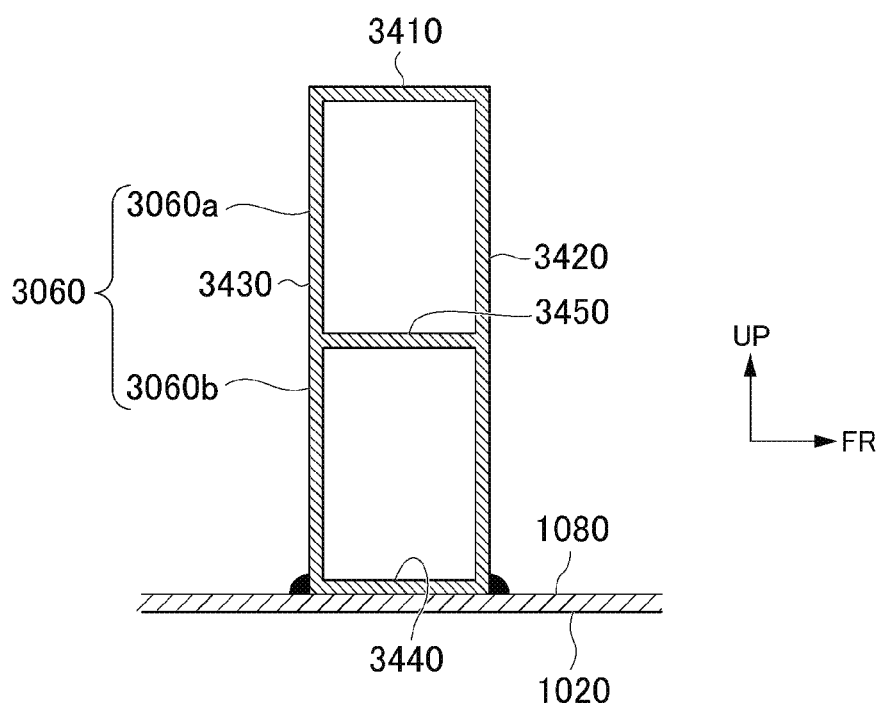
FIG. 52 is a cross-sectional view showing a battery cross-member of the vehicle body substructure according to the alternative fourth embodiment of the present invention.

As shown in FIG. 52, the battery cross-member 3060 is formed similarly to the battery cross-member 1040 of the first embodiment through extrusion molding of an aluminum alloy.

The battery cross-member 3060 has a battery cross-member apex portion 3410, a battery cross-member front wall portion 3420, a battery cross-member rear wall portion 3430, a battery cross-member bottom portion 3440, and a battery cross-member partitioning wall 3450.

The battery cross-member 3060 is vertically partitioned by the battery cross-member partitioning wall 3450. Thus, the battery cross-member 3060 is divided into a cross-member upper portion 3060a and a cross-member lower portion 3060b by the battery cross-member partitioning wall 3450.

Returning to FIG. 50, the battery cross-member 3060 is divided into the cross-member upper portion 3060a and the cross-member lower portion 3060b. A part of the impact load F10 input laterally to the left side sill 3020 of the vehicle Ve can be transferred to the cross-member upper portion 3060a as a so-called horizontal load F12 through the path of the second load path. In addition, a part of the impact load F10 input laterally to the left side sill 3020 of the vehicle Ve can be transferred to the cross-member lower portion 3060b as a so-called offset load F13 through the path of the third load path.

A part of the impact load F10 input laterally to the left side sill 3020 of the vehicle Ve can be transmitted in a manner divided into two paths such as the cross-member upper portion 3060a and the cross-member lower portion 3060b. As a result, the cross-member upper portion 3060a and the cross-member lower portion 3060b can favorably withstand a part of the impact load F10.

As shown in FIG. 51, according to the vehicle body substructure 300 of the second embodiment, similar to the vehicle body substructure 12 of the first embodiment, the battery 99 accommodated in the inside 1125 of the battery case 1020 can be protected from the impact load F10 input laterally to the vehicle Ve.

Specifically, in the vehicle body substructure 300, the impact load F10 input laterally to the vehicle Ve can be absorbed favorably by the first energy absorption member 3160, the first frame energy absorption member 3230, and the second frame energy absorption member 3240. Moreover, the impact load F10 input laterally to the vehicle Ve can be dispersed to the paths of the first to third load paths as the loads F11, F12, and F13.

Thus, the floor cross-member 3040 or the battery cross-member 3060 can favorably withstand the loads F11, F12, and F13 dispersed to the paths of the first to third load paths. Accordingly, the battery 99 accommodated in the inside 1125 of the battery case 1020 can be protected from the impact load F10.

The technical scope of the present invention is not limited to the embodiments described above, and various changes can be added within a range not departing from the gist of the present invention.

For example, in the foregoing embodiments, the battery pack 2000 has been described as example of an underfloor mounting component which is an in-vehicle component, but the embodiment is not limited thereto. The embodiment can also be applied to other components such as a fuel tank or a fuel cell stack as an alternative in-vehicle component.

In addition, in the foregoing embodiments, an example in which the lower end portion 6600*a* of the side sill flange 6600 protrudes inward in the vehicle width direction has been described, but the embodiment is not limited thereto. As an alternative example, the lower end portion 6600*a* of the side sill flange 6600 can protrude vertically downward. Alternatively, the lower end portion 6600*a* of the side sill flange 6600 can protrude outward in the vehicle width direction.

BRIEF DESCRIPTION OF THE REFERENCE SYMBOLS

10: Vehicle body
12, 1120: Vehicle body substructure
10*a*: Left side portion (outer side)
10*b*: Right side portion (outer side)
14, 302: Left side sill
14*a*: Side sill central portion (central portion)
15: Right side sill
16: Floor panel
16*a*: Upper surface of floor panel
16*b*: Lower surface of floor panel
28, 2000: Battery pack (underfloor mounting component)
29: Left battery pack frame (underfloor frame)
29*a*: Attachment part of battery pack frame (part of underfloor frame attached to lower portion of side sill)
30: Right battery pack frame (underfloor frame)
34: First floor cross-member
35: Second floor cross-member
36: Third floor cross-member
51: First outer bulkhead (side sill load transmitting member)
52: Second outer bulkhead (side sill load transmitting member)
53: Third outer bulkhead (side sill load transmitting member)
55: First inner bulkhead (side sill load transmitting member)
56: Second inner bulkhead (side sill load transmitting member)
56*a*: Upper portion of inner bulkhead
56*b*: Lower portion of inner bulkhead
57: Third inner bulkhead (side sill load transmitting member)
61: First gusset
62: Second gusset
63: Third gusset
81: Side sill inside wall (inside wall of side sill)
83: Side sill lower portion (lower portion of side sill)
108: Extending portion
111: Gusset inclination portion
124: Case wall portion
124*a*: Left side wall
124*b*: Right side wall
125: Case bottom portion (bottom portion of underfloor mounting component)
125*a*: Outer surface of case bottom portion
129: Inside of battery pack
131: Battery cross-member (underfloor cross-member)
131A: First battery cross-member (underfloor cross-member)
131B: Second battery cross-member (underfloor cross-member)
131C: Third battery cross-member (underfloor cross-member)
140: Side sill
146: Frame inside wall portion
151: Frame extension portion
152: Left bulkhead (battery load transmitting member, underfloor load transmitting member)
152*a*: Bulkhead upper half portion (upper half portion of underfloor load transmitting member)
152*b*: Bulkhead lower half portion (lower half portion of underfloor load transmitting member)
154: Attachment apex portion
155: Attachment outside wall portion
156: Attachment bottom portion
157: Bent portion
159: Lower connection portion (connection portion)
172: Longitudinal member
175: Strut portion
176: Front seat portion
177: Rear seat portion
184: Front joint piece (end portion facing upper half portion of underfloor load transmitting member)
185: Rear joint piece (end portion facing upper half portion of underfloor load transmitting member)
191: Traverse member
191A: First traverse member
191B: Second traverse member
191C: Third traverse member
192: Left traverse member
193: Right traverse member
195: Bead
200: Reinforcement plate
230: Pedestal portion
280, 1020: Battery case
280A: Case main body
280A*a*: Bottom wall
280B: Case cover
350: Floor cross-member
370, 400: Member main body portion
370*f*: Front wall
370*u*: Upper wall
370*r*: Rear wall
380, 410: Forward protruding seat
390, 420: Rearward protruding seat
430: Recessed portion
450: Battery cross-member (underfloor cross-member)
450C: Central member
450S: Side portion member
460: Stud bolt (fastening member)
460*a*: Body portion
460*c*: Screw portion
480: Bracket
480*a*: Insertion hole
490: Nut
500: Case side wall
510: Battery
520: Case frame
520*b*: Extension piece
530: Attachment frame
530*a*: Frame extension piece
550: Work hole
560: Elastic seal member
570: Penetration hole
580: First partition wall member (partition wall member)
590: Second partition wall member (partition wall member)

600: Auxiliary partition wall member
610: Lower surface reinforcement member
620: Alternative lower surface reinforcement member
630: Load transmitting plate
650: Cross-plate
1040, 1040A, 1040B: Battery cross-member (underfloor cross-member)
1040a: Cross-member upper portion (upper portion)
1040b: Cross-member lower portion (lower portion)
1060: Pipe accommodation portion
1070: Case wall portion (outer circumferential wall)
1080: Case bottom portion (lower surface)
1140: Battery cross-member apex portion (upper surface)
1220: Battery cross-member partitioning wall (partitioning wall)
1240: Fragile portion
1250: Firm portion
1480: Battery cross-member recessed portion (recessed portion)
1540: Piping
1550: Hose
1610: Left frame portion (frame portion)
1620: Right frame portion (frame portion)
1630: Front frame portion (frame portion)
1650: First frame portion
1660: Second frame portion
1670, 3230: First frame energy absorption member (second energy absorption member)
1680, 3240: Second frame energy absorption member (second energy absorption member)
1780: Inside of first frame portion
1830, 3330: Second frame inclination portion (inclination portion)
1860, 3360: Imaginary extension line
1870: Inside of second frame portion
2080, 3380: Frame engagement portion (engagement portion)
2400: Driver's seat (seat)
2600: Passenger seat (seat)
3100, 3100A, 3100B: First floor cross-member
3150, 6600: Side sill flange
3150a, 6600a: Lower end portion of side sill flange
3200: Second floor cross-member
3800: Projection portion
4100: Side sill outer
4200: Side sill inner
4400, 3160: First energy absorption member
6400, 3180: Inner corner portion
8100: First member apex portion (apex portion)
8200, 8300: First member front wall portion, first member rear wall portion (pair of wall portions)
8400, 8500: First member front flange, first member rear flange (front flange, rear flange)
8800: First recessed portion
9100: Second member apex portion (apex portion)
9200, 9300: Second member front wall portion, second member rear wall portion (pair of wall portions)
9400, 9500: Second member front flange, second member rear flange (front flange, rear flange)
9700: Second recessed portion
E1: Outer region
E2: Inner region
F1, F5, F10: Impact load
Ve: Vehicle

What is claimed is:

1. A vehicle body substructure comprising:
side sill load transmitting members that are provided inside each of side sills;
a floor cross-member that is provided on one of an upper surface and a lower surface of a floor panel laid between the side sills and has extending portions extending toward upper portions of the side sill load transmitting members;
an underfloor mounting component that is provided below the floor panel and includes an underfloor cross-member;
underfloor frames that are attached to lower portions of the underfloor mounting component and the side sills; and
underfloor load transmitting members that are provided in the underfloor frames and face the underfloor cross-member,
wherein the underfloor load transmitting member has
an upper half portion which faces a lower portion of the side sill load transmitting member, and
a lower half portion which is fixed to a part of the underfloor frame attached to a lower portion of the side sill.

2. The vehicle body substructure according to claim 1, wherein the underfloor cross-member has
left and right side portion members which are disposed on left and right sides in a vehicle width direction, and
a central member which is disposed substantially at a center in the vehicle width direction,
wherein cross sections of the left and right side portion members and the central member are formed to be a substantially hat-shaped cross section,
wherein an upper surface of the central member is formed lower than upper surfaces of the left and right side portion members,
wherein the upper surface of the central member and end portions of the left and right side portion members on inner sides in the vehicle width direction constitute a recessed portion which allows communication in a front-rear direction of a vehicle body, and
wherein each of the left and right side portion members is coupled to the floor cross-member thereabove and is coupled to the central member with respect to the floor cross-member in a vicinity of a part below a coupling portion.

3. The vehicle body substructure according to claim 2, wherein a pair of partition wall members individually fixed to at least three surfaces such as a front wall, an upper wall, and a rear wall of the substantially hat-shaped cross section of the side portion member are provided in the left and right side portion members, and
wherein the pair of partition wall members are provided at positions in front of and behind the coupling portion with respect to the floor cross-member in an extending direction of the side portion member.

4. The vehicle body substructure according to claim 3, wherein the central member is coupled to the left and right side portion members in regions below the partition wall members.

5. The vehicle body substructure according to claim 4, wherein a stud bolt fastened to the upper wall of the side portion member is used for the coupling portions of the left and right side portion members with respect to the floor cross-member, and
wherein the pair of partition wall members are provided in front of and behind a protruding position of the stud bolt in the extending direction of the side portion member.

6. The vehicle body substructure according to claim 5, wherein a battery and the underfloor cross-member are disposed inside the battery case, wherein the battery case includes
a case main body which has an open upper side, and
a case cover which blocks an opening of the case main body,
wherein the stud bolt has a screw portion which protrudes upward from the case cover and is fastened and fixed to the floor cross-member side due to the screw portion, and
wherein a body portion of the stud bolt is held in a penetration hole of the case cover with an elastic seal member interposed therebetween.

7. The vehicle body substructure according to claim 6,
wherein a bracket having an insertion hole is attached to an inside of the floor cross-member, in which a work hole facing the insertion hole is provided in an upper wall, and
wherein a nut is fastened and fixed to the screw portion of the stud bolt protruding upward from the insertion hole, through the work hole.

8. The vehicle body substructure according to claim 2,
wherein auxiliary partition wall members substantially blocking gaps between the lower surfaces of the side portion members and the upper surface of the central member are coupled to end edges of the left and right side portion members on the inner sides in the vehicle width direction and the central member.

9. The vehicle body substructure according to claim 2,
wherein the underfloor cross-member includes
a forward protruding seat which protrudes forward from a lower edge of a front wall, and
a rearward protruding seat which protrudes rearward from a lower edge of a rear wall,
wherein the forward protruding seat and the rearward protruding seat are disposed on an upper surface side of a bottom wall of a battery case, and a lower surface reinforcement member is disposed on a lower surface side of the bottom wall, and
wherein the forward protruding seat and the rearward protruding seat are coupled to the lower surface reinforcement member in a state where the bottom wall is sandwiched therebetween.

10. The vehicle body substructure according to claim 9,
wherein the lower surface reinforcement member is coupled to the lower surface of the bottom wall in a manner extending substantially in the vehicle width direction, and
wherein an alternative lower surface reinforcement member extending substantially in the front-rear direction of the vehicle body is also coupled to the lower surface of the bottom wall.

11. The vehicle body substructure according to claim 2, further comprising:
a load transmitting plate that is laid across the upper surfaces of the left and right side portion members.

12. The vehicle body substructure according to claim 1,
wherein the underfloor cross-member is formed to have an inverted T-shaped cross section having a member main body portion which stands upright and of which an upper portion is coupled to the floor cross-member using a fastening member, a forward protruding seat which protrudes forward from a lower edge of the member main body portion, and a rearward protruding seat which protrudes rearward from the lower edge of the member main body portion, and
wherein the forward protruding seat and the rearward protruding seat are coupled to a bottom wall of a battery case.

13. The vehicle body substructure according to claim 12,
wherein the forward protruding seat and the rearward protruding seat are disposed on an upper surface side of the bottom wall of the battery case,
wherein a lower surface reinforcement member is disposed on a lower surface side of the bottom wall, and
wherein the forward protruding seat and the rearward protruding seat are coupled to the lower surface reinforcement member in a state where the bottom wall is sandwiched therebetween.

14. The vehicle body substructure according to claim 13,
wherein the lower surface reinforcement member is constituted of a plate-shaped member of which a substantially wave-shaped cross section extends substantially in the vehicle width direction.

15. The vehicle body substructure according to claim 13,
wherein the battery case has case side walls which rise upward from left and right end portions of the bottom wall,
wherein a case frame extending substantially in the front-rear direction of the vehicle body is coupled to an outer side of the case side wall,
wherein the case frame has an extension piece which is disposed on the lower surface of the bottom wall of the battery case and constitutes the lower surface reinforcement member, and
wherein the forward protruding seat and the rearward protruding seat are coupled to the extension piece in a state where the bottom wall is sandwiched therebetween.

16. The vehicle body substructure according to claim 15,
wherein an attachment frame connecting the case frame to a lower surface of the side sill is coupled to the case frame,
wherein a frame extension piece overlapping a lower surface of the extension piece of the case frame extends in the attachment frame, and
wherein the frame extension piece is coupled to the bottom wall of the battery case together with the extension piece.

17. The vehicle body substructure according to claim 12,
wherein the member main body portion of the underfloor cross-member has
an upper wall,
a front wall which extends downward from a front portion of the upper wall, and
a rear wall which extends downward from a rear portion of the upper wall, and
wherein a partition wall member restricting three surfaces such as the upper wall, the front wall, and the rear wall of the member main body portion is coupled in a vicinity of a fixing portion of the fastening member of the member main body portion.

18. The vehicle body substructure according to claim 12,
wherein the floor panel is disposed above the battery case,
wherein the floor cross-member includes
a cross-plate which has a substantially hat-shaped cross section, is joined to the upper surface of the floor panel, forms a closed cross section extending substantially in the vehicle width direction between the cross-plate and the floor panel, and has both end portions in the vehicle width direction laid between the pair of side sills, and
a gusset inclination portion which has a substantially hat-shaped cross section, is laid between a lower surface in an end portion region of the floor panel in the vehicle width direction and a side surface of the side sill, and forms a closed cross section extending substantially in the vehicle width direction between the gusset inclination portion and the floor panel,
wherein an end portion region of the gusset inclination portion in the vehicle width direction and the gusset inclination portion are formed to incline downward to a side outward in the vehicle width direction,
wherein a bracket which also serves as a cross section reinforcing portion is internally attached in a region closer to a center of the cross-plate in the vehicle width direction, and
wherein the bracket is coupled to the member main body portion of the underfloor cross-member using the fastening member.

19. The vehicle body substructure according to claim 18,
wherein a battery and the underfloor cross-member are disposed inside the battery case,
wherein the battery case includes
a case main body which has an open upper side, and
a case cover which blocks an opening of the case main body,
wherein the fastening member is a stud bolt of which both end portions are fastened to the bracket and the underfloor cross-member, and
wherein a body portion of the stud bolt is held in a penetration hole of the case cover with an elastic seal member interposed therebetween.

20. The vehicle body substructure according to claim 12,
wherein the member main body portion of the underfloor cross-member has
an upper wall,
a front wall which extends downward from a front portion of the upper wall, and
a rear wall which extends downward from a rear portion of the upper wall, and
wherein a reinforcement plate which has a substantially U-shaped cross section and is joined to the upper wall, the front wall, and the rear wall is disposed inside the member main body portion.

21. The vehicle body substructure according to claim 12,
wherein the forward protruding seat and the rearward protruding seat include a pedestal portion of which a lower surface projecting upward communicates with an internal space of the member main body portion and of which an upper surface is substantially flat.

22. The vehicle body substructure according to claim 1, further comprising:
frame portions that are disposed on outer sides of the underfloor mounting component and face inner corner portions,
wherein the underfloor mounting component includes the underfloor cross-member which faces the frame portions, and
wherein the frame portion includes
an engagement portion which confronts the inner corner portion, and
an inclination portion which extends in a manner inclining upward from a lower surface side of the underfloor mounting component toward a lower end portion of a side sill flange such that an imaginary extension line intersects the side sill flange.

23. The vehicle body substructure according to claim 22,
wherein the frame portion is provided in an outer circumferential wall of the underfloor mounting component and is formed to have an L-shaped closed cross section by the engagement portion and the inclination portion.

24. The vehicle body substructure according to claim 22,
wherein the side sill includes
a side sill outer on the outer side in the vehicle width direction,
a side sill inner which is joined to the side sill outer from the inner side in the vehicle width direction and forms a closed cross section together with the side sill outer, and
a first energy absorption member which is disposed in the closed cross section and is attached to the side sill outer.

25. The vehicle body substructure according to claim 22,
wherein the frame portion includes a second energy absorption member disposed therein.

26. The vehicle body substructure according to claim 22,
wherein an upper portion of the underfloor cross-member is disposed to confront a central portion of the side sill in an up-down direction.

27. The vehicle body substructure according to claim 22,
wherein the underfloor cross-member includes
a fragile portion which is formed in an outer region on the outer side in the vehicle width direction, and
a firm portion which is formed in an inner region on the inner side in the vehicle width direction.

28. The vehicle body substructure according to claim 22,
wherein the underfloor cross-member is formed to have a hollow shape, is provided at a center in an up-down direction, and includes a partitioning wall which vertically partitions the underfloor cross-member.

29. The vehicle body substructure according to claim 22, further comprising:
a first floor cross-member and a second floor cross-member that extend in the vehicle width direction along the upper surface of the floor panel at an interval in a front-rear direction of a vehicle body,
wherein the first floor cross-member and the second floor cross-member are formed to have a hat-shaped cross section by an apex portion, a pair of wall portions, a front flange, and a rear flange,
wherein the front flange and the rear flange are joined to the upper surface of the floor panel,
wherein a seat is supported by the first floor cross-member and the second floor cross-member,
wherein the first floor cross-member has a first recessed portion which is recessed upward in a wall portion facing the second floor cross-member,
wherein the second floor cross-member has a second recessed portion which is recessed upward in a wall portion facing the first floor cross-member, and
wherein the floor panel has a projection portion which projects upward along the first recessed portion and the second recessed portion.

30. The vehicle body substructure according to claim 29,
wherein the underfloor cross-member is connected to the floor panel below the first floor cross-member and the second floor cross-member.

31. The vehicle body substructure according to claim 22,
wherein the underfloor cross-member has a recessed portion in which a downward recess is formed at the center in the vehicle width direction and includes a pipe accommodation portion which is attached to the recessed portion in a manner extending in the front-rear direction of a vehicle body and accommodates at least one of a piping and a hose.

32. The vehicle body substructure according to claim 1,
wherein the floor cross-member is provided on the upper surface of the floor panel, wherein the extending portion extends with a downward slope to the side sill, and wherein a gusset laid at an interval from the extending portion is provided between the lower surface of the floor panel and an inside wall of the side sill.

33. The vehicle body substructure according to claim 1 or 32, wherein the upper half portion of the underfloor load transmitting member is disposed at a same height as the side sill load transmitting member, wherein the lower half portion of the underfloor load transmitting member is disposed at a same height as a part of the underfloor frame attached to the lower portion of the side sill, and wherein the upper half portion and the lower half portion are fixed to the underfloor frame.

34. The vehicle body substructure according to claim 1,
wherein the underfloor frame has
   a frame inside wall portion which faces the underfloor mounting component, and
   a frame extension portion which extends from the frame inside wall portion along a bottom portion of the underfloor mounting component,
wherein the underfloor cross-member is disposed inside the underfloor mounting component, and
wherein the underfloor cross-member is formed to have
   a strut portion which rises from the bottom portion of the underfloor mounting component and of which end portions facing the upper half portion of the underfloor load transmitting member are fixed to side walls of the underfloor mounting component, and
   a seat portion which protrudes along the bottom portion from the strut portion and is fixed to the frame extension portion with the bottom portion interposed therebetween.

35. The vehicle body substructure according to claim 34, wherein the underfloor mounting component includes traverse members which extend along the seat portion in a state of being fixed to an outer surface of the bottom portion and have a bead projecting toward the bottom portion, and wherein the seat portion is fixed in a state of overlapping the bottom portion and the traverse members of the underfloor mounting component.

36. The vehicle body substructure according to claim 35,
wherein the underfloor frame has
   an attachment apex portion which is attached to the lower portion of the side sill,
   an attachment outside wall portion which extends downward from the attachment apex portion,
   an attachment bottom portion which extends in a same plane as the frame extension portion from the attachment outside wall portion to the frame extension portion, and
   a connection portion which is offset downward from the attachment bottom portion and is fixed to the frame extension portion, and
wherein the underfloor frame is formed to have a U-shaped cross section by the attachment apex portion, the attachment outside wall portion, and the attachment bottom portion.

37. The vehicle body substructure according to claim 35,
wherein the underfloor frames are provided in the left and right side walls of the underfloor mounting component,
wherein the seat portion is provided between the left and right underfloor frames in a connected state in the vehicle width direction,
wherein the traverse members are provided to extend in the vehicle width direction on the left and right sides at an interval from the center in the vehicle width direction, and
wherein a longitudinal member which is disposed between the traverse members on the left and right sides, extends in the front-rear direction of the vehicle body, and is fixed to the bottom portion of the underfloor mounting component is provided.

* * * * *